United States Patent [19]

Steffen

[11] 4,277,833
[45] Jul. 7, 1981

[54] PLANTER POPULATION MONITOR

[75] Inventor: David E. Steffen, Chatham, Ill.

[73] Assignee: Dickey-john Corporation, Auburn, Ill.

[21] Appl. No.: 85,743

[22] Filed: Oct. 17, 1979

Related U.S. Application Data

[63] Continuation-in-part of Ser. No. 939,605, Sep. 5, 1978, Pat. No. 4,225,930.

[51] Int. Cl.³ .................... G06F 15/20; G08B 21/00
[52] U.S. Cl. ........................................ 364/555; 221/8; 340/609; 371/29
[58] Field of Search ........................... 371/20, 25, 29; 364/551, 555, 575; 340/606, 609, 684; 221/3, 8

[56] References Cited

U.S. PATENT DOCUMENTS

| | | | |
|---|---|---|---|
| 2,907,015 | 9/1959 | Young | 340/684 |
| 3,527,928 | 9/1970 | Ryder et al. | 235/92 |
| 3,537,091 | 10/1970 | Schenkenberg | 340/684 |
| 3,665,399 | 5/1972 | Zehr et al. | 364/551 X |
| 3,723,989 | 3/1973 | Fathauer et al. | 340/684 |
| 3,912,121 | 10/1975 | Steffen | 221/13 |
| 3,927,400 | 12/1975 | Knepler | 340/684 |
| 3,928,751 | 12/1975 | Fathauer | 235/92 PK |
| 4,009,799 | 3/1977 | Fathauer | 221/3 |
| 4,054,786 | 10/1977 | Vincent | 364/575 |
| 4,085,862 | 4/1978 | Steffen | 221/8 |
| 4,122,974 | 10/1978 | Harbert et al. | 221/13 |
| 4,159,064 | 6/1979 | Hood | 221/8 |

Primary Examiner—Jerry Smith
Attorney, Agent, or Firm—Trexler, Wolters, Bushnell & Fosse, Ltd.

[57] ABSTRACT

A monitoring apparatus for simultaneously monitoring a plurality of functions of a machine, such as a multi-row seed planting machine, includes a programmed microprocessor. A plurality of sensors detect the machine functions to be monitored, and the microprocessor receives and stores data corresponding to the monitored functions from all of the sensors simultaneously. A user accessible control and display panel cooperates with the microprocessor to produce observable indications of the machine functions being monitored in accordance with the stored data as such functions are selected for display by the user. The microprocessor is also programmed to receive and utilize data inputs from the control panel, corresponding to machine parameters of the particular machine with which the monitoring apparatus is being utilized, and data corresponding to the desired maximum and minimum values of the functions to be monitored. Accordingly, the monitoring apparatus may be customized for the particular machine with which it is being utilized, and for giving an observable indication or alarm in the event the functions being monitored fail to fall within the selected maximum and minimum limits.

13 Claims, 9 Drawing Figures

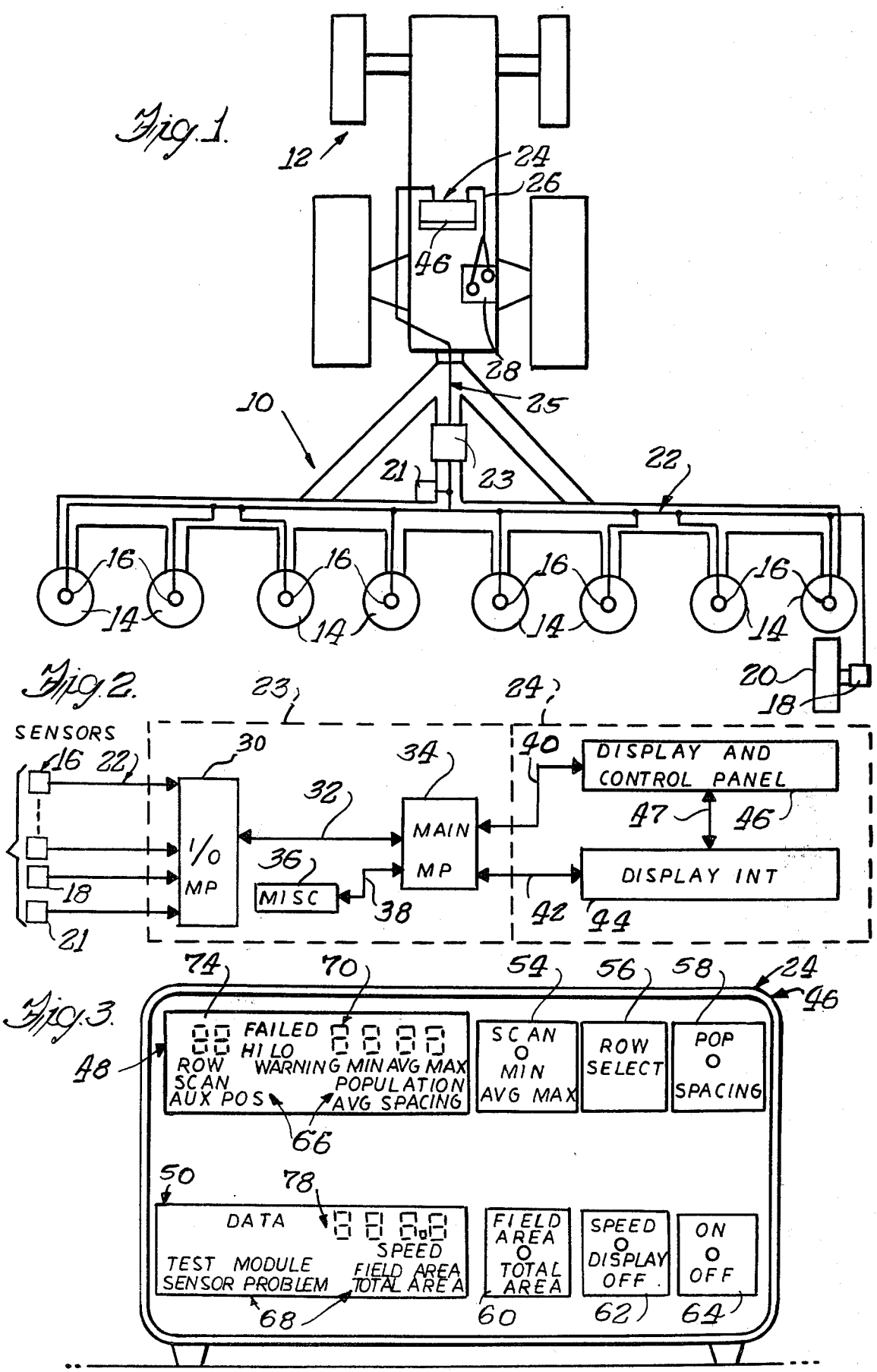

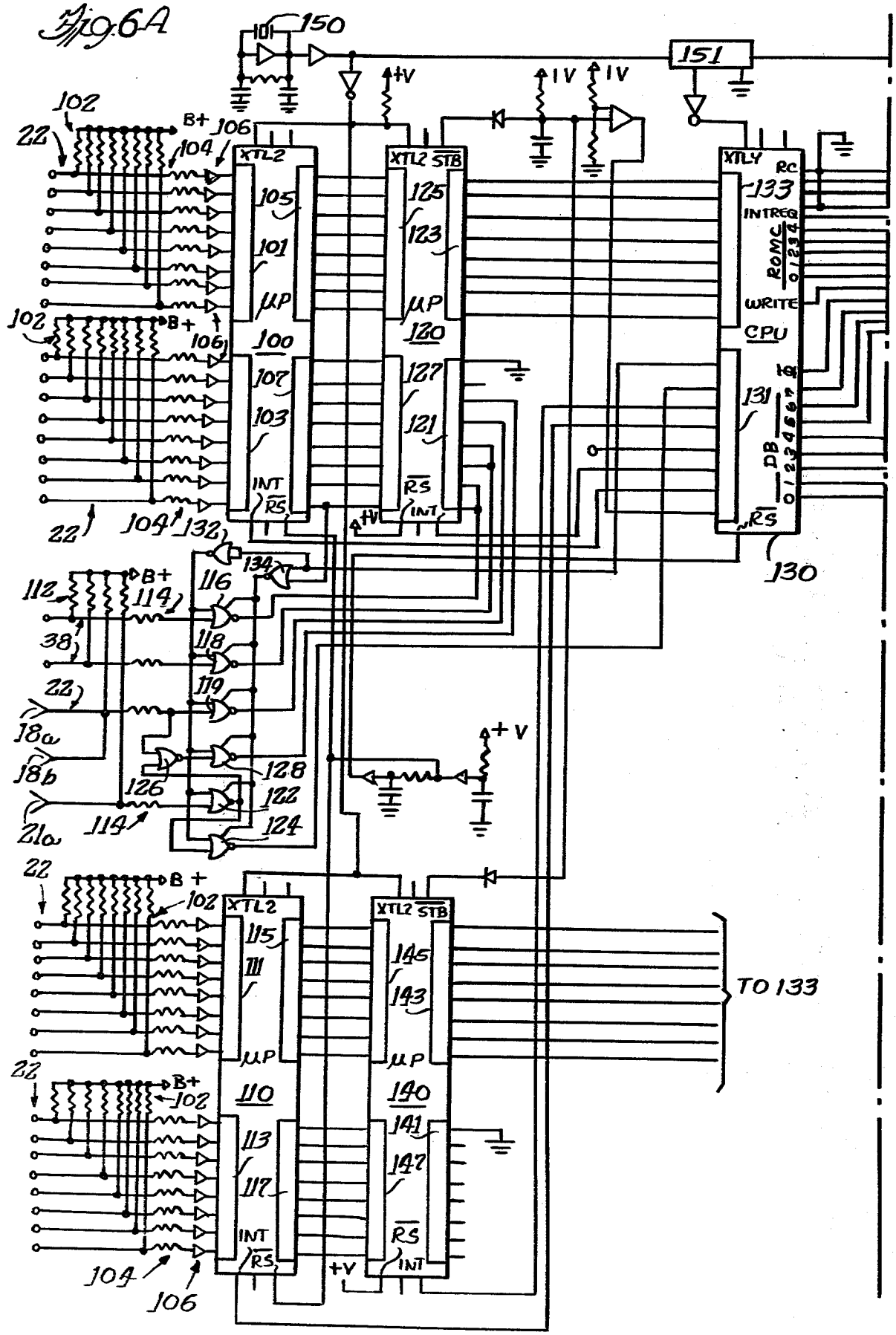

PLANTER POPULATION MONITOR

CROSS REFERENCE TO RELATED APPLICATION

This application is a continuation-in-part of my copending application, Ser. No. 939,605, filed Sept. 5, 1978 and now U.S. Pat. No. 4,225,930.

BACKGROUND OF THE INVENTION

The present invention relates generally to novel monitoring apparatus, and more specifically to a novel monitoring apparatus for monitoring a plurality of functions of a machine. While the features of this invention are useful with different machines, the disclosure will be facilitated by addressing the specific problem of monitoring the planting of seeds by a multi-row seed planting machine.

As is well known, a farmer engaged in mechanized planting of seeds generally utilizes a planting machine pulled behind a tractor. One form of planting machine commonly used includes a plurality of seed planting units carried on a single frame for simultaneously planting a plurality of rows of seeds. With such multi-row planting equipment, it is often difficult for the farmer to monitor operation of all the planting units with any degree of accuracy. In this regard, it is also important to ascertain that all planting units are operating to achieve a desired seed population per acre, at least within reasonable limits. In order to determine seed population planted by each planting unit, as well as by the planting machine as a whole, it is necessary to determine the number of seeds planted by each planting unit of the planting machine, the ground speed of the planting machine, the number of rows being planted, and the row width or spacing between rows.

A number of prior monitoring systems have been proposed for monitoring seed population planted by a multi-row planting machine. Representative of these prior art systems are those described in the following U.S. Pat. Nos.: Fathauer el al 3,855,953; Steffen 3,912,121; Knepler 3,927,400; Fathauer 3,928,751; and Steffen 4,085,862. While these prior art systems have proven particularly useful for the purposes and functions described therein, none is capable of simultaneously monitoring and storing information from all rows of a multi-row planting machine, while at the same time monitoring the distance travelled. It will be appreciated that such capability is particularly advantageous, in that the farmer can immediately ascertain the population currently being planted in any row, or, by the machine as a whole. In contrast, in the prior art system, to ascertain seed population for a given row, it was necessary for the farmer to first select the row (i.e., planting unit), and then wait for the apparatus to accumulate a seed count over a given distance for that row. Consequently, for a large planter, e.g. one having 12 or 16 planting units, the farmer would have to wait a corresponding number of distance intervals to ascertain the seed population being planted in all rows and only thereafter could he determine the population being planted by the machine as a whole. Collaterally, should one or more rows be malfunctioning or failing to achieve the desired seed population, the farmer might not become aware of the situation until a considerable amount of ground had been covered by the planting machine.

The advent of advanced electronic components, including such elements as microprocessor components and including electronic memory elements, has made possible rapid gathering, storage and retrieval of relatively large quantities of data. The present invention advantageously provides a programmed, special purpose microprocessor for simultaneously monitoring a plurality of functions of a machine such as a multi-row seed planter, and storing data corresponding thereto.

As will be more further detailed herein below, the use of a programmed, special purpose microprocessor also makes possible the storage of a plurality of data samples or data points taken of the various functions to be monitored at predetermined intervals. Such a plurality of data samples or data points are manipulated by the programmed microprocessor, to provide heretofore unavailable information to the operator. For example, the average of a plurality of data points or samples of a function being monitored may be displayed upon command. In a multi-row seed planting machine, such average values are obtained for a particular row, or for all the rows being planted by the machine.

OBJECTS AND SUMMARY OF THE INVENTION

Accordingly, it is a general object of the present invention to provide a new and improved monitoring apparatus for simultaneously monitoring a plurality of functions of a machine.

A more specific object of the invention is to provide a new and improved monitoring apparatus especially adapted to monitor the seed population planted by a multi-row seed planting machine.

Another object is to provide a new and improved monitoring apparatus of the type described adapted to receive and store seed population planted in all rows of a multi-row seed planting machine simultaneously, and to provide therefrom useful output data in the form of observable displays or other indications, to assure the operator of proper functioning of the seed planting machine.

Briefly, in accordance with the foregoing, a monitoring apparatus in accordance with one aspect of the invention includes a special purpose computer operating in accordance with a predetermined program for simultaneously and continuously monitoring the seed population planted by all rows of a multi-row seed planting machine, and for producing observable indications of seed planting to an operator of said multi-row seed planting machine.

In accordance with another aspect of the invention, a monitoring apparatus is provided for simultaneously monitoring a plurality of functions of a machine. The monitoring apparatus includes a microprocessor operating in accordance with a predetermined program for simultaneously and continuously receiving and storing data from a plurality of sensor means which detect the machine functions being monitored. User accessible control means including observable indicator or display means are coupled with the microprocessor, the microprocessor operating in accordance with the program and in response to commands from the control means to produce observable indications of the machine functions being monitored.

In another aspect of the invention, a monitoring apparatus is provided for use with a multi-row seed planting machine, which includes electronic circuit means for simultaneously and continuously detecting the planting of seeds in all rows of the multi-row planting machine and storing a plurality of samples of this data, taken at predetermined intervals.

BRIEF DESCRIPTION OF THE DRAWINGS

Other objects, advantages and features of the present invention are described in more detail in the following description of the illustrated embodiment, taken together with the drawings, wherein:

FIG. 1 is a plan view of a seed planting machine, partially in diagrammatic form, wherein the apparatus of this invention is advantageously incorporated;

FIG. 2 is a block diagram of the monitoring apparatus of the present invention in conjunction with a plurality of sensors associated with the seed planting machine of FIG. 1;

FIG. 3 is a front elevation of a control and display console advantageously mountable for viewing by an operator of the seed planting machine of FIG. 1;

FIGS. 6A and 6B, taken together, form a schematic circuit diagram of a portion of the monitoring apparatus of FIG. 2.

DETAILED DESCRIPTION OF THE ILLUSTRATED EMBODIMENT

Figure 4:
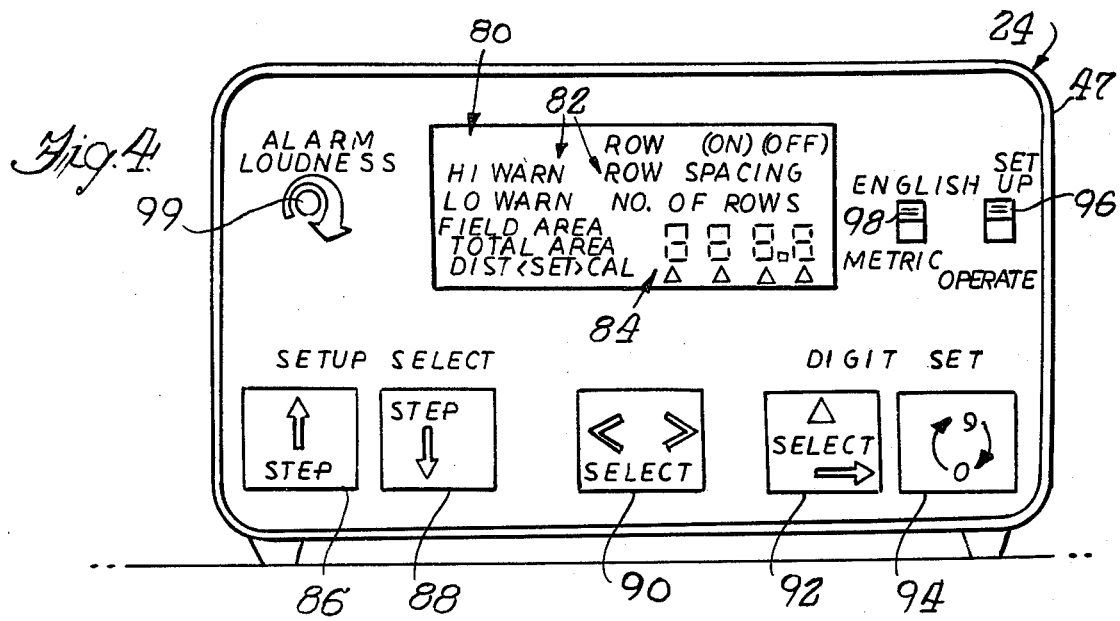
FIG. 4 is a rear elevation of the console of FIG. 3.

Referring to the drawings, the present invention will be described in conjunction with a multi-row planting machine. However, no limitation is intended, the invention being useful in other applications as well.

FIG. 1 illustrates a mobile, multi-row seed planting machine 10, transported by a tractor 12, over a field to be planted. The planting machine or planter 10 may be of various known constructions and need not be described in detail. It suffices to state that the planter 10 includes a plurality of seed planting units or chutes 14, through which seeds are delivered to be planted in the ground. In the particular embodiment illustrated, the seed planting units or chutes 14 are eight in number. It will be understood, however, that the monitoring apparatus of the invention may be readily adapted for association with planters having any desired number of planting units or chutes 14. The planting units 14 may be of various known constructions and need not be described in detail.

The seed planting units 14 each have associated therewith a seed sensor 16, which is adapted to provide an output signal in response to the passage of a seed through the associated seed planting unit or chute 14. The sensor 16 forms no part of the present invention and will not be described in further detail. Suitable sensors for this purpose are described, for example, in U.S. Pat. Nos. 3,723,989 and 3,928,751 to Fathauer, and 3,974,377 to Steffen, all owned by the present assignee.

The planter 10 also incorporates a distance or ground speed sensor 18, conveniently mounted adjacent to a wheel such as a press wheel 20 of the seed planter 10. This distance or ground speed sensor 18 also forms no part of the present invention and may comprise a tachometer or the like of known construction. The sensor 18 produces a given number of output pulses in response to a given number of rotations of, or to a given distance travelled by the wheel 20.

A suitable "lift" sensor 21 is also provided for sensing the condition of the planting machine 10. Briefly, conventional planting machines are provided with a mechanism (not shown) to lift the planting bar or planting units 14 when desired, for example, to turn the tractor and planting machine around at the end of a field, and to again lower the planting units 14 for operation when the turn-around is complete and it is desired to make another pass over the field for planting purposes. This lift sensor 21 provides a suitable signal to the components within housing 23, indicative of the relative condition of the planter apparatus 10 either in its "lifted" position for transport or in its "lowered" position for planting.

Suitable cables, designated generally 22, electrically join the seed sensors 16, ground speed or distance sensor 18 and the "lift" sensor 21 with a housing 23 mounted on the planter 10, which contains components of the monitoring apparatus of the invention. These components in the housing 23 in turn feed a control and display console 24 mounted on the tractor, via a cable 25. The console 24 is conveniently mounted on the tractor for viewing by the operator. This console 24 contains the remainder of the monitoring apparatus of the invention, and may be provided with suitable electrical operating power via a suitable cable or cables 26 from the tractor battery 28.

Reference is now invited to FIG. 2, wherein the major components forming the invention are illustrated in block diagrammatic form. The seed sensors 16 and the ground speed or distance sensor 18 feed the monitoring components in the housing 23, which in turn feed the monitoring components of the console 24.

The components in the housing 23 and console 24 include a microprocessor, which will be described in detail hereinbelow. Briefly, the microprocessor includes an input interface or input/output section 30 which receives the inputs from the sensors 16 and 18, and is joined by a bi-directional data transfer line or cable 32 with a main microprocessor section 34. Miscellaneous additional functions of the seed planting machine 10 may also be monitored or controlled at additional output devices or sensors 36, joined by bi-directional data transfer line 38 with the main microprocessor section 34. The main microprocessor section 34 is bi-directionally joined by lines 40 and 42, which form the cable 25 of FIG. 1, with elements of the console 24. These elements include display interfacing components 44 and an operator accessible display and control panel 46, bi-directionally joined by a line 47.

With reference to FIGS. 3 and 4 the console 24 is illustrated in front and rear elevations, respectively, revealing the display and control panels 46 and 47. Briefly, the display and control panel 46 is normally positioned to face the operator of the tractor 12, as illustrated in FIG. 1, during the planting operation. In accordance with a feature of the invention, the control and display panel 47, which may be viewed by the operator by "flipping over" the console 24, is used to "set up" or customize the novel monitoring apparatus of the invention for use with the planter 10. That is, the farmer may customize the apparatus of the invention to accommodate the particular features and operating characteristics of his planting machine. Referring to these control and display panels 46 and 47 of FIGS. 3 and 4, together with the block diagram of FIG. 2 the operation of the invention will now be described. The structural details of the components comprising the functional blocks of FIG. 2 will be described in detail later.

The main microprocessor 34 operates in accordance with a predetermined, stored program to continuously monitor and store the signals from all of the seed sensors 16 and from the distance or ground speed sensor 18. These signals are simultaneously received at the input interface 30 and fed to the main microprocessor 34, which calculates seed populations for each row therefrom. Advantageously, the main microprocessor is capable of storing in memory components, which will be described later, a plurality of these seed population calculations or seed counts from each sensor 16. These seed population calculations or seed counts are made, in accordance with the program, over successive, predetermined increments of distance travelled by the seed planter, as determined by the microprocessor from the input signals of the ground speed or distance sensor 18. The microprocessor is further responsive to operator input from the control panel 47, as will be described in detail later, for storing data or information corresponding to the configuration of the particular seed planting machine 10 with which the monitoring apparatus is being utilized. Thus, the monitoring apparatus of the invention may be customized for use with a particular seed planting machine such as the seed planter 10 of FIG. 1. For example, the microprocessor 34 is programmed to receive information or data corresponding both to the number of rows, that is, the number of seed planting units or chutes 14 of the planter 10 and to the spacing therebetween. This data is used by the microprocessor in calculating the seed population planted.

Referring first to FIG. 3, the display and control panel 46 includes an upper display portion or window 48 and a lower display portion or window 50. Function selection push-button control switches 54, 56 and 58 are associated with the upper display window 48. Similar function selection push-button switches 60 and 62 are associated with the lower display window 50. An on/-off (ON/OFF) push-button switch 64 is provided to the right of push-buttons 60 and 62. The display windows 48 and 50 each contain a plurality of words or symbols, designated generally by the respective reference numerals 66 and 68, which are selectively energized or made visible by operation of associated ones of the function select control switches 54, 56, 68, 60 and 62 to indicate selection of a particular function to be performed by the monitor. A four-digit display 70 in the upper display window 48 comprises four 7-segment liquid crystal display characters, and is utilized to provide a display of the value of the planting machine fucntions selected by controls 54, 56 and 58. A two-digit display 74, also in the upper window 48, comprises a pair of 7-segment liquid crystal display characters, which together with a word "ROW" adjacent thereto, are selectively energized to indicate the row number for which a read-out is being given in the display characters 70 of the display window 48. A similar four digit display 78 is provided in the lower display window 50 to indicate the values of the machine functions selected by controls 60 and 62.

Referring now also to FIG. 4, the rear display panel includes a substantially centrally located display portion or window 80, substantially similar to the display windows 48 and 50. This display window 80 includes a plurality of selectively energizable words or symbols designated generally by the reference numeral 82 and a four-digit display 84 made up of seven-segment display characters. Similar function control push-button switches 86, 88, 90, 92 are associated with the display window 80 and the words or symbols 82 and characters 84 therein. Additional controls include a set-up/operate switch 96 and an English/Metric switch 98, each of which is a two-position switch of a conventional nature. An alarm loudness control 99 is also provided for setting an audible alarm of the console, which will be discussed later, to a desired loudness level.

The operation of the monitor of the invention will now be explained in terms of operation of the controls of panels 46 and 47 both to achieve monitor "set-up" or customizing for use with a particular planting machine and during the actual planting process.

Upon depression of the on/off push-button 64, the monitor, under control of the microprocessor 34, proceeds through a self-testing function of the console itself, of the microcomputer and associated circuits illustrated in FIG. 2, and of the sensors 16, 18 and 21. The circuits and other components performing these functions will be more fully explained hereinbelow. This self-test will result, however, in suitable messages or symbols being energized in the display window 48. A fault or malfunction in the microcomputer and associated circuits will be indicated by a message MODULE PROBLEM, while a defect in a sensor or in the wiring harness connected therewith will be indicated by a message SENSOR PROBLEM, and accompanied by a sequential display of the numbers of all rows (i.e., planting units 14) in which such failure has been detected, in the display characters 74 in upper window 48.

If no such faults or malfunctions are detected, the monitor is ready for subsequent operations; however, if some faults are detected then one of the other control push-buttons must be activated to leave the self-testing mode. If the monitor has not yet been customized for use with the planter, the lower panel 50 will display the message DATA. This message indicates that the operator should tilt or rotate the console 24 for access to the rear panel 47. The SET-UP/OPERATE switch 96 should then be actuated to SET-UP.

The operator then depresses a STEP control 88 as many times as necessary to energize a HI WARN message in the window 80. A numerical value may then be set in for the upper limit of desired population to be planted (e.g. in seeds per acre) by use of a SELECT control 92 and a "0-9" control 94. Briefly, each depression of the SELECT control energizes a cursor at one of the digits 84, moving from left to right, to allow individual setting of each digit until the number to be set into the monitor is displayed. Each depression of the 0-9 control 94 advances the selected digit by one unit or count. The next depression of the STEP control 88 lights the next function indication in the window 80, namely, the LO WARN symbol. The controls 92 and 94 may then be used in the same fashion as described above to set in the lower limit of the desired population to be planted, e.g., in terms of seeds per acre. The foregoing assumes that the english system of measurement is being utilized, and accordingly, the control 98 is set in the ENGLISH position. If the metric system were being utilized, this control 98 would be set to the METRIC position. For example, when LO WARN is displayed, setting in a figure 22.5 indicates a low limit of seed population 22,500 seeds per acre. Similarly, setting in a figure 27.5 when the symbol HI WARN is displayed would indicate an upper limit of acceptable population of 27,500 seeds per acre. It will be noted that in the foregoing as well as in the following descriptions, reference to the STEP push-button control 88 includes, by extension, STEP push-button control 86, the two functioning essentially equivalently, to "step" either upwardly or downwardly through the symbols 82 of the window 80.

The microprocessor is provided with two memory compartments or register locations for accumulating a count of area planted by the seed planting machine. The operator may utilize these two "area counters" or register locations in any convenient fashion. For example, one register might be utilized to keep a count of the field area planted by the machine on a single day, or in a single field to be planted, while the other is utilized to acumulate a count of the total area planted by the seed planter over a planting season. In "setting up" for these counters the STEP push-button control 88 is again depressed to energize either the symbol "FIELD AREA" or the symbol "TOTAL AREA" in the display window 80, thereby selecting one of these registers. The cumulative count in the selected register will then be displayed, in terms of acres and tenths of acres, in the display digits 84, and the operator may use the SELECT and "0-9" controls 92, 94 to set these counts to any desired starting point, in acres.

In accordance with another feature of the invention, the microprocessor is also programmed to selectively de-activate any of the seed sensors 16. For example, when planting end rows of a field, the farmer may wish to use less than all of the seed planting units 14 of the planter 10. Alternatively, should a particular planting unit 14 or its sensor 16 be non-operational, the farmer would wish to exclude that particular unit or seed sensor from the monitor. To do this, the STEP control 88 is depressed to energize a symbol "ROW ON OFF" in the display window 80. In this mode, the SELECT control 92 and "0-9" control 94 are used to sequentially advance the digits 84 from "one" up to the total number of rows or seed planting units 14 on the planter 10. As each number is displayed, the operator may then depress the SELECT control 90 to disable or deactivate the row whose number is currently showing in the display window 80.

The monitor may also be customized for the planter configuration by depressing STEP control 88 to energize a "ROW SPACING" symbol in the display window 80. The operator now utilizes the SELECT control 92 and the "0-9" control 94 in the same fashion as described above to set the display digits 84 to read, in inches, the spacing between rows of seed as planted by the seed planting units 14, which number is set into the microprocessor. The next depression of the STEP push-button 88 will display a "N0. OF ROWS" symbol in the display window 80. The SELECT control 92 and the "0-9" control 94 are then depressed as before to advance the digits 84 until the number or rows or seed planting units 14 of the planter 10 is indicated.

In accordance with yet another feature of a preferred embodiment of invention, the monitor is customized in accordance with the particular distance or ground speed sensor 18 being utilized with the planting machine 14. This is done by further depression of the STEP control 88, to display symbols "DIST", "SET" and "CAL" in window 84. The operator then measures off a 400 foot course and drives the planting machine 10 over this measured course with the distance sensor 18 operating. At the starting point of the measured 400 feet, the operator depresses the SELECT control 90. At the end of the measured 400 foot course, the operator again depresses the SELECT control 90. The microprocessor 34 is programmed to customize the monitor for operation with that particular distance sensor 18 from the foregoing "sample run". This completes the customizing of the monitor for the particular seed planting apparatus 10 with which the monitor of the invention is being utilized.

The novel monitor of the invention also has predetermined limits within which it will accept this set-up or customizing information, for example, the "hi" and "lo" population warning limits must be set to something other than the zero. Typically, distance sensors 18 may comprise either a ground wheel 20 of the type shown in FIG. 1 or a radar unit mounted on the tractor 12 (not shown).

These two types of units both typically produce a given number of pulses per unit distance travelled. Hence, if the number of pulse signals produced during the 400 foot measured course fails to fall within predetermined limits, the distance calibration will be refused by the monitor. Additionally, row spacing must be between 15 and 200 inches and the monitor will not allow a disabling of all rows in the row on/off set-up procedure. If any of these conditions are not met, the front panel displays will all remain blank except for the DATA indication in the bottom display window 50. The rear display panel 47 will display the name or symbol of the item that is not within the proper limits. The monitor will not operate further until the difficulty is corrected. If the operator attempts to run the planter with the monitor on without correcting such conditions, the audible alarm will be caused to sound continuously.

The OPR/SET-UP control 96 may now be moved to its OPR (operate) position and the console may be rotated back to the "front" side 46 (see FIG. 3). The monitor is now ready to begin monitoring of the planting operation. Depressing the function selection controls 54, 56, 58, 60 or 62, will cause display of the values of the selected functions being monitored, as indicated by the energization of corresponding ones of the symbols 66, 68 in the display windows 48, 50.

Referring now to FIG. 3, the control 54 is labeled SCAN-MIN/AVG/MAX. Similar designations are also included in the words or symbols 66 in the display window 48. An initial depression of the control 54 energizes the SCAN symbol in the window 48, whereupon the ROW symbol thereabove will also be displayed and the digits 74 will begin scanning through the rows (i.e., sensor 16) and displaying their numbers, beginning with row one. At the same time, the word POPULATION will be displayed in the window 48 and the digits 70 will display the seed population currently being planted in each of the rows, simultaneously with the display of the number for that row by the digits 74. Each row will be displayed for approximately two seconds in this fashion, before moving on to the next row. These population readings are updated or recalculated by the monitor approximately every 1/200th of an acre for each row.

Another depression of the control 54 causes the monitor to enter into the "MIN/AVG/MAX" mode of operation. In this mode the display digits 70 will display the population readings, in order, for the lowest population row, for the average population of the planting machine as a whole, and for the highest population row currently being planted. The POPULATION symbol and the MIN, AVG and MAX symbols will be displayed accordingly during this display. Also, in conjunction with the display of the highest and lowest populations (and hence the designations MAX and MIN) the display digits 74 will display the number identifying the row in which the highest and lowest populations are being planted and the ROW symbol will be displayed. The push-button control 56 is labeled ROW SELECT and each depression thereof causes the display digits 74 to advance one count, to indicate the number of a row or planting unit 14. The display digits 70 will then show the population reading for the row (i.e. sensor 16) selected in this fashion until the ROW SELECT control 56 is again depressed to select another row for readout. This population reading will be updated every 1/200th of an acre in each row.

The push-button control 60 is labeled FIELD AREA-TOTAL AREA, and the control 62 is labeled SPEED-DISPLAY OFF. These two controls are utilized in conjunction with the bottom display window 50. Depression of the FIELD AREA-TOTAL AREA control 60 causes the character 68 for one of these two symbols to be displayed in the window 50. At the same time the value of accumulated area planted from the selected register is displayed by the digits 78, in acres and tenths of acres. Similarly, depression of the speed control 62 causes the speed of the planter and/or tractor to be displayed by the digits 78 in miles per hour, together with the symbol SPEED. A further depression of the FIELD AREA-TOTAL AREA control 60 will display the accumulated total of other of these two area registers, each being updated or incremented every tenth of an acre covered by the planting machine.

The last push-button control 58 is labeled POP-SPACING, and initial depression thereof causes the population in seeds planted per acre to be displayed in the digit 70 of the window 48, together with the backlighted legend or indicator POPULATION 66. A further depression of the POP-SPACING push-button control 58 causes the spacing, in inches per seed, between seeds planted to be displayed in the digits 70 of the display window 48, together with the legend or label AVG SPACING 66. In conjunction with both the population and the spacing read outs, the scanning feature, or the manual selection feature, chosen by actuation of the push-button controls 54 or 56 is also available, as described above. In other words, the population or seed spacing may be displayed for each row either in a predetermined sequence of scanning through the individual rows, or for one row at a time as selected by the operator. The POP-SPACING push-button control 58 is also utilized in conjunction with others of the controls of the front panel 46 as will be more fully explained herein below.

The monitor is also capable, in accordance with a further feature of the invention, of providing a number of failure or warning indications in the upper display window 48. These failure or warning signals will be displayed whenever the corresponding condition is detected in the seed planter 10, without regard for the function which has been selected for display in the display windows 48 and 50. Specifically, for every 1/200th of an acre travelled, any row filing to plant within the preset high and low population limits will have its row number displayed by the digits 74 of the window 48, together with an appropriate symbol "HI" or "LO", to indicate whether the detected population is above or below the preset limits. If more than one row fails to plant within the preset population limits, the number of each such row will be shown for a predetermined time, consecutively followed by each other such row. At the same time, a symbol "WARNING" will also be energized in the display window 48. If any row or rows falls below a predetermined rate, which in the illustrated embodiment is two seeds per second, that row's number will be displayed by the digits 74, together with a symbol "FAILED" in the display window 48. An audible alarm will also be sounded for this condition. In the same fashion as for the high and low limit warnings, if more than one row has failed in this latter fashion, the display will sequence through to show each failed row by number in the digits 74. This latter type of failure indication "overrides" display of the former, "out of limits" warning. Similarly, should the monitor fail to receive the expected input signal from the distance or ground speed sensor 18, a symbol "PROBLEM" will be energized in the lower display window 50.

In accordance with a further feature of the invention, when the planter 10 is "lifted" at the end of a pass over the field, for example, when turning around at the end of the field, the row failure ("FAILED") indication will be given for all of the rows or planting units 14 of the planter 10. If the tractor is stopped, depression of the ROW SELECT push-button 56 will cause a display, in sequence, of the last population reading taken in each row immediately before the lifting of the planter. The average seed spacing for each row just planted may also be displayed in either the "scan" mode or the "one row at a time" mode by depression of the SCAN control 54 or the ROW SELECT control 56, together with depression of the POP-SPACING push-button control 58. Depression of the SCAN (MIN AVG MAX) control 54 alone will also cause a display of the minimum, average and maximum population figures for the rows just planted. Thus, the operator may use this opportunity to recheck or record the population data at his leisure, while the planter is stopped.

Additionally, should any row fail to plant at the minimum rate, as discussed above, the identifying number of this failed row is retained in memory. Thus, if more than one row is failed in this fashion, all may be displayed. Moreover, the failed rows will continue to be displayed after the planter has stopped, so long as the planter is not lifted or alternatively, when the row failure display given upon lifting of the planter is overriden by depression of one of the functions select push-buttons.

The monitor is also capable of continuing to monitor for row failure (i.e. less than two seeds per second) even if the distance or speed input sensor 18 fails to function. If all of the rows (seed planting units 14) are planting at a rate greater than two seeds per second and no input is being received from the distance sensor 18, the bottom display window 50 will flash the message PROBLEM and SPEED, with a zero being shown for speed by the digits 78. The population display will remain inoperative. If one or more rows fall below the two seeds per second rate, however, the row number or numbers will be sequentially displayed in the digits 74 of the top display window 48 and the failure signal and alarm will be given in normal fashion.

In accordance with a further feature of the invention, the monitor is responsive to lifting and lowering of the planter 10 in accordance with signals from the lift sensor 21, for effectively cutting off all of the other sensors and for cutting the sensors back into operation when the planter is lifted and lowered, respectively. Specifically, all of the registers or memory devices (described hereinbelow) accumulating seed counts from the sensor 16 and distance counts from the sensor 18 are reset to zero approximately five seconds after the lift switch sensor 21 indicates that the planter, having been lifted, has again been lowered into the planting position. By this time, the tractor 12 and planter 10 will be "up to speed" with respect to both the rate of planting of seeds and the desired ground speed of the planter 10. Accordingly, new calculations are delayed for this period to avoid any possible error in calculation caused by readings taken before the planter has come "up to speed".

Figure 5:
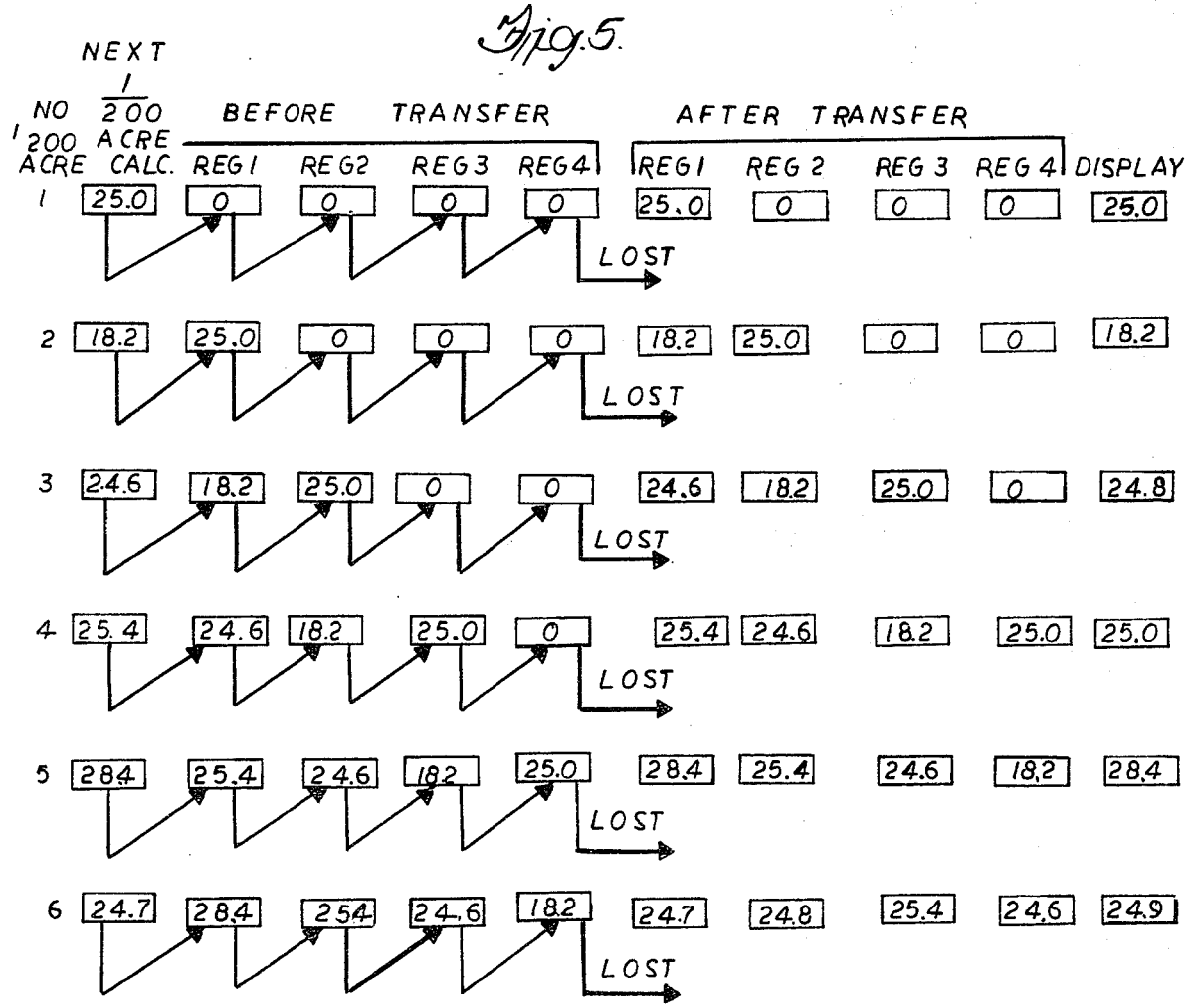
FIG. 5 is a diagram, in tabular form, illustrating one mode of operation of the monitoring apparatus, in accordance with advantageous features of the present invention.

In accordance with another feature of the invention, the microprocessor 34 is programmed to provide an averaging or smoothing function for the population data calculated for each row of the seed planting machine 10. This operation is illustrated in tabular form in FIG. 4. In accordance with the program, the microprocessor operates to "update" or calculate a new seed population figure for each row, for each 1/200 of an acre per row travelled by the planting machine 10, as determined from the distance or ground speed sensor 18 input. Referring to the horizontal lines of boxes of FIG. 5, in the illustrated embodiment, the memory or storage capacity of the microprocessor 34 includes storage space for four such successive population readings or calculations. In the table, the column headed "NO. 1/200 ACRES" gives the sequential number designation of the successive reading; the column headed "NEXT 1/200 ACRE CALC", gives an exemplary population calculation for the acreage increment indicated in the first column. The four storage positions or registers are shown in the columns headed "BEFORE TRANSFER" with their contents before the "NEXT 1/200 ACRE" calculation is entered, and in the columns headed "AFTER TRANSFER" after the "NEXT 1/200 ACRE" calculation has been entered. Finally, the column headed "DISPLAY" shows the value which the microprocessor displays in the digits 70 on the display panel 46. In the illustrated embodiment, the first horizontal line of FIG. 4 shows the first population calculation being taken, at initial start-up of the planter 10. The table of FIG. 4 illustrates the process for a single planting row or planting unit 14, it being recognized that the process is the same for each of the other planting units 14 of the planting machine 10.

Referring now to the first horizontal row of FIG. 4, in the first 1/200 of an acre the microprocessor has calculated a population figure of 25.0. In the illustrated embodiment, the population figures are calculated and displayed in thousands, whereby 25.0 corresponds to a population of 25,000 seeds per acre. Accordingly, the "BEFORE TRANSFER" column in the first horizontal row shows all zeros (0) in the storage positions, or registers ("REG. 1," "REG. 2," etc.). Referring to the "AFTER TRANSFER" column, the microprocessor has entered the value 25.0 in the first storage position or register ("REG. 1"), and, in accordance with the program, the population figure displayed is 25.0, corresponding to the first calculated population measurement. For purposes of illustration, it will be assumed that in this example the high and low limits preset into the microprocessor, as described above, are 22.5 and 27.5 respectively. These figures correspond to 22,500 and 27,500 seeds per acre population.

Referring to the second horizontal row, the microprocessor has calculated the population planted in the second 1/200 of an acre as 18.2 (18,200 seeds per acre). As indicated by the arrows, each number currently in the storage positions or registers is shifted over to the next storage position or register to the right, whereby the registers now contain, as shown in the "AFTER TRANSFER" column, 18.2, 25.0, 0 and 0, reading from left to right. In this case, the display digits 70 will show a population reading of 18.2, the microprocessor being programmed to display any calculation made which is outside of the preset high and low limits. It will be remembered that the right hand display window 50 will also be activated at this time to show the number of this row, and to display symbols indicating that the row is below the preset limit.

Referring now to the third horizontal row of FIG. 4, the third 1/200 of an acre calculation is 24.6. In similar fashion, as indicated by the arrows in the "BEFORE TRANSFER" column, the numbers in the storage positions or registers are all shifted one position to the right, whereby the zero in the right hand column is discarded, resulting as shown in the "AFTER TRANSFER" column, in stored figures of 24.6, 18.2, 25.0 and 0. In accordance with its stored program, the microprocessor will now display, in the digits 70, the average of all readings thus far taken which are within the high and low preset limits, resulting in an average reading of 24.8, as indicated in the "DISPLAY" column.

Referring now to the fourth horizontal row, headed by the numeral 4 in the "NO. 1/200 ACRES" column, the next 1/200 of an acre calculation is 25.4, and is entered into the storage positions or registers in similar fashion. Accordingly, the "AFTER TRANSFER" column now shows that all four of the storage positions, or registers, are filled, and the "DISPLAY" column shows the average figure 25.0, which is displayed on the digital characters 70 of the central display window 52. It will be remembered that this figure 25.0 is the average of all of the figures in the storage register which are within the high and low preset limits. Consequently, the figure 18.2, which is below the preset low limit (22.5) is disregarded for purposes of this average calculation.

Referring now to the next horizontal column, headed by the numeral 5, in the "NO. 1/200 ACRES" column, the next 1/200 of an acre calculation is 28.4. This figure is entered into the storage positions or registers, and the other figures move forward as previously described. It will be noted that the first taken calculation of 25.0 is now discarded from the last or right-hand most storage position, since the four storage positions, or registers, were filled on the previous reading. Since the population figure just calculated, 28.4, is above the preset high limit (27.5) this figure will now be displayed in the digits 70 of the central display window 52, together with the row number and symbol indicating a row exceeding the preset high limit, in the right-hand display window 50.

Referring finally to the last horizontal row, preceded by the numeral 6 in the "NO. 1/200 ACRES" column, the next 1/200 of an acre population calculation is 24.7. This figure is transferred to the first storage register, the other storage figures moving to the right by one position, and the oldest or right-most figure 18.2 being discarded, in the same fashion as described above. Accordingly, the "AFTER TRANSFER COLUMN" shows the contents of the four registers or storage positions as being 24.7, 28.4, 25.4 and 24.6. Accordingly, the average 24.9 is displayed in the digit 70. It will be remembered that this figure 24.9 is the average of the three figures currently stored which are within the preset high and low limits. From the foregoing it will be appreciated that the population displayed will be the average of those figures in the storage positions or registers which are within the high and low preset limits. However, in the case where a new 1/200 of an acre population figure is calculated which is outside of the preset high and low limits, that figure will be displayed for so long as it remains in the first storage position or register.

It will be appreciated that the calculation, storage and averaging process carried out with reference to FIG. 4 is simultaneously carried out for all of the planting units 14 of the multi-row seed planting machine 10. Accordingly, the display figures for all rows are available upon command from the operator control panel 46, selecting a particular row to be displayed, or calling for the microprocessor 34 to automatically scan through the rows, as described above.

Figure 6B:
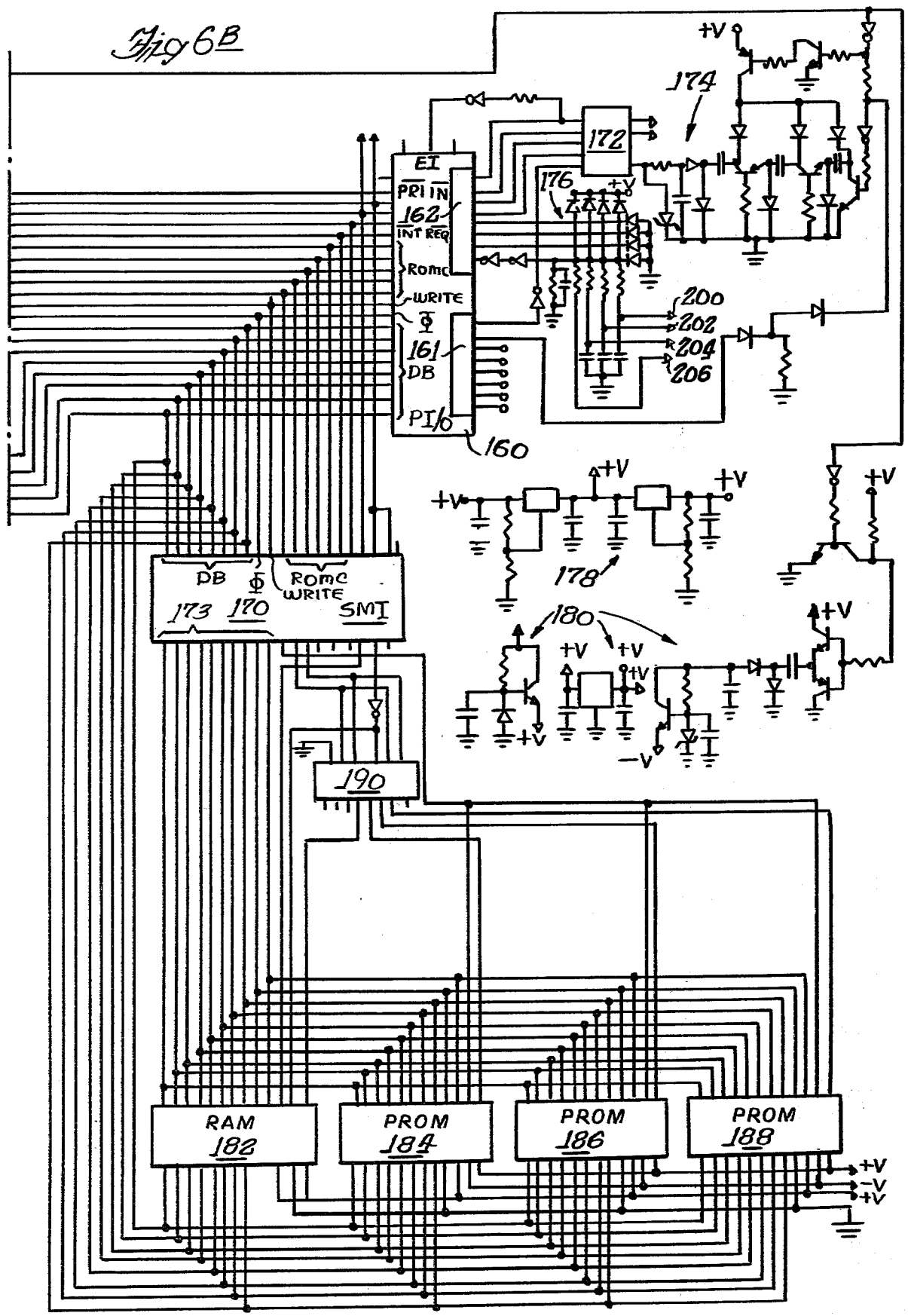

Referring now to FIGS. 6A and 6B, the circuits designated generally by the reference numeral 23 in FIG. 2 are illustrated in detail. The lines 22 from the seed sensors 16 each feed one input terminal of a microcomputer device 100, and a similar microcomputers device 110. These microcomputers, in the illustrated embodiment, are of the type generally designated 3870 and known as F8-type single chip microcomputers.

In the illustrated embodiment, sufficient capacity is provided by microcomputers 100 and 110 for receiving 32 such seed sensor input lines 22. Each of these lines 22 is also provided with a suitable pull-up resistor designated generally 102, a suitable current limiting series connected resistor, designated generally 104, and a suitable buffer designated generally 106.

The lines 38 from the apparatus 36, (which may be, for example, a feedback-type control for varying the planting rate of the planting units 14) as well as inputs 18a and 21a from the distance sensor device 18 and lift sensor 21, each feed one terminal of a further similar microcomputer device 120. In the illustrated embodiment, the microcomputer 120 is also of the type designated 3870. Each of the lines 38 and lines 22 from distance sensor 18 and lift sensor 21 is provided with a suitable pull-up resistor designated generally 112 and a series-connected resistor 114. Each of the series-connected resistors 114 feeds one input of one of three two-input NOR gates 116, 119 and 118 whose outputs in turn feed a first port 121 of the microcomputer 120. Two inputs, 18a and 18b, are provided for the two possible types of distance sensors discussed briefly above, i.e. input 18a is for a "ground wheel" type of sensor 20 illustrated in FIG. 1 and input 18b is for a "radar" type of sensor.

The input line from the resistor 114 associated with the lift sensor 21 feeds one input of a two-input NOR gate 122 whose output feeds one input of a further two-input NOR gate 124. This NOR gate feeds one terminal of a port 131 of a further microcomputer element 130, which in the illustrated embodiment is a central processing unit (CPU) of the type generally designated 3850. The resistor 114 from inputs 18a and 18b also feeds one input of a two-input NOR gate 126 whose opposite input is fed from the output of the NOR gate 122 and whose output feeds one input of a further two-input NOR gate 128, whose output feeds a remaining terminal in the port 121 of microcomputer 120. The remaining inputs of NOR gates 116, 118, 119, 122, 124 and 128 are all fed in common from the output of a NOR gate 132, both of whose inputs are fed from a further terminal in the port 131 of CPU 130. This same terminal also feeds one input of a two-input NOR gate 134 whose output feeds a control terminal on each of the NOR gates 116, 118, 119, 122, 124 and 126. The remaining input of NOR gate 134 is fed from a terminal in the port 107 of the microcomputer 100.

The microprocessors 100 and 120 each have four, similar eight-bit input/output (I/O) ports, labeled respectively, 101, 103, 105 and 107, and 121, 123, 125 and 127. The respective terminals of the ports 105 and 125 and of ports 107 and 127 are directly interconnected. Similarly, the terminals of port 123 are directly interconnected with similar terminals of an eight bit I/O port 133 of the CPU 130. In similar fashion, a further microcomputer element 140 is provided having four eight-bit ports 141, 143, 145 and 147. In the illustrated embodiment this microcomputer 140 is also a single-chip microcomputer element of the type generally designated 3870. The port 145 has its terminals directly interconnected with the terminals of the port 115 of microcomputer 110, and similarly, the port 127 has its terminals directly interconnected with the similar terminals in the port 117 of microcomputer 110. The port 143 has its terminals directly interconnected with like terminals of the port 133 of CPU 130, as indicated by the bracket "to 133".

Suitable external control elements and signals, including suitable timing elements are provided for the microprocessor or microcomputer components 100, 110, 120, 130 and 140 in accordance with conventional practice and need not be described in detail herein, but are illustrated in FIG. 6A. The microcomputer control terminals are similarly labeled with their conventional designations, as is known in the art, and as are readily ascertainable from reference to publications regarding the above-identified microcomputer elements. Briefly, a main timing control is provided by an oscillator circuit including a four megahertz crystal element 150. A suitable counter 151 is interposed between this oscillator and timing control input of the CPU 130. The oscillator also feeds the suitable control terminals of the other microcomputer devices 100, 110, 120 and 140, by way of suitable buffer elements. Suitable biasing and control voltages are also provided to other control terminals of these microprocessor elements.

The CPU 130 also includes an eight-bit data bus (DB) for bi-directional transfer of data between the CPU 130 and remaining components of FIG. 6B. Other control terminals of the CPU 130 are designated in FIG. 6A by their customary symbols as are well known in the art. All of these data bus (DB) terminals and other control terminals of the CPU 130 are joined with like-designated terminals of a pair of input/output devices 160 and 170, seen in FIG. 6B. In the illustrated embodiment, the device 160 is a peripheral input/output (PI/O) of the type generally designated 3871 of the F8 family of microprocessor devices, while the device 170 is a static memory interface (SMI) of the type generally designated 3853 and also of the F8 microprocessor family of devices. Both of these devices 160 and 170 are well known in the art and require no further explanation as to their structure or mode of operation. These devices 160 and 170 act as interfaces between the CPU 130 and external control lines and memory storage devices, respectively.

The PI/O 160 has a pair of input/output (I/O) ports 161 and 162. The port 162 interfaces with a constant memory storage which takes the form of an electrically alterable read only memory (EAROM) 172. This EAROM 172, in the illustrated embodiment, is of the type generally designated MC7033 and is a 21 word by 16 bit electrically alterable nonvolatile memory, of a type generally known in the art. A suitable power supply therefor is designated generally by the reference numeral 174 and is fed from a suitable source of positive voltage, and a further control terminal fed from the I/O port 161, in conventional fashion, whereby these components need not be described in detail, but are fully illustrated in FIG. 6B.

Advantageously, provision of the EAROM 172, as described, for storing the constants allows the customizing or programming operation described above to remain effective over a considerable period of time, even when the monitor and associated planting machine are not in use and not provided with any source of power. Briefly, the constants referred to are those described above with respect to the customizing or "set-up" operation of the present invention. These constants, for example, include the "high" and "lo" warning settings, the field area, total area and distance sensor calibirations, the number or rows and row spacing settings. This EAROM 172 is advantageously capable of storing or maintaining these constants without power for a considerable period of time, thereby maintaining the customizing of the monitor of the invention for later use, for example, the following season, with the same planter 10, without the necessity of the operator repeating the set-up procedure described above.

The I/O port 162 also receives suitable input signals indicating the depression or actuation of any of the control switches shown on the control panels of FIGS. 3 and 4. These inputs are received in serial fashion to port 162 of the PI/O 160 from inputs 200, 202, 204 and 206, which are fed from like numbered lines in FIG. 7A, as described below. Suitable biasing potentials are applied to port 162 from a four-by-four grid or matrix designated generally 176. The PI/O 160 and the CPU 130 are programmed to recognize the serial data at port 162 as corresponding to actuation of a particular one or ones of these control switches.

Lines 200, 202, 204 and 206 also emanate from this matrix 176 and feed the necessary data for driving the displays shown in FIGS. 3 and 4, by way of the display interface and driving circuit to be discussed with reference to FIGS. 7A and 7B.

Conventional power supplies for providing various positive and negative regulated voltages for the circuits of the invention are designated generally by the reference numerals 178 and 180, and, as they are fully conventional in nature and fully illustrated in FIG. 6B need not be described in detail.

Suitable memory capacity for storing both a suitable program for operating the microcomputer elements of FIG. 6A, as well as for storing the readings from the various sensors associated with the monitor of the invention as described above, are addressed by the SMI 170. These memory devices include a random access memory (RAM) 182, and three programmable read only memories (PROM) 184, 186 and 188. The memories 182, 184, 186 and 188 are all addressed from the SMI 170 by way of conventional address lines, designated generally 173, while the chip select lines of each memory element are addressed from the SMI 170 by way of a suitable decoder/demultiplexer 190, which in the illustrated embodiment is an integrated circuit component of the type generally designated 74LS139.

Figure 7A:
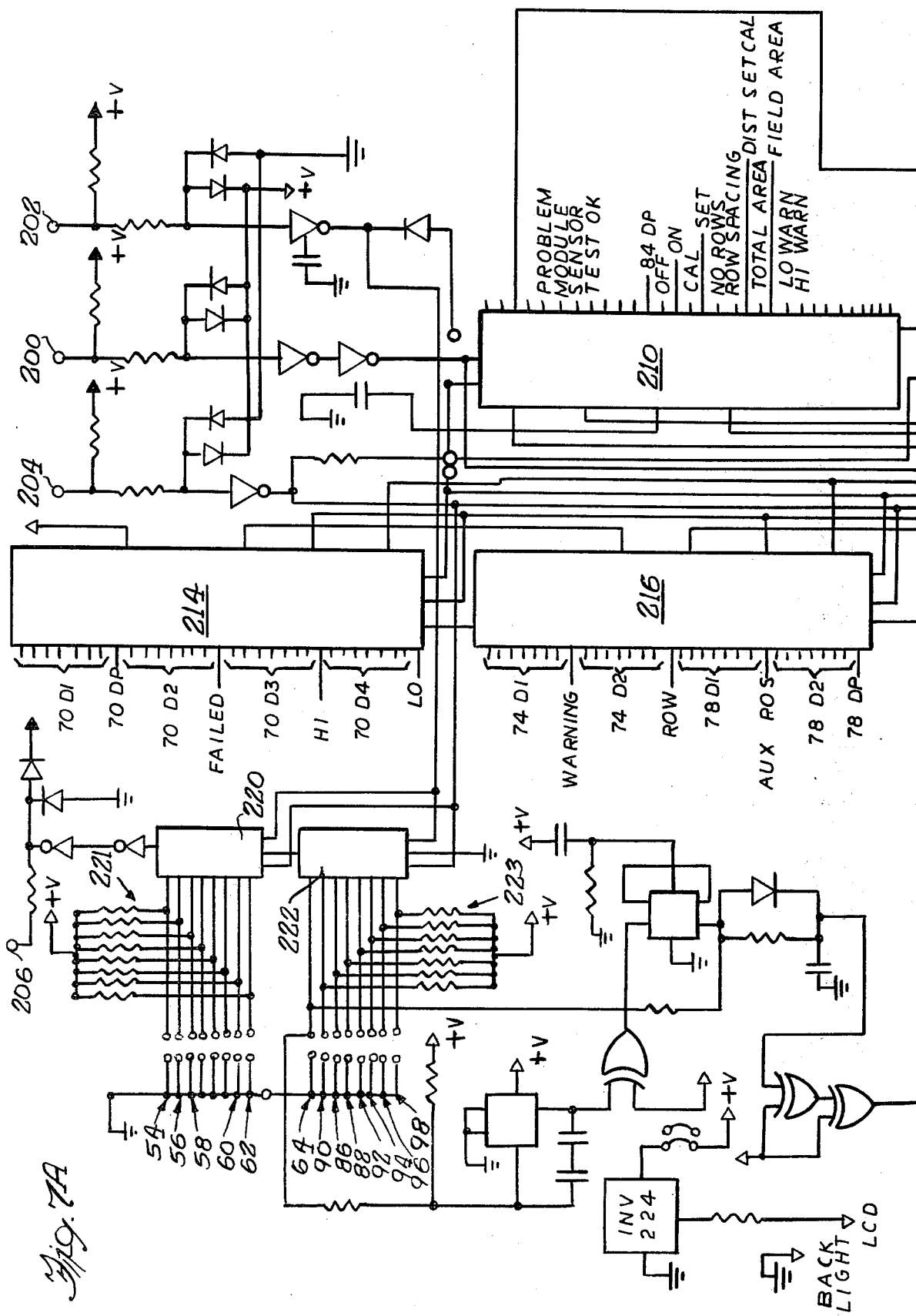
FIGS. 7A and 7B, taken together form a schematic circuit diagram illustrating a further portion of monitoring apparatus of FIG. 2 in additional detail.
Figure 7B:
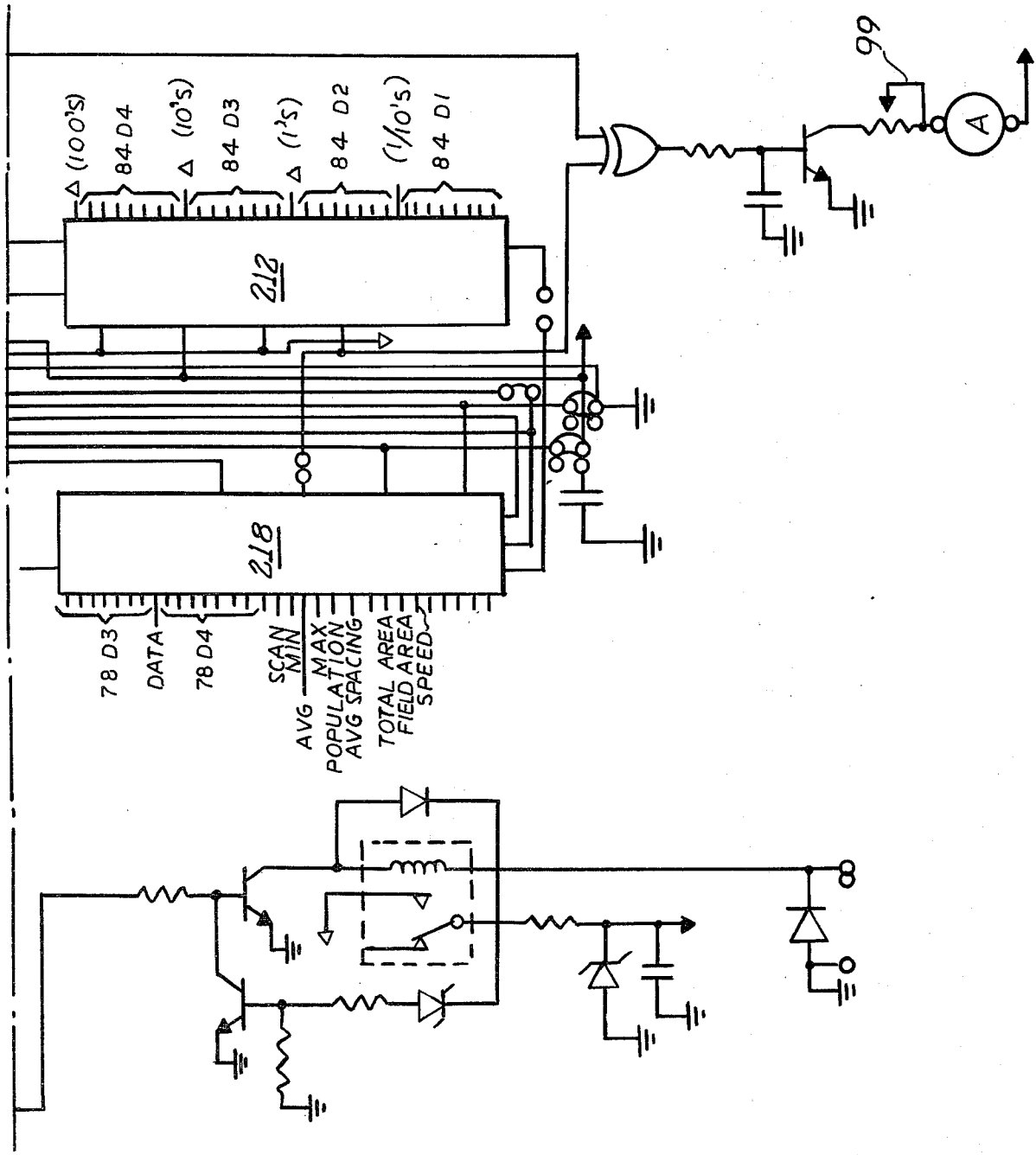

Reference is next invited to FIG. 7A and 7B which illustrates the display and control panel driving and interface circuits 44 of FIG. 2. The main components of these display driver circuits comprise five similar integrated circuit liquid crystal display driver components designated by the reference numerals 210, 212, 214, 216, and 218. In the illustrated embodiment, these liquid crystal display (LCD) drivers are serial input drivers of the type generally designated HLCD 0438, available for example from Engineering Services Company, of St. Louis, Missouri. Briefly, these drivers are especially adapted to drive LCD dispaly elements under control of a microprocessor, each acting as a "smart" peripheral capable of driving up to 32 LCD segments. Due to the serial input construction of these components, only three control lines are required from the microcomputer, namely: a data input line, a clock control line and a load control line.

The data input line is received from the terminal 202 of FIG. 6B, while the clock and load control lines are received from the respective terminals 200 and 204 thereof. An additional read control line runs between the circuits of FIGS. 7A and 7B and joins the terminal 206 in each circuit.

The display driver element 214 drives the segments of the four digits and decimal point designated generally 70 in the display window of FIG. 3, together with the FAILED, HI and LO symbols in that window. Hence, the terminals of driver 214 are designated by the like names and by the reference numerals 70 DO, 70 DP, etc. In similar fashion, the display driver component 216 drives the segments of digits 74, at terminals designated 74 D1 and 74 D2, and the segments of the first two of the digits 78, at terminals designated 78 D1, 78 D2, and the decimal point of the digits 78, designated 78 DP. The display driver 216 also drives the symbols WARNING, ROW, AUX POS, in the display window 48. In similar fashion, the display characters and symbols energized by the various output lines of the LCD display drivers 210, 212 and 218 are indicated in FIGS. 7A and 7B.

The push-button control switches of the display and control panels 46 and 47 of FIGS. 3 and 4 are connected with the respective inputs of a pair of eight-stage static shift registers 220 and 222, which in the illustrated embodiment are integrated circuit components of the type generally designated CD4021. The corresponding number of each of these control buttons is repeated adjacent the terminals it controls in FIG. 7A. Each of these push-button switches is provided with a suitable pull-up resistor, as designated generally by reference numerals 221 and 223. The outputs of these shift registers 220 and 222 feed serial data corresponding to control push-button switch closures through the line 206 to the like-numbered serial data input line 206 on FIG. 6B.

The remaining circuits of FIGS. 7A and 7B provide suitable power supply and logic control for the display driving circuits 210–218 inclusive, and are conventional in their operation. The alarm volume potentionmeter 99 and alarm A, which is an audible alarm in the illustrated embodiment, are shown in the upper right-hand portion of FIG. 7B. The remaining circuits are of a conventional nature known to those skilled in the art, and require no further explanation here.

In the illustrated embodiment, it will be noted that the windows or display panels 48, 50 and 80 comprise backlighted liquid crystal display panels, whereby energization of the various symbols and digital segments thereon causes a dark display against a light background. A suitable inverter power supply 224 is provided for energizing electro-luminescent panels (no shown) for the purpose of back-lighting the display panels 48, 50 and 80.

For purposes of fully describing a specific embodiment of the invention, the following pages include an exemplary program for the microprocessor of this invention. This program is reproduced as a source statement including Mnemonic, Operand and comments as appropriate.

```
                              0001           TITLE 'ALLROUND CONVENIENCE CHIP'
                              0002  *              PERIPHERAL PLANTER PROCESSOR
                              0003  *
                              0004  *
                              0005  *
                              0006  *              EXTRA OUTS4 FOR DIV2
                              0007  *        LINE STATUS CHECK
                              0008  *
                              0009  *
    0000 70                   0010           CLR
    0001 B0                   0011           OUTS    0          CLR ALL PORTS
    0002 B1                   0012           OUTS    1
    0003 B4                   0013           OUTS    4
    0004 B5                   0014           OUTS    5
    0005 B6                   0015           OUTS    6
    0006 B7                   0016           OUTS    7
                              0017  *
    0007 203F                 0018           LI      0'77'
    0009 50                   0019           LR      0,A
    000A 40                   0020   RES1    LR      A,0
    000B 0B                   0021           LR      IS,A
    000C 70                   0022           CLR
    000D 5C                   0023           LR      S,A
    000E 30                   0024           DS      0
    000F 94FA      000A       0025           BNZ     RES1
    0011 A5                   0026           INS     5
    0012 2103                 0027           NI      3
    0014 2303                 0028           XI      3
    0016 9404      001B       0029           BNZ     VICS
U   0018 290000    0000       0030           JMP     PRUR
U   001B 29026E    026E       0031   VICS    JMP     ACK
                              0032  *
                              0033           ORG     H'20'
    0020 04                   0034           LR      KU,A       SAVE ACC & STATUS
    0021 1E                   0035           LR      J,W
    0022 A5                   0036           INS     5          ARE WE IN BOB'S PROGRAM
    0023 2101                 0037           NI      H'01'
    0025 8404      002A       0038           BZ      SFLOW      JMP IF IN SEED-FLOW PROG
U   0027 290000    0000       0039           JMP     BOBS
                              0040  *
                              0041  *
                              0184  *
                              0185  *
                              0186  *
                              0187  *        EXTERNAL INTERRUPT
                              0188  *
                              0189  *
                              0190           ORG     H'A0'
    00A0 04                   0191           LR      KU,A       ACC SAVED
    00A1 1E                   0192           LR      J,W        STATUS SAVED
    00A2 0D                   0193           LR      P0,Q
    00A3 0A                   0194   CLE     LR      A,IS
    00A4 05                   0195           LR      KL,A       ISAR SAVED
    00A5 A4                   0196           INS     4          READ PORT 4
    00A6 57                   0197           LR      7,A        STORE PORT 4 IN R 7
    00A7 2080                 0198           LI      H'80'      PREP TO MASK FOR BIT 7
    00A9 F7                   0199           NS      7          BIT 7 MASK FOR
    00AA 943E     00E9        0200           BNZ     LLEV       LEVEL OF INPUT LINE ASK FOR
    00AC 47                   0201           LR      A,7        PORT 4 STORED TO ACC
    00AD 213F                 0202           NI      H'3F'      BITS 0-5 MASKED FOR
    00AF 2410                 0203           AI      0'20'      AD 0'20' TO COMPUTE ISAR LOC
    00B1 0B                   0204           LR      IS,A       ISAR NOW POINTING TO REGS
    00B2 4C                   0205           LR      A,S        DESIRED COUNT LOADED TO ACC
    00B3 B4                   0206           OUTS    4          OUTPUT DESIRED CNT
    00B4 2040                 0207           LI      H'40'      PREP MASK FOR REGS RES INFO
    00B6 F7                   0208           NS      7          BIT 7 MASKED FOR
    00B7 8403     00BB        0209           BZ      CHIC       JMP IF REGS IS NOT TO BE RESET
    00B9 70                   0210           CLR                CLEAR ACC
    00BA 5C                   0211           LR      S,A        RESET REGISTER
```

```
00BB A6              0212 CHIC  INS   6       PREP TO CHECK EXT INT LINE
                     0213 *                     WAIT FOR IT TO GO HI
00BC 84FE     00BB   0214       BZ    CHIC
00BE 71              0215       LIS   1       DID MAIN ASK FOR C1
00BF F7              0216       NS    7
00C0 8412     00D3   0217       BZ    DONO    JMP IF C0 WAS REQUESTED
00C2 4E              0218       LR    A,D     DUMMY INST TO DEC ISAR
                     0219 *                     ISAR => AT C0
00C3 4C              0220       LR    A,S
00C4 B4              0221       OUTS  4       C0 GIVEN TO MAIN
00C5 2040            0222       LI    H'40'   PREP MASK FOR REGS RESET
                     0223 *                     INFO
00C7 F7              0224       NS    7       BIT 6 MASK FOR
00C8 8403     00CC   0225       BZ    CHIR
00CA 70              0226       CLR
00CB 5C              0227       LR    S,A     REGISTER RESET
00CC A6              0228 CHIR  INS   6       WAIT FOR MAIN TO SIGNAL
00CD 91FE     00CC   0229       BM    CHIR
00CF 70              0230       CLR           CLR INTERRUPT CONT PORT
                     0231 *                     SO THAT THE LAST TRANSITI
                     0232 *                     OF INT. LINE WON'T CAUSE
                     0233 *                     AN INTERRUPT
00D0 B6              0234       OUTS  6
00D1 71              0235       LIS   1       ENABLE INTERRUPTS AGAIN
00D2 B6              0236       OUTS  6
00D3 70              0237 DONO  CLR
00D4 B4              0238       OUTS  4
00D5 B5              0239       OUTS  5
00D6 01              0240       LR    A,KL
00D7 0B              0241       LR    IS,A
00D8 1D              0242       LR    W,J     RESTORE ISAR, ACC & STATUS
00D9 00              0243       LR    A,KU
00DA 1B              0244       EI
00DB 1C              0245       POP           RETURN FROM SUBROUTINE
                     0246 *
                     0247 *
00DC 67              0248 SGOT  LISU  7
00DD 6F              0249       LISL  7       IS THIS A DIV2 ACK
00DE 70              0250       CLR
00DF EC              0251       XS    S
00E0 9403     00E4   0252       BNZ   CHIN    JMP IF NOT DIV2 ACK
00E2 71              0253       LIS   1
00E3 B5              0254       OUTS  5       SIGNAL SEED ACK THAT
                     0255 *                     LINE LEVEL IS NOT
                     0256 *                     SITTING ON PORT 4 BIT 0
                     0257 *
                     0258 *
00E4 A6              0259 CHIN  INS   6       CK EXT INT LINE
00E5 84FE     00E4   0260       BZ    CHIN    LOOP UNTIL EXT INT RESET
00E7 90EB     00D3   0261       BR    DONO    ALL DONE GET OUT
                     0262 *
                     0263 *
                     0264 *
                     0265 *
                     0266 *     USED IN DIV2 ACK PROGRAM
                     0267 *
                     0268 *
00E9 2020            0269 LLEV  LI    H'20'   IS MAIN ASKING FOR DIV2
                     0270 *                     LINE LEVEL
00EB F7              0271       NS    7
00EC 8413     0100   0272       BZ    INPUT   JMP IF MAIN IS ASKING FOR
                     0273 *                     LEVEL OF SEED COLLECTION
                     0274 *                     ACK LINE
00EE 208F            0275       LI    H'8F'
00F0 F7              0276       NS    7       SEND CODE TO DIV2 ACK
00F1 B0              0277       OUTS  0
                     0278 *
                     0279 *
                     0280 *
00F2 70              0281       CLR
00F3 B4              0282       OUTS  4       EXTRA OUTS FOR DIV2
                     0283 *                     TO GET EXTRA STROBE
                     0284 *                     TO LET THE MAIN KNOW INFO
                     0285 *                     HAS BEEN RECEIVED
                     0286 *
```

```
00F4 A6              0287  NEW     INS   6         WAIT FOR EXT INT LINE TO
                     0288  *                         GO HIGH -- INDICATING
                     0289  *                         THAT THE MAIN HAS INTERRUPT
                     0290  *                         THE DIV2 ACK
00F5 84FE   00F4     0291          BZ    NEW
                     0292  *
                     0293  *
                     0294  *
00F7 A1              0295  DIV     INS   1
00F8 84FE   00F7     0296          BZ    DIV       WAIT FOR DIV2 ACK TO
                     0297  *                         SEND LEVEL OF LINE
00FA 70              0298          CLR
00FB B0              0299          OUTS  0         PREP TO READ LEVEL
00FC A0              0300          INS   0         LINE LEVEL HAS BEEN RECEIVE
00FD B4              0301          OUTS  4         GIVE TO THE MAIN OUT
                     0302  *                         OF PORT 4
00FE 90CD   00CC     0303          BR    CHIR      GO WAIT FOR HANDSHAKE
                     0304  *
                     0305  *
                     0306  *       GO WAIT FOR MAIN TO PULL EXT INT LINE
                     0307  *       LOW AGAIN -- INDICATING ACK CAN GO ON
                     0308  *
                     0309  *
0100 201F            0310  INPUT   LI    H'1F'     PREP TO RID OF BITS 5,6&7
0102 F7              0311          NS    7         INPUT LINE # NOW VALID
0103 57              0312          LR    7,A       RESTORE IN R 7
0104 20F0            0313          LI    H'F0'     PREP TO -16 FROM ROW #
0106 C7              0314          AS    7         ROW # -16
0107 9211   0119     0315          BNC   NIP5      JMP IF NOT PORT 5
0109 57              0316          LR    7,A       SAVE REMAINDER
010A 74              0317          LIS   H'04'     LD MASK CODE FOR BIT 2 (IN 17)
010B 58              0318          LR    8,A       MASK CODE STORED IN R 8
010C 70              0319  NGOT    CLR             GET LINE # INTO ACC WITH
010D C7              0320          AS    7         STAT REGS ACTIVE BY ADDING 0
010E 8407   0116     0321          BZ    GOT       MASK CODE FOUND EXIT
0110 37              0322          DS    7         MASK CODE INCORRECT - TRY
                     0323  *                         NEXT POSITION
0111 48              0324          LR    A,8       PREP TO SHIFT MASK CODE TO
                     0325  *                         NEXT POSITION
0112 13              0326          SL    1         MASK CODE SHIFTED NEXT POS
0113 58              0327          LR    8,A       STORE MASK CODE
0114 90F7   010C     0328          BR    NGOT      GO TRY AGAIN
0116 A5              0329  GOT     INS   5         READ PORT 5
0117 9014   012C     0330          BR    FISH
0119 20F8            0331  NIP5    LI    H'F8'     PREP TO -8 FROM ROW #
011B C7              0332          AS    7         ROW # -8
011C 9216   0133     0333          BNC   NIP1      JMP IF NOT TO PORT 1
011E 57              0334          LR    7,A       SAVE REMAINDER
011F 71              0335          LIS   H'01'     LD MASK CODE FOR BIT 0 (INPUT
0120 58              0336          LR    8,A       MASK CODE STORED IN R 8
0121 70              0337  NGOS    CLR             GET LINE # INTO ACC WITH
0122 C7              0338          AS    7         STAT REGS ACTIVE BY ADDING 0
0123 8407   012B     0339          BZ    GOS       MASK CODE FOUND EXIT
0125 37              0340          DS    7         MASK CODE INCORRECT - TRY
                     0341  *                         NEXT POSITION
0126 48              0342          LR    A,8       PREP TO SHIFT MASK BIT TO
                     0343  *                         NEXT POSITION
0127 13              0344          SL    1         MASK CODE SHIFTED NEXT POS
0128 58              0345          LR    8,A       STORE MASK CODE
0129 90F7   0121     0346          BR    NGOS      GO TRY AGAIN
012B A1              0347  GOS     INS   1         READ PORT 4
012C F8              0348  FISH    NS    8         MASK FOR SELECTED INPUT LINE
012D 8402   0130     0349          BZ    LINE      IF LINE IS LO OUTPUT A
                     0350  *                         LOW
012F 71              0351          LIS   1         IF HI OUTPUT A HI
0130 B4              0352  LINE    OUTS  4         SEND TO COMMUNICATION BUS
0131 90AA   00DC     0353          BR    SGOT      GO WAIT FOR HANDSHAKE
0133 71              0354  NIP1    LIS   H'01'     LD MASK CODE FOR BIT 0 (INPUT
0134 58              0355          LR    8,A       MASK CODE STORED IN R 8
0135 70              0356  NGOR    CLR             GET LINE # INTO ACC WITH
0136 C7              0357          AS    7         STAT REGS ACTIVE BY ADDING 0
0137 8407   013F     0358          BZ    GOR       MASK CODE FOUND EXIT
0139 37              0359          DS    7         MASK CODE NOT CORRECT - TRY
                     0360  *                         NEXT POSITION
013A 48              0361          LR    A,8       PREP TO SHIFT MASK BIT TO
                     0362  *                         NEXT POSITION
```

```
013B 13        0363            SL      1          MASK CODE SHIFTED NEXT POS
013C 58        0364            LR      S,A        STORE MASK CODE
013D 90F7 0135 0365            BR      NGOR       GO TRY AGAIN
013F A0        0366   GOR      INS     0          READ PORT 0
0140 90EB 012C 0367            BR      FISH
               0368   *
               0369   *
               0370   *        TIMER INTERRUPT CON'T
               0371   *
               0702   *
026E 67        0703   ACK      LISU    7
026F 6F        0704            LISL    7
0270 A5        0705            INS     5
0271 5C        0706            LR      S,A
0272 2103      0707            NI      H'03'      MODE BITS 0&1 MASKED*
               0708   *                           FOR
0274 2302      0709            XI      H'02'      X-OR WITH SEED FLOW CODE
0276 9414 028B 0710            BNZ     SARA       JMP IF NOT SEED FLOW
0278 2014      0711            LI      H'14'
027A 55        0712            LR      5,A        SCAN TIMER
027B 56        0713            LR      6,A        & RATE SET TIMER
               0714   *                           INITALLY SET FOR 1/2 SEC
027C 67        0715            LISU    7
027D 6D        0716            LISL    5          ROW FAIL SHIFT REGS SET
027E 71        0717            LIS     1          UP TO TEST ROW 1 FIRST
027F 5D        0718            LR      I,A
0280 70        0719            CLR                H'00' LOAD IN ACC
0281 5D        0720            LR      I,A        DUMMY INST TO INC ISAR
0282 5C        0721            LR      S,A        RESET R 77
0283 20EA      0722            LI      H'EA'      EXT INT DISABLED, TIMER *
               0723   *                           INT ENABLED, 1--0 EXT INT
0285 B6        0724            OUTS    6          ACTIVE LEVEL, START
               0725   *                           SELECT INTERVAL TIMER,*
               0726   *                           PRESCALE DIVIDE BY 200
0286 20FA      0727            LI      H'FA'      SET UP TIMER FOR 25 MS.
0288 B7        0728            OUTS    7
               0729   *
0289 9012 029C 0730            BR      FIRST      GO RESET ALL X-OR STORAGE
               0731   *                           REGI
               0732   *
               0733   *
               0734   *
               0735   *
028B 71        0736   SARA     LIS     H'01'      DISABLE TIMER AND CLOCK,
               0737   *                           ENABLE EXT INT 1--0 ACTIVE
028C B6        0738            OUTS    6          EXT INT ENABLED
028D 70        0739            CLR
028E EC        0740            XS      S          TEST FOR DIVIDE BR 2 ACK 0
               0741   *                           SEED COLLECTION ACK
028F 9408 0298 0742            BNZ     SEEDK      BRANCH IF SEED ACK
0291 2A0318 0318 0743          DCI     DIV2       SET DCI ---> DIVIDE BY EXT
0294 0E        0744            LR      Q,DC
               0745   *                           INT ROUTINE
0295 290336 0336 0746          JMP     DIVBY      GO DIVIDE SEED PULSES *
0298 2A00A3 00A3 0747 SEEDK    DCI     CLE        SET DCI ---> SEED EXT INT R
029B 0E        0748            LR      Q,DC
029C 20FF      0749   FIRST    LI      H'FF'
029E 52        0750            LR      2,A        STORE H'FF' IN ALL
029F 54        0751            LR      4,A        X-OR STORAGE REGISTE
02A0 56        0752            LR      6,A
               0753   *
               0754   *
               0755   *        PORT 0 PROCESSING
               0756   *
02A1 62        0757   PP0      LISU    2          PORT 0 PROCESSING
02A2 68        0758            LISL    0          ISAR => C0 ROW 1 CNTER
02A3 A0        0759            INS     0          READ PORT 0 (INPUTS 1-8)
02A4 50        0760            LR      0,A        STORE PORT 0 INFO IN REG 0
02A5 E1        0761            XS      1          X-OR WITH PREV STAT REG 1
02A6 18        0762            COM
02A7 F2        0763            NS      2          TO GET OR FUNCTION
02A8 18        0764            COM
02A9 52        0765            LR      2,A        STORE 'X OR' IN REG 2
02AA 71        0766   MOPUP    LIS     H'01'      PREPARE TO MASK FOR BIT "0"
```

```
02AB F2         0767         NS      2         BIT 0 MASKED FOR
02AC CC         0768         AS      S         ADD 'X OR' BIT TO ROW CNT
02AD 5D         0769         LR      I,A       PUT SUM BACK IN ROW COUNTER
02AE 4C         0770         LR      A,S       C1 TO ACC
02AF 19         0771         LNK               ADD ANY POSIBLE CARRY
02B0 5D         0772         LR      I,A       PUT SUM BACK IN ROW CNT
02B1 42         0773         LR      A,2       PREP TO SHIFT 'XOR' NEXT ROW
02B2 12         0774         SR      1         SHIFT RIGHT 1
02B3 52         0775         LR      2,A       RESTORE REMAINING 'X OR'
02B4 8409  02BE 0776         BZ      EXL1      EXIT LOOP IF DONE
02B6 0A         0777         LR      A,IS
02B7 2107       0778         NI      H'07'     CHECK FOR ISAR ROLLOVER
02B9 94F0  02AA 0779         BNZ     MOPUP
02BB 63         0780         LISU    3         PREP TO ADD SEED LINES
                0781 *                         5 THRU 8
02BC 90ED  02AA 0782         BR      MOPUP     DO NEXT ROW
02BE 40         0783 EXL1    LR      A,0
02BF 51         0784         LR      1,A
02C0 A0         0785         INS     0         EXTRA PORT 0 READING
02C1 E1         0786         XS      1            PROCESSED
02C2 18         0787         COM
02C3 52         0788         LR      2,A
                0789 *
                0790 *       PORT 1 PROCESSING
                0791 *
02C4 64         0792         LISU    4         PORT 1 PROCESSING
02C5 68         0793         LISL    0         ISAR = TO C0 INPUT 9 CNT
02C6 A1         0794         INS     1         READ PORT 1 (INPUTS 9 - 16)
02C7 50         0795         LR      0,A       STORE PORT 1 INFO IN R 0
02C8 E3         0796         XS      3         X-OR WITH PREV STATUS R 3
02C9 18         0797         COM
02CA F4         0798         NS      4         TO GET OR FUNCTION
02CB 18         0799         COM
02CC 54         0800         LR      4,A       STORE 'X OR' IN R 2
02CD 71         0801 MUPOP   LIS     H'01'     PREP TO MASK FOR BIT "0"
02CE F4         0802         NS      4         BIT "0" MASKED FOR
02CF CC         0803         AS      S         ADD 'X OR' BIT TO ROW CNT
02D0 5D         0804         LR      I,A       PUT SUM BACK IN ROW COUNTER
02D1 4C         0805         LR      A,S       C1 TO ACC
02D2 19         0806         LNK               ADD ANY POSSIBLE CARRY
02D3 5D         0807         LR      I,A       PUT SUM BACK IN ROW CNT
02D4 44         0808         LR      A,4       PREP SHIFT 'X OR' NEXT ROW
02D5 12         0809         SR      1         SHIFT RIGHT 1
02D6 54         0810         LR      4,A       RESTORE REMAINING 'X OR'
02D7 8409  02E1 0811         BZ      EXL2      EXIT LOOP IF DONE
02D9 0A         0812         LR      A,IS
02DA 2107       0813         NI      H'07'     CHECK FOR ISAR ROLLOVER
02DC 94F0  02CD 0814         BNZ     MUPOP
02DE 65         0815         LISU    5         PREP TO DO SEED LINES
                0816 *                         13 THRU 16
02DF 90ED  02CD 0817         BR      MUPOP     DO NEXT ROW
02E1 40         0818 EXL2    LR      A,0       PRES READING TO ACC
02E2 53         0819         LR      3,A       UP-DATE PREV STAT STORAGE
02E3 A1         0820         INS     1
02E4 E3         0821         XS      3         EXTRA PORT 1 PROCESSING
02E5 18         0822         COM
02E6 54         0823         LR      4,A
02E7 A5         0824         INS     5         PREP TO CHK IF SEED FLOW
02E8 2103       0825         NI      H'03'     BITS 0&1 MASKED FOR
02EA 2302       0826         XI      H'02'     X-OR WITH SEED FLOW MODE DECOD
02EC 8428  0315 0827         BZ      INTER     IF SEED FLOW DON'T PROCESS
                0828 *                         PORT 5
                0829 *
                0830 *       PORT 5 PROCESSING
                0831 *
02EE 66         0832         LISU    6         PORT 5 PROCESSING
02EF 68         0833         LISL    0         ISAR PNT TO C0 INPUT 17 CNT
02F0 A5         0834         INS     5         READ PORT 5 (INPUTS 17-22)
02F1 12         0835         SR      1
02F2 12         0836         SR      1         SHIFT TO EXCLUDE MODE DECODE B
02F3 50         0837         LR      0,A       STORE PORT 5 INFO IN R0
02F4 E5         0838         XS      5         X-OR WITH PREVIOUS STAT OF R4
02F5 18         0839         COM
02F6 F6         0840         NS      6         TO GET THE OR FUNCTION
02F7 18         0841         COM
```

```
02F8 56            0842          LR     6,A        STORE X-OR IN R-2
02F9 71            0843  POPUM   LIS    H'01'      PREP TO MASK FOR BIT 0
02FA F6            0844          NS     6          BIT 0 MASK FOR
02FB CC            0845          AS     S          ADD X-OR BIT TO ROW CNT
02FC 5D            0846          LR     I,A        PUT SUM BACK IN ROW CNT
02FD 4C            0847          LR     A,S        C1 TO ACC
02FE 19            0848          LNK
02FF 5D            0849          LR     I,A        PUT SUM BACK IN ROW CNT
0300 46            0850          LR     A,6        PREP SHIFT X-OR FOR NEXT ROW
0301 12            0851          SR     1
0302 56            0852          LR     6,A        RESTORE REMAINING X-OR
0303 8409   030D   0853          BZ     EXL3       EXIT LOOP IF DONE
0305 0A            0854          LR     A,IS
0306 2107          0855          NI     H'07'      CHECK FOR ISAR ROLLOVER
0308 94F0   02F9   0856          BNZ    POPUM
030A 67            0857          LISU   7          PREP TO DO ROWS 21 & 22
030B 90ED   02F9   0858          BR     POPUM      DO NEXT ROW
030D 40            0859  EXL3    LR     A,0        PREV READING TO ACC
030E 55            0860          LR     5,A        UP-DATE PRES STAT REGS
030F A5            0861          INS    5
0310 12            0862          SR     1
0311 12            0863          SR     1
0312 E5            0864          XS     5          PROCESSING 2ND PORT 5 READING
0313 18            0865          COM
0314 56            0866          LR     6,A
0315 1B            0867  INTER   EI                SET ICB
0316 908A   02A1   0868          BR     PP0        RECYCLE PROCESSING PORT 0
                   0869    *
                   0870    *
                   0871    *
                   0872    *
                   0873    *
                   0874    *            DIVIDE BY 2 ACK
                   0875    *
                   0876    *
                   0877    *            DIV2 EXT INTERRUPT
                   0878    *
                   0879    *
0318 0A            0880  DIV2    LR     A,IS
0319 05            0881          LR     KL,A
031A 70            0882          CLR
031B B4            0883          OUTS   4
031C B5            0884          OUTS   5
031D A4            0885          INS    4
031E 810A   0329   0886          BP     CHAN       JMP IF MAIN WANTS OSS
0320 210F          0887          NI     H'0F'      MASK FOR BIT 0-3
0322 57            0888          LR     7,A
0323 290119 0119   0889          JMP    NIPS
                   0890    *
                   0891    *            SET UP OSC FOR 750 HZ
                   0892    *
0326 203E          0893  NEET    LI     H'3E'
0328 5A            0894          LR     10,A
0329 3A            0895  CHAN    DS     10
032A 94FE   0329   0896          BNZ    CHAN
032C A4            0897          INS    4
032D 18            0898          COM               CHANGE THE STATE OF PORTS
032E B4            0899          OUTS   4               4 & 5
032F B5            0900          OUTS   5
0330 A6            0901          INS    6
0331 84F4   0326   0902          BZ     NEET       IS EXT INT LINE STILL LOW
                   0903    *
0333 2900D3 00D3   0904          JMP    DONO
                   0905    *
                   0906    *
                   0907    *
                   0908    *
                   0909    *
                   0910    *            DIVIDE ALL SEED PULSES ON PORTS 0 & 1
                   0911    *                 BY 2 & PUT RESULT OUT PORTS 4 & 5
                   0912    *
                   0913    *
                   0914    *
0336 1B            0915  DIVBY   EI
```

```
0337 A0            0916  PORT0   INS    0
0338 50            0917          LR     0,A         STORE PRESENT READ IN R0
0339 E1            0918          XS     1           ANY CHANGE ??
033A F0            0919          NS     0           ANY CHANGED THAT ARE HIGH ?
033B E2            0920          XS     2           ANY INPUTS THAT HAVE
                   0921  *                          CHANGED & ARE HIGH -->
                   0922  *                          COMPLIMENT THAT BIT ON
                   0923  *                          THE OUTPUT
033C 52            0924          LR     2,A         R2 IS PORT 4 STORAGE REGS
033D B4            0925          OUTS   4
                   0926  *
                   0927  *
                   0928  *       DO ABOVE OPERATION WITH PORT 1
                   0929  *             & PUT RESULT OUT PORT 5
                   0930  *
                   0931  *
033E A1            0932          INS    1
033F 53            0933          LR     3,A
0340 E4            0934          XS     4
0341 F3            0935          NS     3
0342 E5            0936          XS     5
0343 55            0937          LR     5,A
0344 B5            0938          OUTS   5
                   0939  *
                   0940  *
                   0941  *
                   0942  *       DIVIDE PORT 0 AGAIN
                   0943  *
0345 A0            0944          INS    0
0346 51            0945          LR     1,A
0347 E0            0946          XS     0
0348 F1            0947          NS     1
0349 E2            0948          XS     2
034A 52            0949          LR     2,A
034B B4            0950          OUTS   4
                   0951  *
                   0952  *
                   0953  *       DO PORT 1 DIVIDE AGAIN
                   0954  *
034C A1            0955          INS    1
034D 54            0956          LR     4,A
034E E3            0957          XS     3
034F F4            0958          NS     4
0350 E5            0959          XS     5
0351 55            0960          LR     5,A
0352 B5            0961          OUTS   5
0353 90E3   0337   0962          BR     PORT0
                   0963  *
                   0964  *
                   0965          END
02 ERRS
                   0001          TITLE '   DELUXE UP          DES'
                   0002  *
                   0003  *
                   0004  *       MAIN PROGRAM
                   0005  *
                   0006  *
                   0007  *       JDM9
                   0008  *
                   0009  *
                   0010  *
                   0011  *
            1256   0012  DISPLA  EQU    H'1256'
            128C   0013  ADDIN   EQU    H'128C'
            12AF   0014  READ    EQU    H'12AF'
            12EE   0015  SWITCH  EQU    H'12EE'
            1334   0016  ERASE   EQU    H'1334'
            1373   0017  WRITE   EQU    H'1373'
            13D1   0018  SUBACK  EQU    H'13D1'
            13F3   0019  SUBSET  EQU    H'13F3'
            1406   0020  SUBDEC  EQU    H'1406'
            1451   0021  SUBINC  EQU    H'1451'
            14AD   0022  SUBOFF  EQU    H'14AD'
            14DA   0023  SUBROW  EQU    H'14DA'
            151E   0024  SUBPLS  EQU    H'151E'
```

```
                1531 0025  SUBMIN   EQU    H'1531'
                1548 0026  SUBMUL   EQU    H'1548'
                159C 0027  SUBDIV   EQU    H'159C'
                1605 0028  FAILED   EQU    H'1605'
                164C 0029  RESET    EQU    H'164C'
                167B 0030  SUBDIS   EQU    H'167B'
                16C6 0031  SUBSUP   EQU    H'16C6'
                16E6 0032  SUBLIM   EQU    H'16E6'
                1724 0033  ONOFF    EQU    H'1724'
                1741 0034  BITSET   EQU    H'1741'
                176E 0035  TBL1     EQU    H'176E'
                1776 0036  TBL2     EQU    H'1776'
                1780 0037  TBL3     EQU    H'1780'
                178B 0038  SETBCK   EQU    H'178B'
                0520 0039  T55B     EQU    H'0520'
                17A0 0040  HILO     EQU    H'17A0'
                04DC 0041  PB9      EQU    H'04DC'
                     0042  *
                     0043  *
                     0044  *        POWER ON CLEAR ALL PORTS & SCRATCHPAD
                     0045  *                     REGISTERS
                     0046  *
0000 70              0047           CLR
0001 B0              0048           OUTS   0
0002 B1              0049           OUTS   1           CLEAR ALL PORTS
                     0050  *                           ON POWER UP
0003 B4              0051           OUTS   4
0004 B6              0052           OUTS   6
0005 B7              0053           OUTS   7
0006 72              0054           LIS    2           TURN ON -25V
0007 B5              0055           OUTS   5
                     0056  *
                     0057  *
0008 203F            0058           LI     0'77'
000A 50              0059           LR     0,A
000B 40              0060  REST     LR     A,0
000C 0B              0061           LR     IS,A
000D 70              0062           CLR
000E 5C              0063           LR     S,A
000F 30              0064           DS     0
0010 94FA     000B   0065           BNZ    REST
0012 2907F5   07F5   0066           JMP    MAIN
                     0067  *
                     0068  *
                     0069  *
                     0070           ORG    H'7F5'
                     0071  *
                     0072  *
07F5 2A1800  1800    0073  MAIN     DCI    H'1800'    CLR ALL REGIS IN RAM
07F8 70              0074           CLR
07F9 50              0075           LR     0,A
07FA 70              0076           CLR
07FB 17              0077  M3       ST
07FC 30              0078           DS     0
07FD 94FD    07FB    0079           BNZ    M3
07FF 17              0080  M3A      ST
0800 30              0081           DS     0
0801 94FD    07FF    0082           BNZ    M3A
0803 201A            0083           LI     H'1A'
0805 17              0084           ST
0806 2002            0085           LI     H'02'
0808 17              0086           ST
0809 2A199C  199C    0087           DCI    H'199C'
080C 71              0088           LIS    1
080D 17              0089           ST
                     0090  *
                     0091  *
                     0092  *        LIGHT UP TEST OK
                     0093  *
080E 2A1979  1979    0094           DCI    H'1979'
0811 2021            0095           LI     H'21'
0813 17              0096           ST
                     0097  *
                     0098  *
                     0099  *        CLEAR DISPLAY ON POWER UP
```

```
                    0100  *
0814 281256 1256    0101        PI      DISPLA
                    0102  *
                    0103  *
                    0104  *
0817 7F             0105        LIS     H'F'        TEST IF 16 OR 32 ROW UNIT
0818 50             0106        LR      0,A
0819 74             0107        LIS     4
081A B1             0108        OUTS    1
081B A1             0109  M9    INS     1
081C 9106   0823    0110        BM      M8
081E 30             0111        DS      0
081F 94FB   081B    0112        BNZ     M9
0821 9007   0829    0113        BR      M10         JUMP IF 16 ROW
0823 65             0114  M8    LISU    5           SET 32 ROW BIT 7 R55
0824 6D             0115        LISL    5
0825 2080           0116        LI      H'80'
0827 CC             0117        AS      S
0828 5C             0118        LR      S,A
0829 70             0119  M10   CLR                 RESET INT. ON ACK # 2
082A B1             0120        OUTS    1
082B 2049           0121        LI      H'49'       SET DIV2 ACKS FOR SELF T.
082D B1             0122        OUTS    1
082E 2A1944 1944    0123        DCI     H'1944'     PREPARE TO TRANSFER TO
                    0124  *                         RAM EAROM DATA
0831 2011           0125        LI      H'11'       DO 17 LOCATIONS
0833 56             0126        LR      6,A
0834 70             0127        CLR
0835 57             0128        LR      7,A         EAROM
0836 47             0129  M14   LR      A,7
0837 52             0130        LR      2,A
0838 28128C 128C    0131        PI      ADDIN
083B 2812AF 12AF    0132        PI      READ
083E 41             0133        LR      A,1
083F 17             0134        ST
0840 40             0135        LR      A,0
0841 17             0136        ST
0842 78             0137        LIS     8           STEP TO NEXT EAROM
                    0138  *                         ADDRESS
0843 C7             0139        AS      7
0844 57             0140        LR      7,A
0845 36             0141        DS      6
0846 94EF   0836    0142        BNZ     M14         JUMP IF NOT DONE WITH
                    0143  *                         ALL LOCATIONS
0848 2812EE 12EE    0144        PI      SWITCH
084B 71             0145        LIS     1
084C F3             0146        NS      3
084D 943A   0888    0147        BNZ     DIE
084F 2048           0148        LI      H'48'       ERASE EAROM FIELD AREA
0851 52             0149        LR      2,A
0852 28128C 128C    0150        PI      ADDIN
0855 2A1979 1979    0151        DCI     H'1979'
0858 71             0152        LIS     1
0859 17             0153        ST
085A 281256 1256    0154        PI      DISPLA
085D 281334 1334    0155        PI      ERASE
0860 2050           0156        LI      H'50'       ERASE EAROM TOTAL AREA
0862 52             0157        LR      2,A
0863 28128C 128C    0158        PI      ADDIN
0866 281334 1334    0159        PI      ERASE
0869 2080           0160        LI      H'80'       ERASE EAROM MODE
                    0161  *                         REGISTER
086B 52             0162        LR      2,A
086C 28128C 128C    0163        PI      ADDIN
086F 281334 1334    0164        PI      ERASE
0872 2812EE 12EE    0165        PI      SWITCH      TEST FOR ON/OFF
0875 71             0166        LIS     1
0876 F3             0167        NS      3
0877 8404   087C    0168        BZ      M15         JUMP IF ON/OFF NOT
                    0169  *                         ACTIVE
0879 2904DC 04DC    0170        JMP     PB9         JUMP TO SUICIDE
087C 70             0171  M15   CLR                 TEST FOR LIFT SWITCH
087D 50             0172        LR      0,A         ACTIVE LOW
087E A1             0173  M17   INS     1
087F 2102           0174        NI      H'02'
```

```
0881 9425    08A7 0175           BNZ    M16          JUMP IF LIFT SWITCH
                 0176    *                           ACTIVE
0883 30          0177           DS     0
0884 94F9    087E 0178           BNZ    M17          JUMP IF NOT TIMED OUT
0886 9060    08E7 0179           BR     M18          JUMP TO DISPLAY
                 0180    *                           DEFECTIVE MODULE
0888 2A1966  1966 0181   DIE    DCI    H'1966'
088B 2014        0182           LI     H'14'
088D 50          0183           LR     0,A
088E 70          0184           CLR
088F 17          0185   DIED   ST
0890 30          0186           DS     0
0891 94FD    088F 0187           BNZ    DIED
0893 2A1979  1979 0188           DCI    H'1979'
0896 71          0189           LIS    1
0897 17          0190           ST
0898 281256  1256 0191           PI     DISPLA
089B 200A        0192           LI     H'0A'
089D 51          0193           LR     1,A
089E 30          0194   DELA   DS     0
089F 94FE    089E 0195           BNZ    DELA
08A1 31          0196           DS     1
08A2 94FB    089E 0197           BNZ    DELA
08A4 290520  0520 0198           JMP    T55B
08A7 70          0199   M16    CLR                  TEST FOR LIFT SWITCH
                 0200    *                           ACTIVE
08A8 50          0201           LR     0,A
08A9 A1          0202   M20    INS    1
08AA 2102        0203           NI     H'02'
08AC 8406    08B3 0204           BZ     M19          JUMP IF LIFT SWITCH
                 0205    *                           TEST OK
08AE 30          0206           DS     0
08AF 94F9    08A9 0207           BNZ    M20          JUMP IF NOT TIMED OUT
08B1 9035    08E7 0208           BR     M18          JUMP TO DISPLAY
                 0209    *                           DEFECTIVE MODULE
08B3 70          0210   M19    CLR
08B4 55          0211           LR     5,A
08B5 2016        0212           LI     H'16'        TEST FOR ACK
                 0213    *                           ACCUMULATIONS
08B7 54          0214           LR     4,A          DO FOR 22 ACCUMULATORS
                 0215    *                           IN ACK # 1
08B8 2041        0216           LI     H'41'        SET RESET BIT AND START
                 0217    *                           WITH C1 ROW 1
08BA 50          0218           LR     0,A
08BB 2020        0219           LI     H'20'        ACK #1 IDENTITY CODE
08BD 51          0220           LR     1,A
08BE 2813D1  13D1 0221   M22    PI     SUBACK
08C1 70          0222           CLR
08C2 C2          0223           AS     2
08C3 8423    08E7 0224           BZ     M18          JUMP IF NO COUBT IN C1
08C5 72          0225           LIS    2            INCREMRNT TO NEXT ROW
08C6 C0          0226           AS     0
08C7 50          0227           LR     0,A
08C8 34          0228           DS     4
08C9 94F4    08BE 0229           BNZ    M22          JUMP IF NOT THROUGH ALL
                 0230    *                           ACCUMULATORS
08CB 65          0231           LISU   5
08CC 6D          0232           LISL   5
08CD CC          0233           AS     S            TEST IF 32 ROW MODULE
08CE 8124    08F3 0234           BP     M25          JUMP IF NOT 32 ROW UNIT
08D0 2010        0235           LI     H'10'        DO FOR 16 ACCUMULATORS
08D2 54          0236           LR     4,A
08D3 74          0237           LIS    4            ACK #2 IDENTITY CODE
08D4 51          0238           LR     1,A
08D5 2041        0239           LI     H'41'        SET RESET BIT & START
                 0240    *                           WITH C1 ROW 1
08D7 50          0241           LR     0,A
08D8 2813D1  13D1 0242   M24    PI     SUBACK
08DB 70          0243           CLR
08DC C2          0244           AS     2
08DD 8409    08E7 0245           BZ     M18          JUMP IF NO COUNT IN C1
08DF 72          0246           LIS    2            INCREMEMENT TO NEXT
                 0247    *                           ACCUMULATOR
08E0 C0          0248           AS     0
08E1 50          0249           LR     0,A
```

```
08E2 34              0250          DS    4
08E3 94F4  08D8 0251          BNZ   M24       JUMP IF NOT THROUGH ALL
           0252 *                              ACCUMULATORS
08E5 900D  08F3 0253          BR    M25
08E7 2A1979 1979 0254  M18    DCI   H'1979'   PREP TO SET MODULE PROB
08EA 200C       0255          LI    H'0C'
08EC 8B         0256          OM              SET MODULE & PROB BITS
08ED 21FE       0257          NI    H'FE'     RESET TEST OK BIT
08EF 2A1979 1979 0258         DCI   H'1979'
08F2 17         0259          ST
08F3 28164C 164C 0260  M25    PI    RESET     DOUBLE RESET OF ACK
08F6 76         0261          LIS   6
08F7 54         0262          LR    4,A       RESET REMAINING ACCUMS.
08F8 205F       0263          LI    H'5F'
08FA 50         0264          LR    0,A
08FB 72         0265  MM25    LIS   2
08FC C0         0266          AS    0
08FD 50         0267          LR    0,A
08FE 2813D1 13D1 0268         PI    SUBACK
0901 34         0269          DS    4
0902 94F8  08FB 0270          BNZ   MM25
0904 2040       0271          LI    H'40'
0906 54         0272          LR    4,A
0907 281256 1256 0273  M7A    PI    DISPLA
090A 2812EE 12EE 0274         PI    SWITCH
090D 71         0275          LIS   1
090E F3         0276          NS    3
090F 8404  0914 0277          BZ    M7B
0911 2904DC 04DC 0278         JMP   PB9
0914 34         0279  M7B     DS    4
0915 94F1  0907 0280          BNZ   M7A
           0281 *
           0282 *
           0283 *   SENSOR TEST
           0284 *
0917 2A197A 197A 0285         DCI   H'197A'
091A 2020       0286          LI    H'20'     ACK #1 IDENTITY CODE
091C 51         0287          LR    1,A
091D 2041       0288  M31     LI    H'41'     ACK C1 ROW CODE &
           0289 *                              RESET CODE
091F 50         0290          LR    0,A
0920 71         0291  M29     LIS   1         ROW # SHIFTING IDENTITY
           0292 *                              CODE
0921 54         0293          LR    4,A
0922 2813D1 13D1 0294  M28    PI    SUBACK
0925 70         0295          CLR
0926 C2         0296          AS    2         JMP IF CNTS IN C1
0927 9411  0939 0297          BNZ   M26
0929 43         0298          LR    A,3
092A 2517       0299          CI    H'17'     ARE THERE AT LEAST 65
           0300 *                              CNTS IN C0
092C 920C  0939 0301          BNC   M26
092E 44         0302          LR    A,4
092F 8B         0303          OM
0930 55         0304          LR    5,A       SENSOR HAS FAILED SET FAIL
           0305 *                              BIT
0931 20FF       0306          LI    H'FF'
0933 8E         0307          ADC
0934 45         0308          LR    A,5
0935 17         0309          ST              RESTORE UPDATE ROW FAIL FLA
0936 20FF       0310          LI    H'FF'
0938 8E         0311          ADC
0939 72         0312  M26     LIS   2
093A C0         0313          AS    0         INCREMENT TO THE NEXT ROW
093B 50         0314          LR    0,A
093C 44         0315          LR    A,4       SHIFT ROW # IDENTITY CODE
093D 13         0316          SL    1
093E 54         0317          LR    4,A
093F 94E2  0922 0318          BNZ   M28
0941 71         0319  M27     LIS   1
0942 8E         0320          ADC             INCREMENT MEMORY LOC
0943 2061       0321          LI    H'61'
0945 E0         0322          XS    0         TEST IF ON ROW 17 OR 33
0946 94D9  0920 0323          BNZ   M29
0948 74         0324          LIS   4         TEST IF ON ROW 33
```

```
0949 E1              0325            XS    1
094A 840B      0956  0326            BZ    M30       JMP IF ON ROW 33
094C 65              0327            LISU  5
094D 6D              0328            LISL  5
094E 70              0329            CLR
094F CC              0330            AS    S
0950 8105      0956  0331            BP    M30       JMP IF NOT 32 ROW MODULE
0952 74              0332            LIS   4         ACK # 2 IDENTITY CODE
0953 51              0333            LR    1,A
0954 90C8      091D  0334            BR    M31
0956 28164C  164C    0335    M30     PI    RESET     DOUBLE RESET ACK 1 & 2
0959 76              0336            LIS   6
095A 54              0337            LR    4,A       RESET REMAINING
                     0338    *                       ACCUMULATORS
095B 205F            0339            LI    H'5F'
095D 50              0340            LR    0,A
095E 72              0341    M11     LIS   2
095F C0              0342            AS    0
0960 50              0343            LR    0,A
0961 2813D1  13D1    0344            PI    SUBACK
0964 34              0345            DS    4
0965 94F8      095E  0346            BNZ   M11
                     0347    *
0967 70              0348            CLR
0968 CC              0349            AS    S         TEST FOR CORRECT # OF ROWS
0969 8105      096F  0350            BP    ROW16
096B 201F            0351            LI    H'1F'
096D 9002      0970  0352            BR    ROW32
096F 7F              0353    ROW16   LIS   H'F'
0970 53              0354    ROW32   LR    3,A
0971 2A1962  1962    0355            DCI   H'1962'   SUB 16  OR 32 FROM ROW #
0974 16              0356            LM
0975 2400            0357            AI    H'00'
0977 8406      097E  0358            BZ    SETROW
0979 18              0359            COM
097A 1F              0360            INC
097B C3              0361            AS    3
097C 8206      0983  0362            BC    ROWNUM    ROW # IS OK EXIT
097E 43              0363    SETROW  LR    A,3
097F 2A1962  1962    0364            DCI   H'1962'
0982 17              0365            ST
0983 70              0366    ROWNUM  CLR
0984 17              0367            ST
0985 2814AD  14AD    0368            PI    SUBOFF
                     0369    *                       FOR # ROWS
0988 2A197A  197A    0370            DCI   H'197A'
098B 2C              0371            XDC
098C 2A195C  195C    0372            DCI   H'195C'
098F 74              0373            LIS   4
0990 50              0374            LR    0,A
0991 16              0375    M32     LM
0992 18              0376            COM
0993 2C              0377            XDC
0994 8A              0378            NM                RESET FAILURE FLAGS FOR
                     0379    *                         OFF ROWS
0995 51              0380            LR    1,A
0996 20FF            0381            LI    H'FF'
0998 8E              0382            ADC
0999 41              0383            LR    A,1
099A 17              0384            ST
099B 2C              0385            XDC
099C 30              0386            DS    0
099D 94F3      0991  0387            BNZ   M32       JUMP IF NOT THROUGH ALL
                     0388    *                       4 BANKS
099F 2A197A  197A    0389            DCI   H'197A'   TEST IF ANY SENSORS
                     0390    *                       FAILED
09A2 16              0391            LM
09A3 88              0392            AM
09A4 19              0393            LNK
09A5 88              0394            AM
09A6 19              0395            LNK
09A7 88              0396            AM
09A8 19              0397            LNK
09A9 2A1979  1979    0398            DCI   H'1979'
09AC 840D      09BA  0399            BZ    M33       JUMP IF NO SENSORS
                     0400    *                       FAILED
```

```
09AE 200A         0401           LI    H'0A'       SET SENSOR PROBLEM
09B0 8B           0402           OM
09B1 21FE         0403           NI    H'FE'       RESET TEST OK
09B3 2A1979 1979  0404           DCI   H'1979'
09B6 17           0405           ST
09B7 2A1979 1979  0406           DCI   H'1979'
09BA 6C           0407    M33    LISL  4           TEST IF SENSOR OR MODULE
                  0408    *                        PROBLEM]
09BB 65           0409           LISU  5
09BC 76           0410           LIS   6
09BD 8A           0411           NM
09BE 5C           0412           LR    S,A
09BF 8465 0A25    0413           BZ    M34         JUMP IF TEST OK
09C1 2A1981 1981  0414           DCI   H'1981'     START PI FAILED LOOKING
                  0415    *                        AT ROW 1
09C4 20FF         0416           LI    H'FF'
09C6 17           0417           ST
09C7 71           0418           LIS   1           DELAY FOR SENSOR & MODULE
                  0419    *                        FLASH BIT
09C8 57           0420           LR    7,A
09C9 56           0421           LR    6,A         DELAY FOR ROW # SCAN
09CA 37           0422    M41    DS    7
09CB 9442 0A0E    0423           BNZ   M35
09CD 2016         0424           LI    H'16'       RESET FLASH RATE COUNTER
09CF 57           0425           LR    7,A
09D0 65           0426           LISU  5
09D1 6C           0427           LISL  4
09D2 76           0428           LIS   6
09D3 FC           0429           NS    S
09D4 2A1979 1979  0430           DCI   H'1979'     COMPLIMENT SENSOR & OR
                  0431    *                        MODULE
09D7 8C           0432           XM
09D8 2A1979 1979  0433           DCI   H'1979'
09DB 17           0434           ST
09DC 72           0435           LIS   2           IS THERE A SENSOR PROBLEM
09DD FC           0436           NS    S
09DE 842F 0A0E    0437           BZ    M35         NO SENSOR PROB GO DISPLAY
                  0438    *                        MODULE PROBLEM
09E0 36           0439           DS    6
09E1 942C 0A0E    0440           BNZ   M35         IS IT TIME TO ADVANCE TO
                  0441    *                        THE NEXT ROW
09E3 72           0442           LIS   H'02'
09E4 56           0443           LR    6,A         RESET ROW SCAN RATE CNTER
09E5 281605 1605  0444           PI    FAILED      GET FAILED ROW #
09E8 2A1981 1981  0445           DCI   H'1981'
09EB 16           0446           LM
09EC 1F           0447           INC               INC TO GET CORRECT ROW #
09ED 51           0448           LR    1,A
09EE 70           0449           CLR
09EF 50           0450           LR    0,A         DECIMALIZE ROW #
09F0 281406 1406  0451           PI    SUBDEC
09F3 2A1780 1780  0452           DCI   TBL3
09F6 43           0453           LR    A,3
09F7 210F         0454           NI    H'0F'
09F9 8E           0455           ADC
09FA 16           0456           LM                CONVERT ROW # TO 7SEG
09FB 2A196A 196A  0457           DCI   H'196A'
09FE 17           0458           ST
09FF 43           0459           LR    A,3
0A00 14           0460           SR    4
0A01 8406 0A08    0461           BZ    M36         JMP IF LEADING 0
0A03 2A1780 1780  0462           DCI   TBL3
0A06 8E           0463           ADC               CONVERT TO 7 SEG FOR MSB
0A07 16           0464           LM
0A08 2280         0465    M36    OI    H'80'
0A0A 2A196B 196B  0466           DCI   H'196B'
0A0D 17           0467           ST
0A0E 281256 1256  0468    M35    PI    DISPLA
0A11 2812EE 12EE  0469           PI    SWITCH
0A14 71           0470           LIS   1
0A15 F3           0471           NS    3
0A16 8404 0A1B    0472           BZ    M39
0A18 2904DC 04DC  0473           JMP   PB9
                  0474    *
                  0475    *
```

```
                        0476  *       INSTRUCTION BELOW ENABLES YOU TO EXIT
                        0477  *       "PROBLEM" ROUTINE BY PUSHING CERTAIN
                        0478  *       SWITCHES
                        0479  *
0A1B  73                0480  M39     LIS   3               TEST IF ANY FUNC SWITCH
0A1C  F2                0481          NS    2
0A1D  84AC    09CA      0482          BZ    M41             ACTIVATED
0A1F  65                0483          LISU  5
0A20  6C                0484          LISL  4
0A21  71                0485          LIS   1
0A22  5C                0486          LR    S,A
0A23  9003    0A27      0487          BR    M34A
0A25  70                0488  M34     CLR
0A26  5C                0489          LR    S,A             CLEAR ALL FLAGS
0A27  6F                0490  M34A    LISL  7
0A28  78                0491          LIS   8               SET "FIRST TIME THRU"
                        0492  *                             FLAG
0A29  5C                0493          LR    S,A
0A2A  28164C  164C      0494          PI    RESET           RESET ACK ACCUMULATORS
0A2D  28164C  164C      0495          PI    RESET
                        0496  *
                        0497  *
                        0498  *       THE NEXT SET OF INST CHECK THAT THE EAROM
                        0499  *       HAS PUT OUT MEANINGFUL INFO
                        0500  *       &  MAKES ANY CHANGES THAT ARE NECESSARY
                        0501  *
                        0502  *
0A30  2A1964  1964      0503          DCI   H'1964'         TEST FOR PROPER MODE
                        0504  *                             REGISTER CODE
0A33  16                0505          LM
0A34  50                0506          LR    0,A
0A35  20FF              0507          LI    H'FF'
0A37  8E                0508          ADC
0A38  2030              0509          LI    H'30'
0A3A  F0                0510          NS    0
0A3B  9407    0A43      0511          BNZ   M54A            JUMP IF POP OR SPACING
                        0512  *                             SET
0A3D  40                0513          LR    A,0             SET POP
0A3E  2210              0514          OI    H'10'
0A40  50                0515          LR    0,A
0A41  900B    0A4D      0516          BR    M55A
0A43  2330              0517  M54A    XI    H'30'
0A45  9407    0A4D      0518          BNZ   M55A            JUMP IF BOTH NOT SET
0A47  20CF              0519          LI    H'CF'
0A49  F0                0520          NS    0
0A4A  2210              0521          OI    H'10'           SET POP
0A4C  50                0522          LR    0,A
0A4D  71                0523  M55A    LIS   1
0A4E  51                0524          LR    1,A
0A4F  204F              0525          LI    H'4F'
0A51  F0                0526          NS    0
0A52  8102    0A55      0527  M57A    BP    M56A            JUMP IF BIT 7 = 0
0A54  31                0528          DS    1
0A55  13                0529  M56A    SL    1
0A56  94FB    0A52      0530          BNZ   M57A
0A58  C1                0531          AS    1               SET STATIS REGISTER
0A59  8406    0A60      0532          BZ    M58A
0A5B  20B0              0533          LI    H'B0'
0A5D  F0                0534          NS    0
0A5E  1F                0535          INC                   SET SCAN
0A5F  50                0536          LR    0,A
0A60  40                0537  M58A    LR    A,0
0A61  17                0538          ST
0A62  2180              0539          NI    H'80'
0A64  70                0540          CLR
0A65  9117    0A7D      0541          BM    M74             JUMP IF DISPLAY OFF BIT
                        0542  *                             SET
0A67  16                0543          LM
0A68  2107              0544          NI    H'07'
0A6A  50                0545          LR    0,A
0A6B  20FF              0546          LI    H'FF'
0A6D  8E                0547          ADC
0A6E  71                0548          LIS   1
0A6F  51                0549          LR    1,A
```

```
0A70 70           0550           CLR
0A71 C0           0551           AS    0
0A72 8102   0A75  0552   M61A    BP    M60A        JUMP IF BIT 7 = 0
0A74 31           0553           DS    1
0A75 13           0554   M60A    SL    1
0A76 94FB   0A72  0555           BNZ   M61A
0A78 C1           0556           AS    1
0A79 40           0557           LR    A,0
0A7A 8402   0A7D  0558           BZ    M74         JUMP IF ONLY 1 FLAG SET
0A7C 74           0559           LIS   4
0A7D 17           0560   M74     ST
0A7E 20FA         0561           LI    H'FA'       SET MODULO-N REGISTER TO
                  0562   *                         250 FOR 25 MSEC
0A80 B7           0563           OUTS  7
0A81 20EA         0564           LI    H'EA'       SET INTERUPT CONTROL
                  0565   *                         PORT
0A83 B6           0566           OUTS  6
0A84 2A1956 1956  0567   M136    DCI   H'1956'     TEST FIELD ' TOTAL AREA
                  0568   *                         IF > 999.9
0A87 72           0569           LIS   2
0A88 50           0570           LR    0,A
0A89 2027         0571           LI    H'27'
0A8B 52           0572           LR    2,A
0A8C 200F         0573           LI    H'0F'
0A8E 53           0574           LR    3,A
0A8F 28178B 178B  0575   M44     PI    SETBCK
0A92 281531 1531  0576           PI    SUBMIN
0A95 8207   0A9D  0577           BC    M43         JUMP IF < 1000.0
0A97 20FE         0578           LI    H'FE'       RESET TO 0
0A99 8E           0579           ADC
0A9A 70           0580           CLR
0A9B 17           0581           ST
0A9C 17           0582           ST
0A9D 30           0583   M43     DS    0
0A9E 94F0   0A8F  0584           BNZ   M44
0AA0 2A1966 1966  0585           DCI   H'1966'     RESET ALL DISPLAY
                  0586   *                         REGISTERS
0AA3 2014         0587           LI    H'14'
0AA5 50           0588           LR    0,A
0AA6 70           0589           CLR
0AA7 17           0590   M45     ST
0AA8 30           0591           DS    0
0AA9 94FD   0AA7  0592           BNZ   M45
0AAB 2A19A6 19A6  0593           DCI   H'19A6'
0AAE 2C           0594           XDC
0AAF 2A1946 1946  0595           DCI   H'1946'     TEST FOR REASONABLE HI-
                  0596   *                         LO 3'S
0AB2 2027         0597           LI    H'27'       TEST FOR > 999.9
0AB4 52           0598           LR    2,A
0AB5 200F         0599           LI    H'0F'
0AB7 53           0600           LR    3,A
0AB8 28178B 178B  0601           PI    SETBCK
0ABB 281531 1531  0602           PI    SUBMIN
0ABE 820F   0ACE  0603           BC    M45A        JUMP IF < 1000.0
0AC0 71           0604   M48     LIS   1
0AC1 53           0605           LR    3,A
0AC2 43           0606   M49     LR    A,3
0AC3 2C           0607   MMM     XDC
0AC4 17           0608           ST
0AC5 65           0609           LISU  5
0AC6 6C           0610           LISL  4
0AC7 4C           0611           LR    A,S
0AC8 2208         0612           OI    H'08'
0ACA 5C           0613           LR    S,A
0ACB 290B89 0B89  0614           JMP   M47         JUMP TO DISPLAY #
0ACE 70           0615   M45A    LIS   0           TEST > 0
0ACF 52           0616           LR    2,A
0AD0 2000         0617           LI    H'00'       (LEAVE LI FOR POSSIBLE
                  0618   *                         FUTURE LIMIT CHANGE)
0AD2 53           0619           LR    3,A
0AD3 20FE         0620           LI    H'FE'
0AD5 8E           0621           ADC
0AD6 28178B 178B  0622           PI    SETBCK
0AD9 281531 1531  0623           PI    SUBMIN
0ADC 82E3   0AC0  0624           BC    M48         JUMP IF >' 0
```

```
                     0625  *
                     0626  *
                     0627  *    IF THERE IS NO CARRY THEN DCI IS LARGER
                     0628  *    THAN LIMIT & IS OK SO GO ON
                     0629  *
0ADE 2027            0630       LI    H'27'       TEST LO FOR > 999.9
0AE0 52              0631       LR    2,A
0AE1 200F            0632       LI    H'0F'
0AE3 53              0633       LR    3,A
0AE4 28178B  178B    0634       PI    SETBCK
0AE7 281531  1531    0635       PI    SUBMIN
0AEA 72              0636       LIS   2
0AEB 92D7    0AC3    0637       BNC   MMM         JUMP IF > 999.9
0AED 70              0638       LIS   0           TEST FOR > 0
0AEE 52              0639       LR    2,A
0AEF 2000            0640       LI    H'00'       (LEAVE LI FOR POSSIBLE
                     0641  *                      FUTURE LIMIT CHANGE)
0AF1 53              0642       LR    3,A
0AF2 20FE            0643       LI    H'FE'
0AF4 8E              0644       ADC
0AF5 28178B  178B    0645       PI    SETBCK
0AF8 281531  1531    0646       PI    SUBMIN
0AFB 72              0647       LIS   2
0AFC 82C6    0AC3    0648       BC    MMM         JUMP IF >' 0
0AFE 2A195A  195A    0649       DCI   H'195A'     TEST DIST. CAL. FOR
                     0650  *                      CORRECT RANGE
0B01 201F            0651       LI    H'1F'       TEST IF > 8000
0B03 52              0652       LR    2,A
0B04 2040            0653       LI    H'40'
0B06 53              0654       LR    3,A
0B07 28178B  178B    0655       PI    SETBCK
0B0A 281531  1531    0656       PI    SUBMIN
0B0D 2010            0657       LI    H'10'       DIST. CAL. CODE
0B0F 92B3    0AC3    0658       BNC   MMM         JUMP IF > 8000
0B11 20FE            0659       LI    H'FE'       TEST IF > 4000
0B13 8E              0660       ADC
0B14 200F            0661       LI    H'0F'
0B16 52              0662       LR    2,A
0B17 20A0            0663       LI    H'A0'
0B19 53              0664       LR    3,A
0B1A 28178B  178B    0665       PI    SETBCK
0B1D 281531  1531    0666       PI    SUBMIN
0B20 9227    0B48    0667       BNC   M50         JUMP IF DIST. CAL. OK
0B22 20FE            0668       LI    H'FE'       TEST IF -> 2000
0B24 8E              0669       ADC
0B25 2007            0670       LI    H'07'
0B27 52              0671       LR    2,A
0B28 20D0            0672       LI    H'D0'
0B2A 53              0673       LR    3,A
0B2B 28178B  178B    0674       PI    SETBCK
0B2E 281531  1531    0675       PI    SUBMIN
0B31 2010            0676       LI    H'10'
0B33 923A    0B6E    0677       BNC   MM49        JUMP IF > 2000
0B35 20FE            0678       LI    H'FE'       TEST IF > 1000
0B37 8E              0679       ADC
0B38 2003            0680       LI    H'03'
0B3A 52              0681       LR    2,A
0B3B 20E8            0682       LI    H'E8'
0B3D 53              0683       LR    3,A
0B3E 28178B  178B    0684       PI    SETBCK
0B41 281531  1531    0685       PI    SUBMIN
0B44 2010            0686       LI    H'10'
0B46 8227    0B6E    0687       BC    MM49        JUMP ID < 1000
0B48 2A1960  1960    0688  M50  DCI   H'1960'     DIST. CAL. OK. CHECK ROW
                     0689  *                      SPACING
0B4B 2007            0690       LI    H'07'       TEST IF > 2000
0B4D 52              0691       LR    2,A
0B4E 20D0            0692       LI    H'D0'
0B50 53              0693       LR    3,A
0B51 28178B  178B    0694       PI    SETBCK
0B54 281531  1531    0695       PI    SUBMIN
0B57 2040            0696       LI    H'40'
0B59 9214    0B6E    0697       BNC   MM49        JUMP IF > 2000
0B5B 20FE            0698       LI    H'FE'
0B5D 8E              0699       ADC
```

```
0B5E 2000           0700             LI    H'00'      (LEAVE LI FOR POSSIBLE
                    0701      *                        FUTURE LIMIT CHANGES
0B60 52             0702             LR    2,A
0B61 2096           0703             LI    H'96'
0B63 53             0704             LR    3,A
0B64 28178B 178B    0705             PI    SETBCK
0B67 281531 1531    0706             PI    SUBMIN
0B6A 2040           0707             LI    H'40'
0B6C 9205    0B72   0708             BNC   M72A       JMP IF > 15.0
0B6E 53             0709    MM49     LR    3,A
0B6F 290AC2 0AC2    0710             JMP   M49
                    0711      *
                    0712      *
                    0713      *
                    0714      *
                    0715      *
                    0716      *      TEST FOR ALL ROWS OFF
                    0717      *
                    0718      *
0B72 74             0719    M72A     LIS   H'04'
0B73 53             0720             LR    3,A
0B74 2A195C 195C    0721             DCI   H'195C'
0B77 16             0722    AGAIN    LM
0B78 23FF           0723             XI    H'FF'
0B7A 9408    0B83   0724             BNZ   M47A
0B7C 33             0725             DS    3
0B7D 94F9    0B77   0726             BNZ   AGAIN
0B7F 2020           0727             LI    H'20'
0B81 90EC    0B6E   0728             BR    MM49
0B83 65             0729    M47A     LISU  5
0B84 6C             0730             LISL  4
0B85 4C             0731             LR    A,S
0B86 21F7           0732             NI    H'F7'
0B88 5C             0733             LR    S,A
0B89 65             0734    M47      LISU  5          SET UP DISPLAY REGISTERS
0B8A 6C             0735             LISL  4          TEST FOR DATA BIT 3 R54
0B8B 78             0736             LIS   8
0B8C FC             0737             NS    S
0B8D 841C    0BAA   0738             BZ    M52        JUMP IF "DATA" NOT
                    0739      *                       REQUIRED
0B8F 66             0740             LISU  6
0B90 6D             0741             LISL  5
0B91 70             0742             CLR
0B92 CC             0743             AS    S
0B93 910D    0BA1   0744             BM    BYP
0B95 2A19A6 19A6    0745             DCI   H'19A6'
0B98 16             0746             LM
0B99 2A199C 199C    0747             DCI   H'199C'
0B9C 17             0748             ST
0B9D 4C             0749             LR    A,S
0B9E 2280           0750             OI    H'80'
0BA0 5C             0751             LR    S,A
0BA1 2A196E 196E    0752    BYP      DCI   H'196E'    PREPARE TO SET "DATA"
                    0753      *                       DISPLAY BIT
0BA4 2080           0754             LI    H'80'
0BA6 17             0755             ST
0BA7 290E3C 0E3C    0756             JMP   M53        JUMP TO DISPLAY ROUTINE
                    0757      *                       FOR SET UP
0BAA 6F             0758    M52      LISL  7          TEST FOR DIST. FAILED
                    0759      *                       FLAG 1 & 2
0BAB 2060           0760             LI    H'60'
0BAD FC             0761             NS    S
0BAE 2360           0762             XI    H'60'      TEST IF BOTH SET
0BB0 9423    0BD4   0763             BNZ   M53A       JUMP IF DIST. NOT FAILED
0BB2 6C             0764             LISL  4
0BB3 CC             0765             AS    S          SET STATUS REGISTER
0BB4 8114    0BC9   0766             BP    MM54       JUMP IF FLASH BIT = 1
0BB6 2A196C 196C    0767             DCI   H'196C'    SET DIGIT 6 = 0
0BB9 203F           0768             LI    H'3F'
0BBB 17             0769             ST
0BBC 2080           0770             LI    H'80'      SET DP2
0BBE 17             0771             ST
0BBF 2A1971 1971    0772             DCI   H'1971'    SET SPEED
0BC2 74             0773             LIS   4
0BC3 17             0774             ST
```

```
0BC4 2A1979 1979  0775        DCI   H'1979'   SET PROBLEM
0BC7 78           0776        LIS   8
0BC8 17           0777        ST
0BC9 2040         0778  MM54  LI    H'40'
0BCB FC           0779        NS    S
0BCC 941E    0BEB 0780        BNZ   M56B
0BCE 290E28 0E28  0781        JMP   M54       JUMP TO TEST FOR OPERATE
                  0782  *                     SET UP
0BD1 290C6A 0C6A  0783  M64A  JMP   M64
0BD4 71           0784  M53A  LIS   1         TEST FOR LIFT SWITCH
                  0785  *                     OVERRIDE
0BD5 FC           0786        NS    S
0BD6 94FA    0BD1 0787        BNZ   M64A      JUMP IF LIFT SWITCH
                  0788  *                     ACTIVATED
0BD8 2010         0789        LI    H'10'     TEST FOR AUX. POS.
0BDA FC           0790        NS    S
0BDB 8409    0BE5 0791        BZ    M56       JUMP IF AUX POS. NOT SET
0BDD 2A196C 196C  0792        DCI   H'196C'   SET AUX. POS.
0BE0 2080         0793        LI    H'80'
0BE2 17           0794        ST
0BE3 900D    0BF1 0795        BR    M57       JUMP TO DISLPLAY FAILED
0BE5 6C           0796  M56   LISL  4         TEST IF FAILED SET
0BE6 2040         0797        LI    H'40'
0BE8 FC           0798        NS    S
0BE9 8412    0BFC 0799        BZ    M58       JUMP IF FAILED NOT SET
0BEB 2A196B 196B  0800  M56B  DCI   H'196B'   SET ROW
0BEE 2080         0801        LI    H'80'
0BF0 17           0802        ST
0BF1 2A1967 1967  0803  M57   DCI   H'1967'   SET FAILED ACCORDING TO
                  0804  *                     FLASH BIT
0BF4 6C           0805        LISL  4
0BF5 2080         0806        LI    H'80'
0BF7 FC           0807        NS    S
0BF8 17           0808        ST
0BF9 290D67 0D67  0809        JMP   M59       JUMP TO DISPLAY ROW #
                  0810  *                     RSC
0BFC 6D           0811  M58   LISL  5         TEST FOR LO WARNING
0BFD 2010         0812        LI    H'10'
0BFF FC           0813        NS    S
0C00 8409    0C0A 0814        BZ    M60       JUMP IF LO WARNING NOT
                  0815  *                     SET
0C02 2A1969 1969  0816        DCI   H'1969'   SET LO
0C05 2080         0817        LI    H'80'
0C07 17           0818        ST
0C08 900C    0C15 0819        BR    M61       JUMP TO SET WARNING &
                  0820  *                     ROW
0C0A 2020         0821  M60   LI    H'20'     TEST FOR HI WARNING
0C0C FC           0822        NS    S
0C0D 8422    0C30 0823        BZ    M62       JUMP IF HI WARNING NOT
                  0824  *                     SET
0C0F 2A1968 1968  0825        DCI   H'1968'   SET HI
0C12 2080         0826        LI    H'80'
0C14 17           0827        ST
0C15 2A196A 196A  0828  M61   DCI   H'196A'   SET WARNING
0C18 17           0829        ST
0C19 17           0830        ST              SET ROW
0C1A 2A1970 1970  0831        DCI   H'1970'   SET POP
0C1D 2010         0832        LI    H'10'
0C1F 17           0833        ST
0C20 2A1981 1981  0834        DCI   H'1981'   SELECT RSC TO RETRIEVE
                  0835  *                     ROW POP
0C23 16           0836        LM
0C24 13           0837        SL    1
0C25 2A1800 1800  0838        DCI   H'1800'
0C28 8E           0839        ADC             DC NOW POINTING TO C1 OF
                  0840  *                     DESIRED ROW POP
0C29 16           0841  M72   LM
0C2A 50           0842        LR    0,A
0C2B 16           0843        LM
0C2C 51           0844        LR    1,A
0C2D 290D12 0D12  0845        JMP   M63       JUMP TO DECIMALIZE &
                  0846  *                     LOS
0C30 6F           0847  M62   LISL  7         TEST FOR FIRST TIME THRU
                  0848  *                     FLAG
0C31 78           0849        LIS   8
```

```
0C32 FC              0850            NS    S
0C33 8436      0C6A  0851            BZ    M64      JUMP IF FIRST TIME THRU
               0852  *                              FLAG NOT SET
0C35 2A195C 195C 0853                DCI   H'195C'
0C38 70              0854            CLR
0C39 50              0855   M62B     LR    0,A
0C3A 281724 1724 0856                PI    ONOFF
0C3D 8405      0C43 0857             BZ    M62A
0C3F 40              0858            LR    A,0
0C40 1F              0859            INC
0C41 90F7      0C39 0860             BR    M62B
0C43 2A1981 1981 0861   M62A         DCI   H'1981'
0C46 40              0862            LR    A,0
0C47 17              0863            ST
0C48 24F0            0864            AI    H'F0'
0C4A 8205      0C50 0865             BC    M62C     JMP IF > 16
0C4C 2020            0866            LI    H'20'
0C4E 9003      0C52 0867             BR    M62D
0C50 50              0868   M62C     LR    0,A
0C51 74              0869            LIS   4
0C52 51              0870   M62D     LR    1,A
0C53 40              0871            LR    A,0
0C54 13              0872            SL    1
0C55 1F              0873            INC
0C56 50              0874            LR    0,A
0C57 2813D1 13D1 0875                PI    SUBACK
0C5A 42              0876            LR    A,2
0C5B 13              0877            SL    1
0C5C 50              0878            LR    0,A
0C5D 70              0879            CLR
0C5E C3              0880            AS    3
0C5F 8104      0C64 0881             BP    M64B
0C61 71              0882            LIS   1
0C62 C0              0883            AS    0
0C63 50              0884            LR    0,A
0C64 43              0885   M64B     LR    A,3
0C65 13              0886            SL    1
0C66 51              0887            LR    1,A
0C67 290D12 0D12 0888                JMP   M63      JUMP TO DECIMALIZE & LOS
0C6A 2A1964 1964 0889   M64          DCI   H'1964'
0C6D 203F            0890            LI    H'3F'
0C6F 8A              0891            NM
0C70 2A1970 1970 0892                DCI   H'1970'
0C73 17              0893            ST
0C74 2A1964 1964 0894                DCI   H'1964'   TEST FOR MIN SELECTION
0C77 72              0895            LIS   2
0C78 8A              0896            NM
0C79 845C      0CD6 0897             BZ    M65      JUMP IF MIN NOT SELECTED
0C7B 2A1964 1964 0898                DCI   H'1964'
0C7E 2010            0899            LI    H'10'    TEST FOR POP SELECTION
0C80 8A              0900            NM
0C81 8407      0C89 0901             BZ    M66      JUMP IF POP NOT SELECTED
0C83 2A19BA 19BA 0902                DCI   H'19BA'  RETRIEVE MIN POP
0C86 290C29 0C29 0903                JMP   M72
0C89 2A19BE 19BE 0904   M66          DCI   H'19BE'  MAC POP C1
0C8C 2C              0905            XDC            JUMP TO DECIMALIZE & LOS
0C8D 2A1960 1960 0906   M70          DCI   H'1960'  RETRIEVE RW & POP FOR
               0907   *                              SPACING CALC.
0C90 66              0908            LISU  6        S = (6,272,640 DIV RW)
               0909   *                              DIV POP ENGLISH
0C91 69              0910            LISL  1        S = 108 DIV RW) DIV POP
               0911   *                              METRIC OR ENGLISH X 16
0C92 16              0912            LM             Y = RW
0C93 5E              0913            LR    D,A
0C94 16              0914            LM
0C95 5C              0915            LR    S,A
0C96 67              0916            LISU  7
0C97 70              0917            CLR
0C98 5D              0918            LR    I,A      Z = 6,272,640
               0919   *                              H'005FB680'
0C99 205F            0920            LI    H'5F'
0C9B 5D              0921            LR    I,A
0C9C 20B6            0922            LI    H'B6'
0C9E 5D              0923            LR    I,A
0C9F 2080            0924            LI    H'80'
```

| | | | | | | |
|---|---|---|---|---|---|---|
| 0CA1 | 5C | | 0925 | | LR | S,A |
| 0CA2 | 28159C | 159C | 0926 | | PI | SUBDIV | X = Z DIV Y |
| 0CA5 | 2A197F | 197F | 0927 | | DCI | H'197F'  TEST FOR ENGLISH/METRIC |
| 0CA8 | 70 | | 0928 | | CLR | |
| 0CA9 | 88 | | 0929 | | AM | |
| 0CAA | 810E | 0CB9 | 0930 | | BP | M67   JUMP IF ENGLISH |
| 0CAC | 66 | | 0931 | | LISU | 6   Y = 16 |
| 0CAD | 6A | | 0932 | | LISL | 2 |
| 0CAE | 70 | | 0933 | | CLR | |
| 0CAF | 5D | | 0934 | | LR | I,A |
| 0CB0 | 2010 | | 0935 | | LI | H'10' |
| 0CB2 | 5C | | 0936 | | LR | S,A |
| 0CB3 | 281548 | 1548 | 0937 | | PI | SUBMUL   XY = Z |
| 0CB6 | 68 | | 0938 | | LISL | 0 |
| 0CB7 | 900D | 0CC5 | 0939 | | BR | M68 |
| 0CB9 | 65 | | 0940 | M67 | LISU | 5   X --> Z |
| 0CBA | 6B | | 0941 | | LISL | 3 |
| 0CBB | 4C | | 0942 | | LR | A,S |
| 0CBC | 67 | | 0943 | | LISU | 7 |
| 0CBD | 5E | | 0944 | | LR | D,A |
| 0CBE | 65 | | 0945 | | LISU | 5 |
| 0CBF | 4C | | 0946 | | LR | A,S |
| 0CC0 | 67 | | 0947 | | LISU | 7 |
| 0CC1 | 5E | | 0948 | | LR | D,A |
| 0CC2 | 70 | | 0949 | | CLR | |
| 0CC3 | 5E | | 0950 | | LR | D,A |
| 0CC4 | 5C | | 0951 | | LR | S,A |
| 0CC5 | 66 | | 0952 | M68 | LISU | 6 |
| 0CC6 | 2C | | 0953 | | XDC |    POP C1 |
| 0CC7 | 16 | | 0954 | | LM | |
| 0CC8 | 5D | | 0955 | | LR | I,A |
| 0CC9 | 16 | | 0956 | | LM | |
| 0CCA | 5D | | 0957 | | LR | I,A |
| 0CCB | 28159C | 159C | 0958 | | PI | SUBDIV |
| 0CCE | 65 | | 0959 | | LISU | 5 |
| 0CCF | 6A | | 0960 | | LISL | 2 |
| 0CD0 | 4D | | 0961 | | LR | A,I |
| 0CD1 | 50 | | 0962 | | LR | 0,A |
| 0CD2 | 4C | | 0963 | | LR | A,S |
| 0CD3 | 51 | | 0964 | | LR | 1,A |
| 0CD4 | 903D | 0D12 | 0965 | | BR | M63   JUMP TO DECIMALIZE & |
| | | | 0966 | * | | LOS |
| 0CD6 | 2A1964 | 1964 | 0967 | M65 | DCI | H'1964'   TEST IF AVG SELECTED |
| 0CD9 | 74 | | 0968 | | LIS | 4 |
| 0CDA | 8A | | 0969 | | NM | |
| 0CDB | 8411 | 0CED | 0970 | | BZ | M69   JUMP IF AVG NOT SELECTED |
| 0CDD | 2A19BC | 19BC | 0971 | | DCI | H'19BC'   RETRIEVE AVG POP |
| 0CE0 | 2C | | 0972 | | XDC | |
| 0CE1 | 2A1964 | 1964 | 0973 | M73 | DCI | H'1964' |
| 0CE4 | 2010 | | 0974 | | LI | H'10'   TEST FOR POP SELECTION |
| 0CE6 | 8A | | 0975 | | NM | |
| 0CE7 | 84A5 | 0C8D | 0976 | | BZ | M70   JUMP IF POP NOT SELECTED |
| 0CE9 | 2C | | 0977 | | XDC | |
| 0CEA | 290C29 | 0C29 | 0978 | | JMP | M72 |
| 0CED | 2A1964 | 1964 | 0979 | M69 | DCI | H'1964'   TEST IF MAX SELECTED |
| 0CF0 | 78 | | 0980 | | LIS | 8 |
| 0CF1 | 8A | | 0981 | | NM | |
| 0CF2 | 8413 | 0D06 | 0982 | | BZ | M71   JUMP IF MAX NOT SELECTED |
| 0CF4 | 2A1964 | 1964 | 0983 | | DCI | H'1964' |
| 0CF7 | 2010 | | 0984 | | LI | H'10'   TEST FOR POP SELECTION |
| 0CF9 | 8A | | 0985 | | NM | |
| 0CFA | 2A19BA | 19BA | 0986 | | DCI | H'19BA' |
| 0CFD | 2C | | 0987 | | XDC | |
| 0CFE | 848E | 0C8D | 0988 | | BZ | M70   JUMP IF POP NOT SELECTED |
| 0D00 | 2A19BE | 19BE | 0989 | | DCI | H'19BE' |
| 0D03 | 290C29 | 0C29 | 0990 | | JMP | M72 |
| 0D06 | 2A1981 | 1981 | 0991 | M71 | DCI | H'1981'   ASSUME IN SCAN OR ROW |
| | | | 0992 | * | | SELECT |
| 0D09 | 16 | | 0993 | | LM | |
| 0D0A | 13 | | 0994 | | SL | 1 |
| 0D0B | 2A19C0 | 19C0 | 0995 | | DCI | H'19C0' |
| 0D0E | 8E | | 0996 | | ADC | |
| 0D0F | 2C | | 0997 | | XDC | |
| 0D10 | 90D0 | 0CE1 | 0998 | | BR | M73 |
| 0D12 | 281406 | 1406 | 0999 | M63 | PI | SUBDEC   BINARY --> BCD |

```
0D15 2A1966 1966 1000           DCI   H'1966'    SET DPI
0D18 2080        1001           LI    H'80'
0D1A 17          1002           ST
0D1B 2A1966 1966 1003           DCI   H'1966'
0D1E 2816C6 16C6 1004           PI    SUBSUP
0D21 28167B 167B 1005           PI    SUBDIS
0D24 65          1006           LISU  5
0D25 6F          1007           LISL  7
0D26 71          1008           LIS   1
0D27 FC          1009           NS    S
0D28 940B   0D34 1010           BNZ   LSOB
0D2A 78          1011           LIS   8
0D2B FC          1012           NS    S
0D2C 943A   0D67 1013           BNZ   M59
0D2E 6D          1014           LISL  5
0D2F 2030        1015           LI    H'30'
0D31 FC          1016           NS    S
0D32 9434   0D67 1017           BNZ   M59
0D34 2A1964 1964 1018  LSOB     DCI   H'1964'    PROCESS 2 DIGIT DISPLAY
0D37 74          1019           LIS   4          TEST FOR AVG SELECTION
0D38 8A          1020           NM
0D39 947A   0DB4 1021           BNZ   M77        JUMP IF AVG SELECTED
0D3B 50          1022           LR    0,A
0D3C 2A1964 1964 1023           DCI   H'1964'    TEST FOR MIN SELECTION
0D3F 72          1024           LIS   2
0D40 8A          1025           NM
0D41 8411   0D53 1026           BZ    M75        JUMP IF MIN NOT SELECTED
0D43 2A1964 1964 1027           DCI   H'1964'
0D46 2010        1028           LI    H'10'
0D48 8A          1029           NM
0D49 8418   0D62 1030           BZ    M75A
0D4B 2A19B8 19B8 1031  M75B     DCI   H'19B8'
0D4E 16          1032  M78      LM
0D4F 1F          1033           INC
0D50 51          1034           LR    1,A
0D51 901A   0D6C 1035           BR    M76        JUMP TO DECIMALIZE &
                 1036  *                         LOS
0D53 2A1964 1964 1037  M75      DCI   H'1964'    TEST FOR MAX SELECTION
0D56 78          1038           LIS   8
0D57 8A          1039           NM
0D58 840E   0D67 1040           BZ    M59        JUMP IF MAX NOT SELECTED
0D5A 2A1964 1964 1041           DCI   H'1964'
0D5D 2010        1042           LI    H'10'
0D5F 8A          1043           NM
0D60 84EA   0D4B 1044           BZ    M75B
0D62 2A19B9 19B9 1045  M75A     DCI   H'19B9'
0D65 90E8   0D4E 1046           BR    M78
0D67 2A1981 1981 1047  M59      DCI   H'1981'    DISPLAY RSC
0D6A 90E3   0D4E 1048           BR    M78
0D6C 70          1049  M76      CLR              CONVERT TO BCD & DISPLAY
0D6D 50          1050           LR    0,A
0D6E 281406 1406 1051           PI    SUBDEC
0D71 2A1780 1780 1052           DCI   TBL3       PREPARE TO DISPLAY
                 1053  *                         7-SEG FOR 2D DISPLAY
0D74 7F          1054           LIS   H'F'
0D75 F3          1055           NS    3
0D76 8E          1056           ADC
0D77 16          1057           LM
0D78 2A196A 196A 1058           DCI   H'196A'
0D7B 88          1059           AM
0D7C 2A196A 196A 1060           DCI   H'196A'
0D7F 17          1061           ST
0D80 2A196B 196B 1062           DCI   H'196B'
0D83 2080        1063           LI    H'80'
0D85 17          1064           ST
0D86 2A1780 1780 1065           DCI   TBL3
0D89 20F0        1066           LI    H'F0'
0D8B F3          1067           NS    3
0D8C 840C   0D99 1068           BZ    M77A       JUMP IF LEADING 0
                 1069  *                         SUPPRESION REQUIRED
0D8E 14          1070           SR    4
0D8F 8E          1071           ADC
0D90 16          1072           LM
0D91 2A196B 196B 1073           DCI   H'196B'
0D94 88          1074           AM
```

```
0D95 2A196B 196B 1075        DCI   H'196B'
0D98 17          1076        ST
0D99 2A198B 198B 1077  M77A  DCI   H'198B'
0D9C 70          1078        CLR
0D9D 88          1079        AM
0D9E 8415   0DB4 1080        BZ    M77
0DA0 2A1968 1968 1081        DCI   H'1968'
0DA3 2C          1082        XDC
0DA4 2A1966 1966 1083        DCI   H'1966'
0DA7 70          1084        CLR
0DA8 17          1085        ST
0DA9 17          1086        ST
0DAA 2080        1087        LI    H'80'
0DAC 8A          1088        NM
0DAD 2C          1089        XDC
0DAE 17          1090        ST
0DAF 2080        1091        LI    H'80'
0DB1 8A          1092        NM
0DB2 2C          1093        XDC
0DB3 17          1094        ST
0DB4 65          1095  M77   LISU  5
0DB5 6F          1096        LISL  7
0DB6 2060        1097        LI    H'60'
0DB8 FC          1098        NS    S
0DB9 2360        1099        XI    H'60'
0DBB 846C   0E28 1100        BZ    M54
0DBD 2A1964 1964 1101        DCI   H'1964'   PROCESS LOWER DISPLAY
0DC0 2080        1102        LI    H'80'     TEST FOR DISPLAY OFF
0DC2 8A          1103        NM
0DC3 9464   0E28 1104        BNZ   M54       JUMP IF LOWER DISPLAY TO
                 1105   *                    BE LEFT OFF
0DC5 74          1106        LIS   4         TEST FOR SPEED SELECTION
0DC6 8A          1107        NM
0DC7 2A1971 1971 1108        DCI   H'1971'
0DCA 2C          1109        XDC
0DCB 8432   0DFE 1110        BZ    M79       JUMP IF SPEED NOT SELECTED
0DCD 2C          1111        XDC             SET SPEED
0DCE 17          1112        ST
0DCF 2A197F 197F 1113        DCI   H'197F'   TEST FOR ENGLISH-METRIC
0DD2 70          1114        CLR
0DD3 88          1115        AM
0DD4 70          1116        CLR
0DD5 50          1117        LR    0,A
0DD6 2A1980 1980 1118        DCI   H'1980'   SELECT MPH REGISTER
0DD9 16          1119        LM
0DDA 51          1120        LR    1,A
0DDB 813A   0E16 1121        BP    M80       JUMP IF IN ENGLISH
0DDD 65          1122        LISU  5         CONVERT TO METRIC KMPH
0DDE 6A          1123        LISL  2         KMPH = MPH X 1609/000
0DDF 70          1124        CLR             XY = Z
0DE0 5D          1125        LR    I,A       X = MPH
0DE1 41          1126        LR    A,1
0DE2 5C          1127        LR    S,A
0DE3 66          1128        LISU  6         Y = D'1609' (H'0649')
0DE4 2049        1129        LI    H'49'
0DE6 5E          1130        LR    D,A
0DE7 76          1131        LIS   6
0DE8 5C          1132        LR    S,A
0DE9 281548 1548 1133        PI    SUBMUL
0DEC 66          1134        LISU  6         Z/Y = X
0DED 68          1135        LISL  0         Y = D'1000' (H'03E8')
0DEE 73          1136        LIS   3
0DEF 5D          1137        LR    I,A
0DF0 20E8        1138        LI    H'E8'
0DF2 5C          1139        LR    S,A
0DF3 28159C 159C 1140        PI    SUBDIV
0DF6 65          1141        LISU  5
0DF7 6A          1142        LISL  2
0DF8 4D          1143        LR    A,I
0DF9 50          1144        LR    0,A
0DFA 4C          1145        LR    A,S
0DFB 51          1146        LR    1,A
0DFC 9019   0E16 1147        BR    M80
0DFE 2A1965 1965 1148  M79   DCI   H'1965'   TEST FOR FIELD AREA
                 1149   *                    SELECTION
```

```
0E01 71             1150           LIS   1
0E02 8A             1151           NM
0E03 8408 0E0C      1152           BZ    M81         JUMP IF FIELD AREA NOT
                    1153  *                          SELECTED
0E05 2C             1154           XDC
0E06 17             1155           ST
0E07 2A1956 1956    1156           DCI   H'1956'     FIELD AREA STORAGE
                    1157  *                          LOCATION
0E0A 9007 0E12      1158           BR    M82         JUMP TO DECIMALIZE &
                    1159  *                          L0SJ
0E0C 2C             1160  M81      XDC               ASSUME TOTAL AREA
                    1161  *                          SELECTED
0E0D 72             1162           LIS   2
0E0E 17             1163           ST
0E0F 2A1958 1958    1164           DCI   H'1958'
0E12 16             1165  M82      LM
0E13 51             1166           LR    1,A
0E14 16             1167           LM
0E15 50             1168           LR    0,A
0E16 281406 1406    1169  M80      PI    SUBDEC
0E19 2A196D 196D    1170           DCI   H'196D'     SET DP2
0E1C 2080           1171           LI    H'80'
0E1E 17             1172           ST
0E1F 2A196C 196C    1173           DCI   H'196C'     SETUP FOR LOWER DISPLAY
                    1174  *                          BANK
0E22 2816C6 16C6    1175           PI    SUBSUP
0E25 28167B 167B    1176           PI    SUBDIS
0E28 2A197F 197F    1177  M54      DCI   H'197F'     TEST FOR OPERATE
0E2B 16             1178           LM
0E2C 2140           1179           NI    H'40'
0E2E 840D 0E3C      1180           BZ    M53         JMP IF IN SET UP
0E30 2A199C 199C    1181           DCI   H'199C'
0E33 71             1182           LIS   1
0E34 17             1183           ST
0E35 65             1184           LISU  5
0E36 6E             1185           LISL  6
0E37 73             1186           LIS   3
0E38 5C             1187           LR    S,A
0E39 290EFF 0EFF    1188           JMP   M83         JMP IF IN OPERATE
                    1189  *
                    1190  *
                    1191  *
                    1192  *        SET UP
                    1193  *
                    1194  *
                    1195  *
0E3C 2A199C 199C    1196  M53      DCI   H'199C'     DISPLAY SETUP
0E3F 70             1197           CLR
0E40 88             1198           AM                SETUP MODE REGISTER
0E41 50             1199           LR    0,A
0E42 2A1977 1977    1200           DCI   H'1977'     SET UP WORD DISPLAY
0E45 17             1201           ST
0E46 65             1202           LISU  5           SET CORRECT CURSOR
0E47 6E             1203           LISL  6
0E48 2A1972 1972    1204           DCI   H'1972'
0E4B 4C             1205           LR    A,S
0E4C 8E             1206           ADC
0E4D 2080           1207           LI    H'80'
0E4F 17             1208           ST
0E50 8109 0E5A      1209           BP    M84         JUMP IF NO. ROWS NOT
                    1210  *                          SELECTED
0E52 2A1962 1962    1211           DCI   H'1962'
0E55 16             1212           LM
0E56 1F             1213           INC
0E57 51             1214           LR    1,A
0E58 9024 0E7D      1215           BR    M98         JUMP TO PROCESS
                    1216  *                          DECIMALIZATION
0E5A 40             1217  M84      LR    A,0
0E5B 13             1218           SL    1
0E5C 8106 0E63      1219           BP    M86         JUMP IF ROW SPACING NOT
                    1220  *                          SELECTED
0E5E 2A1960 1960    1221           DCI   H'1960'     ADDRESS FOR ROW SPACING
0E61 9070 0ED2      1222           BR    M87         JUMP TO RETRIEVE & DISPLAY
0E63 13             1223  M86      SL    1           JMP IF ROW ON/OFF NOT
0E64 8122 0E87      1224           BP    M88         SELECTED
```

```
0E66 2A199E 199E 1225        DCI   H'199E'    SELECT SURC
0E69 16          1226        LM
0E6A 50          1227        LR    0,A
0E6B 1F          1228        INC
0E6C 51          1229        LR    1,A
0E6D 2A195C 195C 1230        DCI   H'195C'    DETERMINE IF ROW ON OR
                 1231   *                     OFF
0E70 70          1232        CLR              DETERMINE ROW BANK
0E71 281724 1724 1233        PI    ONOFF
0E74 2A1978 1978 1234        DCI   H'1978'    PREPARE TO SET ON OR OFF
0E77 74          1235        LIS   4
0E78 8403 0E7C   1236        BZ    M91        JUMP IF ROW ON
0E7A 2008        1237        LI    H'08'
0E7C 17          1238 M91    ST
0E7D 70          1239 M98    CLR
0E7E 50          1240        LR    0,A
0E7F 281406 1406 1241        PI    SUBDEC
0E82 20AA        1242        LI    H'AA'
0E84 52          1243        LR    2,A
0E85 9067 0EED   1244        BR    M85        JUMP TO DISPLAY
0E87 13          1245 M88    SL    1
0E88 812E 0EB7   1246        BP    M92        JUMP IF DIST. CAL. NOT
                 1247   *                     SELECTED
0E8A 2A199D 199D 1248        DCI   H'199D'
0E8D 74          1249        LIS   4
0E8E 8A          1250        NM
0E8F 2A1978 1978 1251        DCI   H'1978'
0E92 71          1252        LIS   1
0E93 841D 0EB1   1253        BZ    M93        JUMP IF SET SELECTED
0E95 72          1254        LIS   2          IN CAL RETRIEVE COUNT
                 1255   *                     FROM ACK
0E96 17          1256        ST
0E97 2023        1257        LI    H'23'
0E99 50          1258        LR    0,A
0E9A 2020        1259        LI    H'20'
0E9C 51          1260        LR    1,A
0E9D 2813D1 13D1 1261        PI    SUBACK
0EA0 43          1262        LR    A,3        DIVIDE BY 2
0EA1 12          1263        SR    1
0EA2 12          1264        SR    1
0EA3 51          1265        LR    1,A
0EA4 73          1266        LIS   3
0EA5 F2          1267        NS    2
0EA6 15          1268        SL    4
0EA7 13          1269        SL    1
0EA8 13          1270        SL    1
0EA9 C1          1271        AS    1
0EAA 51          1272        LR    1,A
0EAB 42          1273        LR    A,2
0EAC 12          1274        SR    1
0EAD 12          1275        SR    1
0EAE 50          1276        LR    0,A
0EAF 903A 0EEA   1277        BR    M85A
0EB1 17          1278 M93    ST
0EB2 2A195A 195A 1279        DCI   H'195A'    ADDRESS FOR DIST CAL
0EB5 901C 0ED2   1280        BR    M87        JUMP TO RETRIEVE &
                 1281   *                     DISPLAY
0EB7 13          1282 M92    SL    1
0EB8 8106 0EBF   1283        BP    M94        JUMP IF TOTAL AREA NOT
                 1284   *                     SELECTED
0EBA 2A1958 1958 1285        DCI   H'1958'    ADDRESS FOR TOTAL AREA
0EBD 9014 0ED2   1286        BR    M87        JUMP TO RETRIEVE & DISPLAY
0EBF 13          1287 M94    SL    1
0EC0 8106 0EC7   1288        BP    M95        JUMP IF FIELD AREA NOT
                 1289   *                     SELECTED
0EC2 2A1956 1956 1290        DCI   H'1956'    ADDRESS FOR FIELD AREA
0EC5 900C 0ED2   1291        BR    M87        JUMP TO RETRIEVE & DISPLAY
0EC7 13          1292 M95    SL    1
0EC8 8106 0ECF   1293        BP    M96        JUMP IF LO WARN NOT
                 1294   *                     SELECTED
0ECA 2A1948 1948 1295        DCI   H'1948'    ADDRESS FOR LO WARN
0ECD 9004 0ED2   1296        BR    M87        JUMP TO RETRIEVE & DISPLAY
0ECF 2A1946 1946 1297 M96    DCI   H'1946'    ASSUME HI WARN SELECTED
0ED2 2C          1298 M87    XDC              TEST IF DP3 REQUIRED
0ED3 2A199C 199C 1299        DCI   H'199C'    REQUIRED FOR ALL 4D
                 1300   *                     DISPLAYS EXCEPT DIST CAL.
```

```
0ED6 2010        1301          LI    H'10'
0ED8 8A          1302          NM
0ED9 940B  0EE5  1303          BNZ   M97        JUMP IF DIST CAL
                 1304   *                       SELECTED
0EDB 2A1978 1978 1305          DCI   H'1978'    SET DP3
0EDE 2010        1306          LI    H'10'
0EE0 8B          1307          OM
0EE1 2A1978 1978 1308          DCI   H'1978'
0EE4 17          1309          ST               DP3 SET
0EE5 2C          1310   M97    XDC
0EE6 16          1311          LM
0EE7 51          1312          LR    1,A
0EE8 16          1313          LM
0EE9 50          1314          LR    0,A
0EEA 281406 1406 1315   M85A   PI    SUBDEC
0EED 2A1972 1972 1316   M85    DCI   H'1972'    SET TO DISPLAY 4D SET UP
0EF0 28167B 167B 1317          PI    SUBDIS
0EF3 65          1318          LISU  5
0EF4 6F          1319          LISL  7
0EF5 70          1320          CLR
0EF6 CC          1321          AS    S
0EF7 8107  0EFF  1322          BP    M83
0EF9 2A1977 1977 1323          DCI   H'1977'
0EFC 20FF        1324          LI    H'FF'
0EFE 17          1325          ST
0EFF 65          1326   M83    LISU  5
0F00 6F          1327          LISL  7
0F01 72          1328          LIS   2
0F02 FC          1329          NS    S
0F03 940A  0F0E  1330          BNZ   M83B
0F05 6C          1331          LISL  4
0F06 71          1332          LIS   1
0F07 FC          1333          NS    S
0F08 840F  0F18  1334          BZ    M83A
0F0A 20FE        1335          LI    H'FE'
0F0C FC          1336          NS    S
0F0D 5C          1337          LR    S,A
0F0E 2A1979 1979 1338   M83B   DCI   H'1979'
0F11 2020        1339          LI    H'20'
0F13 88          1340          AM
0F14 2A1979 1979 1341          DCI   H'1979'
0F17 17          1342          ST
0F18 281256 1256 1343   M83A   PI    DISPLA
0F1B 65          1344          LISU  5
0F1C 6C          1345          LISL  4
0F1D 78          1346          LIS   8
0F1E FC          1347          NS    S
0F1F 9412  0F32  1348          BNZ   IGN
0F21 2A197F 197F 1349          DCI   H'197F'    TEST FOR AREA UPDATE
0F24 70          1350          CLR              K X DC/RW/N
0F25 88          1351          AM               K ENGLISH = 5227
0F26 65          1352          LISU  5          K METRIC = 1640
0F27 6A          1353          LISL  2
0F28 910C  0F35  1354          BM    M98A       JUMP IF IN METRIC
0F2A 2014        1355          LI    H'14'      K = 5227  (H'146B')
0F2C 5D          1356          LR    I,A
0F2D 206B        1357          LI    H'6B'
0F2F 5C          1358          LR    S,A
0F30 900A  0F3B  1359          BR    M99
0F32 290A84 0A84 1360   IGN    JMP   M136
0F35 2040        1361   M98A   LI    H'40'      K = 16404  (H'4014')
0F37 5D          1362          LR    I,A
0F38 2014        1363          LI    H'14'
0F3A 5C          1364          LR    S,A
0F3B 66          1365   M99    LISU  6
0F3C 2A195A 195A 1366          DCI   H'195A'    DIST CAL C0
0F3F 16          1367          LM
0F40 5E          1368          LR    D,A
0F41 16          1369          LM
0F42 5C          1370          LR    S,A
0F43 281548 1548 1371          PI    SUBMUL     K X DC -> Z
0F46 67          1372          LISU  7
0F47 68          1373          LISL  0
0F48 4C          1374          LR    A,S
0F49 6C          1375          LISL  4
```

```
0F4A  5C              1376    LR    S,A
0F4B  69              1377    LISL  1
0F4C  4C              1378    LR    A,S
0F4D  6D              1379    LISL  5
0F4E  5C              1380    LR    S,A
0F4F  6A              1381    LISL  2
0F50  4C              1382    LR    A,S
0F51  6E              1383    LISL  6
0F52  5C              1384    LR    S,A
0F53  6B              1385    LISL  3
0F54  4C              1386    LR    A,S
0F55  6F              1387    LISL  7
0F56  5C              1388    LR    S,A
0F57  66              1389    LISU  6
0F58  6B              1390    LISL  3
0F59  2A1960 1960     1391    DCI   H'1960'    ROW SPACE C0
0F5C  16              1392    LM
0F5D  5E              1393    LR    D,A
0F5E  16              1394    LM
0F5F  5C              1395    LR    S,A
0F60  2A1962 1962     1396    DCI   H'1962'
0F63  65              1397    LISU  5
0F64  6B              1398    LISL  3
0F65  16              1399    LM
0F66  1F              1400    INC
0F67  5E              1401    LR    D,A
0F68  16              1402    LM
0F69  5E              1403    LR    D,A
0F6A  281548 1548     1404    PI    SUBMUL
0F6D  67              1405    LISU  7
0F6E  6B              1406    LISL  3
0F6F  4C              1407    LR    A,S
0F70  66              1408    LISU  6
0F71  69              1409    LISL  1
0F72  5C              1410    LR    S,A
0F73  67              1411    LISU  7
0F74  6A              1412    LISL  2
0F75  4C              1413    LR    A,S
0F76  66              1414    LISU  6
0F77  68              1415    LISL  0
0F78  5C              1416    LR    S,A
0F79  67              1417    LISU  7
0F7A  6F              1418    LISL  7
0F7B  4C              1419    LR    A,S
0F7C  6B              1420    LISL  3
0F7D  5C              1421    LR    S,A
0F7E  6E              1422    LISL  6
0F7F  4C              1423    LR    A,S
0F80  6A              1424    LISL  2
0F81  5C              1425    LR    S,A
0F82  6D              1426    LISL  5
0F83  4C              1427    LR    A,S
0F84  69              1428    LISL  1
0F85  5C              1429    LR    S,A
0F86  6C              1430    LISL  4
0F87  4C              1431    LR    A,S
0F88  68              1432    LISL  0
0F89  5C              1433    LR    S,A
0F8A  28159C 159C     1434    PI    SUBDIV     ( (K X DC)/RW)/N -> X
0F8D  65              1435    LISU  5          X -> Z
0F8E  6B              1436    LISL  3
0F8F  4C              1437    LR    A,S
0F90  67              1438    LISU  7
0F91  5E              1439    LR    D,A
0F92  65              1440    LISU  5
0F93  4C              1441    LR    A,S
0F94  67              1442    LISU  7
0F95  5E              1443    LR    D,A
0F96  70              1444    CLR
0F97  5E              1445    LR    D,A
0F98  5C              1446    LR    S,A
0F99  66              1447    LISU  6
0F9A  5D              1448    LR    I,A
0F9B  5D              1449    LR    I,A
0F9C  2020            1450    LI    H'20'      ACK IDENTITY CODE
```

```
0F9E 51            1451           LR    1,A
0F9F 2021          1452           LI    H'21'      1/10 ACRE ACCUMULATOR CODE
0FA1 50            1453           LR    0,A
0FA2 2813D1  13D1  1454           PI    SUBACK     ACRE DIST. ACCUMULATED
0FA5 42            1455           LR    A,2
0FA6 5D            1456           LR    I,A
0FA7 43            1457           LR    A,3
0FA8 5C            1458           LR    S,A
0FA9 281531  1531  1459           PI    SUBMIN     Z - Y = Z
0FAC 8238    0FE5  1460           BC    M100       JUMP IF NOT ENOUGH DIST ACC
0FAE 2A197F  197F  1461           DCI   H'197F'
0FB1 70            1462           CLR
0FB2 88            1463           AM
0FB3 810A    0FBE  1464           BP    M101A
0FB5 66            1465           LISU  6
0FB6 6C            1466           LISL  4
0FB7 4C            1467           LR    A,S
0FB8 1F            1468           INC
0FB9 5C            1469           LR    S,A
0FBA 2101          1470           NI    H'01'      TEST IF UP TO .20/200  OR 1
0FBC 941C    0FD9  1471           BNZ   M101       JUMP IF NOT YET ACCUMULATED
0FBE 2A1956  1956  1472   M101A   DCI   H'1956'    INCREMENT AREA COUNTERS
0FC1 2C            1473           XDC
0FC2 2A1956  1956  1474           DCI   H'1956'
0FC5 71            1475           LIS   1          INCREMENT FIELD AREA
0FC6 88            1476           AM
0FC7 2C            1477           XDC
0FC8 17            1478           ST
0FC9 70            1479           CLR
0FCA 19            1480           LNK
0FCB 88            1481           AM
0FCC 2C            1482           XDC
0FCD 17            1483           ST
0FCE 71            1484           LIS   1          INCREMENT TOTAL AREA
0FCF 88            1485           AM
0FD0 2C            1486           XDC
0FD1 17            1487           ST
0FD2 70            1488           CLR
0FD3 19            1489           LNK
0FD4 88            1490           AM
0FD5 2C            1491           XDC
0FD6 17            1492           ST
0FD7 70            1493           CLR        RESET 1/200 ACRE ACCUMULATO
0FD8 5C            1494           LR    S,A
0FD9 2020          1495   M101    LI    H'20'
0FDB 51            1496           LR    1,A
0FDC 2061          1497           LI    H'61'      RESET ACK
0FDE 50            1498           LR    0,A
0FDF 2813D1  13D1  1499           PI    SUBACK
0FE2 2813D1  13D1  1500           PI    SUBACK
0FE5 2A199D  199D  1501   M100    DCI   H'199D'    TEST FOR 1/200 ACRE POP UPD
0FE8 74            1502           LIS   4          TEST IF IN DIST CAL
0FE9 8A            1503           NM
0FEA 941A    1005  1504           BNZ   M102A      JMP IF IN DIST CAL
0FEC A1            1505           INS   1          TEST IF LIFT SW ACTIVE
0FED 2102          1506           NI    H'02'      T8 ACTIVE
0FEF 9415    1005  1507           BNZ   M102A      JUMP IF LIFT SWITCH ACTIVE
0FF1 2A1989  1989  1508           DCI   H'1989'    TEST T8  5 SEC LIFT SWITCH
0FF4 88            1509           AM
0FF5 940F    1005  1510           BNZ   M102A      JUMP IF T8 ACTIVE
0FF7 2A197F  197F  1511           DCI   H'197F'    TEST FOR ENGLISH - METRIC
0FFA 88            1512           AM                K ENGLISH = 261
0FFB 65            1513           LISU  5          K METRIC = 1640
0FFC 6A            1514           LISL  2
0FFD 910A    1008  1515           BM    M103       JUMP IF IN METRIC
0FFF 71            1516           LIS   1          K = D'261' (H'0105')
1000 5D            1517           LR    I,A
1001 75            1518           LIS   5
1002 5C            1519           LR    S,A
1003 9009    100D  1520           BR    M104
1005 290A84  0A84  1521   M102A   JMP   M136
1008 76            1522   M103    LIS   6          K = D'1640' (H'0668')
1009 5D            1523           LR    I,A
100A 2068          1524           LI    H'68'
100C 5C            1525           LR    S,A
```

```
100D 66          1526  M104  LISU    6
100E 2A195A 195A 1527        DCI     H'195A'     DIST CAL C0
1011 16          1528        LM
1012 5E          1529        LR      D,A
1013 16          1530        LM
1014 5C          1531        LR      S,A
1015 281548 1548 1532        PI      SUBMUL      K TIMES DC --> Z
1018 66          1533        LISU    6
1019 69          1534        LISL    1
101A 2A1960 1960 1535        DCI     H'1960'     ROW SPACE C0
101D 16          1536        LM
101E 5E          1537        LR      D,A
101F 16          1538        LM
1020 5C          1539        LR      S,A
1021 28159C 159C 1540        PI      SUBDIV      (K X DC ) / RW --> X
1024 65          1541        LISU    5
1025 6B          1542        LISL    3
1026 4C          1543        LR      A,S
1027 67          1544        LISU    7
1028 5E          1545        LR      D,A
1029 65          1546        LISU    5
102A 4C          1547        LR      A,S
102B 67          1548        LISU    7
102C 5E          1549        LR      D,A
102D 70          1550        CLR
102E 5E          1551        LR      D,A
102F 5C          1552        LR      S,A
1030 66          1553        LISU    6
1031 5D          1554        LR      I,A
1032 5D          1555        LR      I,A
1033 2020        1556        LI      H'20'       ACK IDENTITY CODE
1035 51          1557        LR      1,A
1036 2023        1558        LI      H'23'       1/200TH ACRE ACCUMULATOR
                 1559  *                         CODE
1038 50          1560        LR      0,A
1039 2813D1 13D1 1561        PI      SUBACK      DIST. ACCUMULATED
103C 42          1562        LR      A,2
103D 5D          1563        LR      I,A
103E 43          1564        LR      A,3
103F 5C          1565        LR      S,A
1040 281531 1531 1566        PI      SUBMIN      Z-Y = Z
1043 82C1   1005 1567        BC      M102A       JMP IF NOT ENOUGH DIST.
                 1568  *                         ACCUMULATED
1045 65          1569        LISU    5
1046 6F          1570        LISL    7
1047 20F7        1571        LI      H'F7'
1049 FC          1572        NS      S
104A 5C          1573        LR      S,A
104B 2A18C0 18C0 1574        DCI     H'18C0'     TRANSFER C REGISTERS TO
                 1575  *                         D REGISTERS
104E 2C          1576        XDC
104F 2A1880 1880 1577        DCI     H'1880'
1052 2040        1578        LI      H'40'       DO 64 REGISTERS
1054 50          1579        LR      0,A
1055 16          1580  M105  LM
1056 2C          1581        XDC
1057 17          1582        ST
1058 2C          1583        XDC
1059 30          1584        DS      0
105A 94FA   1055 1585        BNZ     M105        JUMP IF NOT THROUGH ALL 64
105C 2A1880 1880 1586        DCI     H'1880'     TRANSFER B REGISTERS TO C R
105F 2C          1587        XDC
1060 2A1840 1840 1588        DCI     H'1840'
1063 2040        1589        LI      H'40'       DO 64 REGISTERS
1065 50          1590        LR      0,A
1066 16          1591  M106  LM
1067 2C          1592        XDC
1068 17          1593        ST
1069 2C          1594        XDC
106A 30          1595        DS      0
106B 94FA   1066 1596        BNZ     M106        JUMP IF NOT THROUGH ALL 64
106D 2A1840 1840 1597        DCI     H'1840'     TRANSFER A REGISTERS TO B R
1070 2C          1598        XDC
1071 2A1800 1800 1599        DCI     H'1800'
1074 2040        1600        LI      H'40'       DO 64 REGISTERS
```

| | | | | | | |
|---|---|---|---|---|---|---|
| 1076 | 50 | | 1601 | | LR | 0,A |
| 1077 | 16 | | 1602 | M107 | LM | |
| 1078 | 2C | | 1603 | | XDC | |
| 1079 | 17 | | 1604 | | ST | |
| 107A | 2C | | 1605 | | XDC | |
| 107B | 30 | | 1606 | | DS | 0 |
| 107C | 94FA | 1077 | 1607 | | BNZ | M107 | JUMP IF NOT THROUGH ALL 64
| 107E | 2A1985 | 1985 | 1608 | | DCI | H'1985' |
| 1081 | 2028 | | 1609 | | LI | H'28' |
| 1083 | 17 | | 1610 | | ST | |
| 1084 | 2050 | | 1611 | | LI | H'50' |
| 1086 | 17 | | 1612 | | ST | |
| 1087 | 2020 | | 1613 | | LI | H'20' | RETRIEVE ACK INFO TO A REGI
| 1089 | 51 | | 1614 | | LR | 1,A | AFTER MULTIPLYING BY 2
| 108A | 72 | | 1615 | | LIS | 2 |
| 108B | 55 | | 1616 | | LR | 5,A |
| 108C | 2A1800 | 1800 | 1617 | | DCI | H'1800' | A ROW 1 C1 ADDRESS
| 108F | 2041 | | 1618 | M111 | LI | H'41' | 1 ST ROW W/RESET
| 1091 | 50 | | 1619 | | LR | 0,A |
| 1092 | 2010 | | 1620 | | LI | H'10' | DO 16 ROWS
| 1094 | 54 | | 1621 | | LR | 4,A |
| 1095 | 2813D1 | 13D1 | 1622 | M109 | PI | SUBACK | C1 C0 -> R2R3
| 1098 | 42 | | 1623 | | LR | A,2 | MULTIPLY BY 2
| 1099 | 13 | | 1624 | | SL | 1 |
| 109A | 52 | | 1625 | | LR | 2,A |
| 109B | 70 | | 1626 | | CLR | |
| 109C | C3 | | 1627 | | AS | 3 |
| 109D | 8104 | 10A2 | 1628 | | BP | M108 | JMP IF BIT 7 = 0
| 109F | 71 | | 1629 | | LIS | 1 |
| 10A0 | C2 | | 1630 | | AS | 2 |
| 10A1 | 52 | | 1631 | | LR | 2,A |
| 10A2 | 43 | | 1632 | M108 | LR | A,3 |
| 10A3 | 13 | | 1633 | | SL | 1 |
| 10A4 | 53 | | 1634 | | LR | 3,A |
| 10A5 | 42 | | 1635 | | LR | A,2 | TRANSFER TO A REGISTER
| 10A6 | 17 | | 1636 | | ST | |
| 10A7 | 43 | | 1637 | | LR | A,3 |
| 10A8 | 17 | | 1638 | | ST | |
| 10A9 | 72 | | 1639 | | LIS | 2 | INCREMENT TO NEXT ROW
| 10AA | C0 | | 1640 | | AS | 0 |
| 10AB | 50 | | 1641 | | LR | 0,A |
| 10AC | 34 | | 1642 | | DS | 4 |
| 10AD | 94E7 | 1095 | 1643 | | BNZ | M109 | JUMP IF NOT THROUGH
| 10AF | 35 | | 1644 | | DS | 5 |
| 10B0 | 840B | 10BC | 1645 | | BZ | M110 | JUMP IF THROUGH ALL 32 ROWS
| 10B2 | 65 | | 1646 | | LISU | 5 | TEST IF 32 ROW UNIT
| 10B3 | 6D | | 1647 | | LISL | 5 |
| 10B4 | 70 | | 1648 | | CLR | |
| 10B5 | CC | | 1649 | | AS | S | SET STATUS REGISTER
| 10B6 | 8105 | 10BC | 1650 | | BP | M110 | JUMP IF NOT 32 ROW UNIT
| 10B8 | 74 | | 1651 | | LIS | 4 | ACK IDENTITY CODE
| 10B9 | 51 | | 1652 | | LR | 1,A |
| 10BA | 90D4 | 108F | 1653 | | BR | M111 |
| 10BC | 2A1900 | 1900 | 1654 | M110 | DCI | H'1900' | RESET ALL E REGISTERS & DI
| 10BF | 2044 | | 1655 | | LI | H'44' |
| 10C1 | 50 | | 1656 | | LR | 0,A |
| 10C2 | 70 | | 1657 | | CLR | |
| 10C3 | 17 | | 1658 | M112 | ST | |
| 10C4 | 30 | | 1659 | | DS | 0 |
| 10C5 | 94FD | 10C3 | 1660 | | BNZ | M112 | JUMP IF NOT THROUGH ALL 68
| 10C7 | 28164C | 164C | 1661 | | PI | RESET |
| 10CA | 28164C | 164C | 1662 | | PI | RESET | RESET ALL ACK ACCUMULATORS
| 10CD | 2A1985 | 1985 | 1663 | | DCI | H'1985' |
| 10D0 | 2028 | | 1664 | | LI | H'28' |
| 10D2 | 17 | | 1665 | | ST | |
| 10D3 | 70 | | 1666 | | CLR | | PROCESS AVG CALCULATIONS
| 10D4 | 50 | | 1667 | | LR | 0,A | ROW COUNTER (X2)
| 10D5 | 70 | | 1668 | M116 | CLR | |
| 10D6 | 51 | | 1669 | | LR | 1,A | CLEAR "# GOOD" REGISTER
| 10D7 | 53 | | 1670 | | LR | 3,A | CLEAR SUM REGISTER
| 10D8 | 54 | | 1671 | | LR | 4,A | CLEAR SUM REGISTER
| 10D9 | 74 | | 1672 | | LIS | 4 |
| 10DA | 52 | | 1673 | | LR | 2,A | DO 4 BANKS
| 10DB | 2A18C0 | 18C0 | 1674 | | DCI | H'18C0' |
| 10DE | 40 | | 1675 | | LR | A,0 |

```
10DF 8E              1676             ADC
10E0 2816E6 16E6 1677 M114    PI    SUBLIM
10E3 940D   10F1 1678         BNZ   M113        JUMP IF POP OUTSIDE HI LO
10E5 41          1679         LR    A,1         INCREMENT "# GOOD" COUNTER
10E6 1F          1680         INC
10E7 51          1681         LR    1,A
10E8 66          1682         LISU  6           ADD TO SUM REGISTER
10E9 6B          1683         LISL  3
10EA 4E          1684         LR    A,D
10EB C4          1685         AS    4
10EC 54          1686         LR    4,A
10ED 4C          1687         LR    A,S
10EE 19          1688         LNK
10EF C3          1689         AS    3
10F0 53          1690         LR    3,A
10F1 20BE        1691 M113    LI    H'BE'       SUBTRACT 66  TO GET TO NEX
10F3 8E          1692         ADC
10F4 32          1693         DS    2
10F5 94EA  10E0 1694         BNZ   M114        JUMP IF NOT THROUGH ALL 4
10F7 2A19C0 19C0 1695         DCI   H'19C0'     AVG. ROW ADDRESS
10FA 40          1696         LR    A,0
10FB 8E          1697         ADC
10FC 70          1698         CLR
10FD C1          1699         AS    1
10FE 8421  1120 1700         BZ    M115        JUMP IF ALL READINGS OUSII
1100 67          1701         LISU  7
1101 6B          1702         LISL  3
1102 44          1703         LR    A,4
1103 5E          1704         LR    D,A
1104 43          1705         LR    A,3
1105 5E          1706         LR    D,A
1106 70          1707         CLR
1107 5E          1708         LR    D,A
1108 5C          1709         LR    S,A
1109 66          1710         LISU  6
110A 5D          1711         LR    I,A
110B 41          1712         LR    A,1
110C 5C          1713         LR    S,A
110D 28159C 159C 1714         PI    SUBDIV
1110 65          1715         LISU  5
1111 6A          1716         LISL  2
1112 4D          1717         LR    A,I
1113 17          1718         ST
1114 4C          1719         LR    A,S
1115 17          1720         ST
1116 203E        1721 M118    LI    H'3E'       TEST IF DONE WITH ALL 32 RI
1118 E0          1722         XS    0
1119 840E  1128 1723         BZ    M117        JUMP IF THROUGH ALL 32 ROW:
111B 72          1724         LIS   2           INCREMENT FOR PROCESSING NI
111C C0          1725         AS    0
111D 50          1726         LR    0,A
111E 90B6  10D5 1727         BR    M116        JUMP TO DO NEXT ROW
1120 66          1728 M115    LISU  6
1121 6A          1729         LISL  2
1122 4D          1730         LR    A,I
1123 17          1731         ST
1124 4C          1732         LR    A,S
1125 17          1733         ST
1126 90EF  1116 1734         BR    M118
1128 2A19C0 19C0 1735 M117    DCI   H'19C0'     FIND MIN ROW
112B 70          1736         CLR
112C 56          1737         LR    6,A         CODE FOR MIN ROW TEST
112D 50          1738         LR    0,A         ROW UNDER TEST
112E 51          1739         LR    1,A         MIN ROW STD.
112F 20FF        1740         LI    H'FF'       START OFF WITH LARGE NUMBEF
1131 52          1741         LR    2,A
1132 53          1742         LR    3,A
1133 1A          1743 M123    DI
1134 0E          1744         LR    Q,DC
1135 2A195C 195C 1745         DCI   H'195C'     ROW ON/OFF ADDRESS
1138 281724 1724 1746         PI    ONOFF       TEST IF ROW OFF
113B 1A          1747         DI
113C 0F          1748         LR    DC,Q
113D 1B          1749         EI
113E 9424  1163 1750         BNZ   M119A       JUMP IF ROW OFF
```

```
1140 2813F3 13F3 1751         PI    SUBSET
1143 281531 1531 1752         PI    SUBMIN
1146 70          1753         CLR
1147 19          1754         LNK
1148 57          1755         LR    7,A            STORE CARRY CODE
1149 70          1756         CLR
114A C6          1757         AS    6
114B 70          1758         CLR
114C 911A   1167 1759         BM    M120           JUMOP IF DOING MAX
114E C7          1760         AS    7
114F 8409   1159 1761         BZ    M119           JUMP IF NEW ROW > STORED RC
1151 40          1762  M121   LR    A,0
1152 51          1763         LR    1,A
1153 66          1764         LISU  6              SET UP NEW ROW VALUE
1154 6A          1765         LISL  2
1155 4D          1766         LR    A,I
1156 52          1767         LR    2,A
1157 4C          1768         LR    A,S
1158 53          1769         LR    3,A
1159 201F        1770  M119   LI    H'1F'          TEST IF THROUGH ALL ROWS
115B E0          1771         XS    0
115C 840F   116C 1772         BZ    M122           JUMP IF THROUGH ALL 32 ROWS
115E 71          1773         LIS   1              INCREMENT TO NEXT ROW
115F C0          1774         AS    0
1160 50          1775         LR    0,A
1161 90D1   1133 1776         BR    M123
1163 16          1777  M119A  LM
1164 16          1778         LM
1165 90F3   1159 1779         BR    M119
1167 C7          1780  M120   AS    7
1168 94F0   1159 1781         BNZ   M119           JUMP IF NEW ROW
116A 90E6   1151 1782         BR    M121
116C C6          1783  M122   AS    6
116D 9118   1186 1784         BM    M124           JUMP IF NEW ROW < STORED RO
116F 2A19B8 19B8 1785         DCI   H'19B8'        MIN ROW FOUND
1172 41          1786         LR    A,1
1173 17          1787         ST
1174 16          1788         LM                   DUMMY INSTRUCTION TO INCREM
1175 42          1789         LR    A,2
1176 17          1790         ST
1177 43          1791         LR    A,3
1178 17          1792         ST                   MIN POP STORAGE
1179 2080        1793         LI    H'80'          SET CODE FOR MAX ROW
117B 56          1794         LR    6,A
117C 70          1795         CLR
117D 50          1796         LR    0,A
117E 51          1797         LR    1,A
117F 52          1798         LR    2,A
1180 53          1799         LR    3,A
1181 2A19C0 19C0 1800         DCI   H'19C0'
1184 90AE   1133 1801         BR    M123           GO FIND MAX ROW
1186 2A19B9 19B9 1802  M124   DCI   H'19B9'        MAX ROW FOUND
1189 41          1803         LR    A,1
118A 17          1804         ST
118B 2A19BE 19BE 1805         DCI   H'19BE'        STORE MAX ROW POP
118E 42          1806         LR    A,2
118F 17          1807         ST
1190 43          1808         LR    A,3
1191 17          1809         ST
1192 67          1810         LISU  7              CALCULATE AVG POP
1193 6B          1811         LISL  3
1194 70          1812  M125   CLR
1195 5E          1813         LR    D,A
1196 8FFD   1194 1814         BR7   M125
1198 66          1815         LISU  6
1199 68          1816         LISL  0
119A 5D          1817         LR    I,A
119B 5D          1818         LR    I,A
119C 50          1819         LR    0,A            ROW #
119D 51          1820         LR    1,A            # GOOD ROWS COUNTER
119E 2A195C 195C 1821  M128   DCI   H'195C'
11A1 281724 1724 1822         PI    ONOFF
11A4 941D   11C2 1823         BNZ   M126A          JUMP IF ROW OFF
11A6 2A19C0 19C0 1824         DCI   H'19C0'
11A9 40          1825         LR    A,0
```

| | | | | | | |
|---|---|---|---|---|---|---|
| 11AA | 13 | | 1826 | | SL | 1 |
| 11AB | 8E | | 1827 | | ADC | |
| 11AC | 66 | | 1828 | | LISU | 6 | ADD ROW TO SUM TOTAL
| 11AD | 6A | | 1829 | | LISL | 2 |
| 11AE | 16 | | 1830 | | LM | |
| 11AF | 5D | | 1831 | | LR | I,A |
| 11B0 | 16 | | 1832 | | LM | |
| 11B1 | 5C | | 1833 | | LR | S,A |
| 11B2 | 28151E | 151E | 1834 | | PI | SUBPLS |
| 11B5 | 41 | | 1835 | | LR | A,1 | INCREMENT # GOOD ROWS COUNT
| 11B6 | 1F | | 1836 | | INC | |
| 11B7 | 51 | | 1837 | | LR | 1,A |
| 11B8 | 201F | | 1838 | M126 | LI | H'1F' | TEST IF THROUGH ALL ROWS
| 11BA | E0 | | 1839 | | XS | 0 |
| 11BB | 840A | 11C6 | 1840 | | BZ | M127 | JUMP IF THROUGH ALL ROWS
| 11BD | 40 | | 1841 | | LR | A,0 | INCREMENT TO NEXT ROW
| 11BE | 1F | | 1842 | | INC | |
| 11BF | 50 | | 1843 | | LR | 0,A |
| 11C0 | 90DD | 119E | 1844 | | BR | M128 |
| 11C2 | 16 | | 1845 | M126A | LM | |
| 11C3 | 16 | | 1846 | | LM | |
| 11C4 | 90F3 | 11B8 | 1847 | | BR | M126 |
| 11C6 | 66 | | 1848 | M127 | LISU | 6 | DIVIDE SUM BY # GOOD ROWS
| 11C7 | 68 | | 1849 | | LISL | 0 |
| 11C8 | 70 | | 1850 | | CLR | |
| 11C9 | 5D | | 1851 | | LR | I,A |
| 11CA | 41 | | 1852 | | LR | A,1 |
| 11CB | 5C | | 1853 | | LR | S,A |
| 11CC | 28159C | 159C | 1854 | | PI | SUBDIV |
| 11CF | 2A19BC | 19BC | 1855 | | DCI | H'19BC' | AVG POP STORAGE
| 11D2 | 65 | | 1856 | | LISU | 5 |
| 11D3 | 6A | | 1857 | | LISL | 2 |
| 11D4 | 4D | | 1858 | | LR | A,I |
| 11D5 | 17 | | 1859 | | ST | |
| 11D6 | 4C | | 1860 | | LR | A,S |
| 11D7 | 17 | | 1861 | | ST | | AVG POP STORED
| 11D8 | 2A1990 | 1990 | 1862 | | DCI | H'1990' | RESET ALL HI/LO FLAGS
| 11DB | 7C | | 1863 | | LIS | H'C' |
| 11DC | 50 | | 1864 | | LR | 0,A |
| 11DD | 70 | | 1865 | | CLR | |
| 11DE | 17 | | 1866 | M129 | ST | |
| 11DF | 30 | | 1867 | | DS | 0 |
| 11E0 | 94FD | 11DE | 1868 | | BNZ | M129 |
| 11E2 | 70 | | 1869 | | CLR | | SET HI/LO FLAGS
| 11E3 | 50 | | 1870 | | LR | 0,A | START WITH ROW 1
| 11E4 | 2A195C | 195C | 1871 | M134 | DCI | H'195C' | CHECK IF ROW OFF
| 11E7 | 281724 | 1724 | 1872 | | PI | ONOFF |
| 11EA | 941B | 1206 | 1873 | | BNZ | M130 | JUMP IF ROW OFF
| 11EC | 2A1800 | 1800 | 1874 | | DCI | H'1800' | A POP ADDRESS
| 11EF | 40 | | 1875 | | LR | A,0 |
| 11F0 | 13 | | 1876 | | SL | 1 | ROW POP UNDER TEST SELECTED
| 11F1 | 8E | | 1877 | | ADC | |
| 11F2 | 2816E6 | 16E6 | 1878 | | PI | SUBLIM | CHECK IF OUTSIDE HI LO LIMI
| 11F5 | 8410 | 1206 | 1879 | | BZ | M130 | JUMP IF WITHIN LIMITS
| 11F7 | 8206 | 11FE | 1880 | | BC | M131 | JUMP IF OUTSIDE LO LIMIT
| 11F9 | 2A1994 | 1994 | 1881 | | DCI | H'1994' | OUTSIDE HI LIMIT. SET HI FL
| 11FC | 9004 | 1201 | 1882 | | BR | M132 |
| 11FE | 2A1990 | 1990 | 1883 | M131 | DCI | H'1990' |
| 1201 | 71 | | 1884 | M132 | LIS | 1 | CODE FOR SETTING BIT
| 1202 | 51 | | 1885 | | LR | 1,A |
| 1203 | 281741 | 1741 | 1886 | | PI | BITSET | SET HI/LO FLAG BIT
| 1206 | 201F | | 1887 | M130 | LI | H'1F' | TEST IF THROUGH ALL 32 ROWS
| 1208 | E0 | | 1888 | | XS | 0 |
| 1209 | 8406 | 1210 | 1889 | | BZ | M133 | JUMP IF THROUGH ALL 32 ROWS
| 120B | 40 | | 1890 | | LR | A,0 | INCREMENT TO NEXT ROW
| 120C | 1F | | 1891 | | INC | |
| 120D | 50 | | 1892 | | LR | 0,A |
| 120E | 90D5 | 11E4 | 1893 | | BR | M134 |
| 1210 | 2A1990 | 1990 | 1894 | M133 | DCI | H'1990' | SET HI/LO ALARM FLAGS
| 1213 | 74 | | 1895 | | LIS | 4 | LO FLAGS + HI FLAGS = HI/L
| 1214 | 50 | | 1896 | | LR | 0,A | DO 4 BANKS
| 1215 | 16 | | 1897 | M135 | LM | |
| 1216 | 51 | | 1898 | | LR | 1,A |
| 1217 | 73 | | 1899 | | LIS | 3 |
| 1218 | 8E | | 1900 | | ADC | |

| | | | | | | |
|---|---|---|---|---|---|---|
| 1219 | 41 | | 1901 | | LR | A,1 |
| 121A | 88 | | 1902 | | AM | | LO FLAGS + HI FLAGS |
| 121B | 51 | | 1903 | | LR | 1,A |
| 121C | 73 | | 1904 | | LIS | 3 |
| 121D | 8E | | 1905 | | ADC | |
| 121E | 41 | | 1906 | | LR | A,1 |
| 121F | 17 | | 1907 | | ST | | HI/LO ALARM FLAG STORE |
| 1220 | 20F8 | | 1908 | | LI | H'F8' | BACK UP DC TO DO NEXT BANK |
| 1222 | 8E | | 1909 | | ADC | |
| 1223 | 30 | | 1910 | | DS | 0 |
| 1224 | 94F0 | 1215 | 1911 | | BNZ | M135 |
| 1226 | 2817A0 | 17A0 | 1912 | | PI | HILO |
| 1229 | 2A198B | 198B | 1913 | | DCI | H'198B' |
| 122C | 76 | | 1914 | | LIS | 6 |
| 122D | 17 | | 1915 | | ST | |
| 122E | 290A84 | 0A84 | 1916 | M102 | JMP | M136 |
| | | | 1917 | | END | |

| | | | | | | |
|---|---|---|---|---|---|---|
| | | | 0001 | | TITLE | DELUXE TIMER DES |
| | | | 0002 | * | | |
| | | | 0003 | * | | |
| | | | 0004 | * | | |
| | | | 0005 | * | | |
| | | | 0006 | * | | |
| | | | 0007 | * | | |
| | | | 0008 | * | TIMER INTERRUPT | |
| | | | 0009 | * | | |
| | | | 0010 | * | | |
| | | | 0011 | * | | |
| | | 0000 | 0012 | START | EQU | H'0000' |
| | | 1256 | 0013 | DISPLA | EQU | H'1256' |
| | | 128C | 0014 | ADDIN | EQU | H'128C' |
| | | 12AF | 0015 | READ | EQU | H'12AF' |
| | | 12EE | 0016 | SWITCH | EQU | H'12EE' |
| | | 1334 | 0017 | ERASE | EQU | H'1334' |
| | | 1373 | 0018 | WRITE | EQU | H'1373' |
| | | 13D1 | 0019 | SUBACK | EQU | H'13D1' |
| | | 13F3 | 0020 | SUBSET | EQU | H'13F3' |
| | | 1406 | 0021 | SUBDEC | EQU | H'1406' |
| | | 1451 | 0022 | SUBINC | EQU | H'1451' |
| | | 14AD | 0023 | SUBOFF | EQU | H'14AD' |
| | | 14DA | 0024 | SUBROW | EQU | H'14DA' |
| | | 151E | 0025 | SUBPLS | EQU | H'151E' |
| | | 1531 | 0026 | SUBMIN | EQU | H'1531' |
| | | 1548 | 0027 | SUBMUL | EQU | H'1548' |
| | | 159C | 0028 | SUBDIV | EQU | H'159C' |
| | | 1605 | 0029 | FAILED | EQU | H'1605' |
| | | 164C | 0030 | RESET | EQU | H'164C' |
| | | 167B | 0031 | SUBDIS | EQU | H'167B' |
| | | 16C6 | 0032 | SUBSUP | EQU | H'16C6' |
| | | 16E6 | 0033 | SUBLIM | EQU | H'16E6' |
| | | 1724 | 0034 | ONOFF | EQU | H'1724' |
| | | 1741 | 0035 | BITSET | EQU | H'1741' |
| | | 176E | 0036 | TBL1 | EQU | H'176E' |
| | | 1776 | 0037 | TBL2 | EQU | H'1776' |
| | | 1780 | 0038 | TBL3 | EQU | H'1780' |
| | | 178B | 0039 | SETBCK | EQU | H'178B' |
| | | 17A0 | 0040 | HILO | EQU | H'17A0' |
| | | | 0041 | * | | |
| | | | 0042 | * | | |
| | | | 0043 | * | | |
| | | | 0044 | * | | |
| | | | 0045 | | ORG | H'020' |
| | | | 0046 | * | | |
| | | | 0047 | * | | |
| | | | 0048 | * | | |
| 0020 | 59 | | 0049 | | LR | 9,A | SAVE ACC. |
| 0021 | 11 | | 0050 | | LR | H,DC |
| 0022 | 2A1A00 | 1A00 | 0051 | | DCI | H'1A00' | ADDRESS OF INT. SAVE |
| | | | 0052 | * | | | ADDRESS C1 |
| 0025 | 16 | | 0053 | | LM | |
| 0026 | 06 | | 0054 | | LR | QU,A |
| 0027 | 16 | | 0055 | | LM | |
| 0028 | 07 | | 0056 | | LR | QL,A |
| 0029 | 0F | | 0057 | | LR | DC,Q |

```
002A 00            0058            LR    A,KU         DC   : KU
002B 17            0059            ST                 DC+1 : KL
002C 01            0060            LR    A,KL         DC+2 : 1ACC
002D 17            0061            ST
002E 49            0062            LR    A,9
002F 17            0063            ST
0030 1E            0064            LR    J,W          SAVE STATUS REGISTER
0031 08            0065            LR    K,P          SAVE PCI
0032 2C            0066            XDC
0033 0E            0067            LR    Q,DC
0034 2C            0068            XDC
0035 0A            0069            LR    A,IS
0036 17            0070            ST                 DC+3 : ISAR
0037 60            0071            LISU  0
0038 6F            0072            LISL  7
0039 4E            0073  T0A       LR    A,D          DC+4 : R7   DC+7 :
                   0074  *                            R4   DC+10 : R1
003A 17            0075            ST                 DC+5 : R6   DC+8 :
                   0076  *                            R3   DC+11 : R0
003B 8FFD   0039   0077            BR7   T0A          DC+6 : R5   DC+9 :
                   0078  *                            R2
003D 61            0079            LISU  1
003E 4E            0080  T0B       LR    A,D          DC+12 : DC1L  DC+15
                   0081  *                            : PC1U DC+18 : STATUS
003F 17            0082            ST                 DC+13 : DC1U  DC+16
                   0083  *                            DC0L  DC+19 : ACC,
0040 8FFD   003E   0084            BR7   T0B          DC+14 : PC1L  DC+17 :
                   0085  *                            DC0U
0042 67            0086            LISU  7
0043 6B            0087            LISL  3
0044 4E            0088  T0C       LR    A,D          DC+20 : ZC0 (R73)
                   0089  *                            DC+22 : ZC3 (R71)
0045 17            0090            ST                 DC+21 : ZC1 (R72)
                   0091  *                            DC+23 : ZC3 (R70)
0046 8FFD   0044   0092            BR7   T0C
0048 66            0093            LISU  6
0049 6B            0094            LISL  3
004A 4E            0095  T0D       LR    A,D          DC+24 : YC0 (R63)
                   0096  *                            DC+26 : YC2 (R61)
004B 17            0097            ST                 DC+25 : YC1 (R62)
                   0098  *                            DC+27 : YC3 (R60)
004C 8FFD   004A   0099            BR7   T0D
004E 65            0100            LISU  5
004F 6B            0101            LISL  3
0050 4E            0102  T0E       LR    A,D          DC+28 : XC0 (R53)
                   0103  *                            DC+29 : XC2 (R51)
0051 17            0104            ST                 DC+29 : XC1 (R52)
                   0105  *                            DC+31 : XC3 (R50)
0052 8FFD   0050   0106            BR7   T0E
0054 0E            0107            LR    Q,DC         UPDAE INTERTUPT SAVE
                   0108  *                            ADDRESS
0055 2A1A00 1A00   0109            DCI   H'1A00'
0058 02            0110            LR    A,QU
0059 17            0111            ST
005A 03            0112            LR    A,QL
005B 17            0113            ST
005C 1B            0114            EI
005D 7A            0115            LIS   H'A'
005E 50            0116            LR    0,A
005F 2A1982 1982   0117            DCI   H'1982'      DECREMENT TIMERS
0062 2C            0118            XDC
0063 2A1982 1982   0119            DCI   H'1982'
0066 70            0120  T1        CLR
0067 88            0121            AM
0068 2C            0122            XDC
0069 8403   006D   0123            BZ    T0           JUMP IF TIMER = 0
006B 24FF          0124            AI    H'FF'        DECREMENT TIMER
006D 17            0125  T0        ST
006E 30            0126            DS    0
006F 94F6   0066   0127            BNZ   T1
0071 65            0128            LISU  5            PROCESS AUX POS. BIT 4
                   0129  *                            R57
0072 6C            0130            LISL  4            DETERMINE IF ANY ROW
                   0131  *                            FAILED
0073 2040          0132            LI    H'40'        MASK FOR FAILED BIT 6
```

```
                                                        R54
            0133   *
0075 FC     0134         NS    S
0076 8449 00C0 0135      BZ    T1A          JUMP IF NO ROW FAILED
0078 6F     0136         LISL  7
0079 4C     0137         LR    A,S
007A 21EF   0138         NI    H'EF'
007C 54     0139         LR    4,A
007D 2A1981 1981 0140    DCI   H'1981'      ADDRESS OF RSC (ROW
            0141   *                        SCAN COUNTER)
0080 16     0142         LM
0081 50     0143         LR    0,A
0082 20F0   0144         LI    H'F0'        TEST IF RSC > ROW 16
0084 C0     0145         AS    0
0085 9207 008D 0146      BNC   T1B          JUMP IF RSC < ROW 17
0087 50     0147         LR    0,A
0088 78     0148         LIS   8
0089 52     0149         LR    2,A
008A 74     0150         LIS   4            ACK IDENTITY FOR 17-32
            0151   *                        ROW
008B 9006 0092 0152      BR    T1C
008D 2040   0153   T1B   LI    H'40'
008F 52     0154         LR    2,A
0090 2020   0155         LI    H'20'        ACK IDENTITY FOR 1-16
            0156   *                        ROW
0092 51     0157   T1C   LR    1,A
0093 20A0   0158         LI    H'A0'
0095 C0     0159         AS    0            ASK FOR LINE LEVEL OF/
            0160   *                        2 ACK
0096 1A     0161         DI
0097 B0     0162         OUTS  0
0098 41     0163         LR    A,1          ACK INTERRUPT IDENTITY
0099 B1     0164         OUTS  1
009A A1     0165   T1D   INS   1            WAIT FOR STROBE
009B 81FE 009A 0166      BP    T1D
009D 42     0167         LR    A,2          INTERRUPT /2 ACK
009E C1     0168         AS    1
009F B1     0169         OUTS  1
00A0 74     0170         LIS   4
00A1 53     0171         LR    3,A
00A2 33     0172   T1DA  DS    3
00A3 94FE 00A2 0173      BNZ   T1DA
00A5 42     0174         LR    A,2
00A6 B1     0175         OUTS  1
00A7 A1     0176   T1E   INS   1            WAIT FOR STROBE
00A8 81FE 00A7 0177      BP    T1E
00AA 70     0178         CLR
00AB B0     0179         OUTS  0
00AC A0     0180         INS   0            READ DATA ON BIT 0
            0181   *                        PORT 0
00AD 15     0182         SL    4
00AE C4     0183         AS    4
00AF 5C     0184         LR    S,A
00B0 70     0185         CLR                RESET /2 ACK INTERRUPT
00B1 B1     0186         OUTS  1
00B2 2018   0187         LI    H'18'
00B4 54     0188         LR    4,A
00B5 34     0189   AC1   DS    4
00B6 94FE 00B5 0190      BNZ   AC1
00B8 41     0191         LR    A,1
00B9 B1     0192         OUTS  1
00BA A1     0193   T1F   INS   1            WAIT FOR STROBE
00BB 81FE 00BA 0194      BP    T1F
00BD 70     0195         CLR                CLEAR ALL ACK INTERRUPTS
00BE B1     0196         OUTS  1
00BF 1B     0197         EI
00C0 A1     0198   T1A   INS   1            PROCESS LIFT SWITCH
00C1 2102   0199         NI    H'02'        TEST FOR LIFT SW BIT
00C3 6D     0200         LISL  5
00C4 9450 0115 0201      BNZ   T1J          JMP IF LIFT SWITCH
00C6 72     0202         LIS   2            TEST FOR PREV STATUS OF
            0203   *                        LIFT SW
00C7 FC     0204         NS    S
00C8 940A 00D3 0205      BNZ   T1AA         JMP IF PREV LIFT SWITCH
00CA 2A1989 1989 0206    DCI   H'1989'      TEST FOR T8 (5 SEC LIFT SWI
00CD 71     0207         LIS   1
```

```
00CE 8C              0208              XM
00CF 9439  0109 0209                   BNZ    T1K
00D1 901B  00ED 0210                   BR     T1AB
00D3 20FD       0211     T1AA  LI      H'FD'      RESET PREV LIFT SW BIT 1
                0212     *                        R55
00D5 FC         0213            NS     S
00D6 5C         0214            LR     S,A
00D7 2A197A 197A 0215           DCI    H'197A'    RESET ROW FAILURE FLAGS
00DA 2C         0216            XDC
00DB 2A19A2 19A2 0217           DCI    H'19A2'    DO ALL 4 BANKS
00DE 74         0218            LIS    4
00DF 50         0219            LR     0,A
00E0 70         0220            CLR
00E1 17         0221     T1L    ST
00E2 2C         0222            XDC
00E3 17         0223            ST
00E4 30         0224            DS     0
00E5 94FB 00E1 0225             BNZ    T1L
00E7 2A1989 1989 0226           DCI    H'1989'
00EA 20C8       0227            LI     H'C8'
00EC 17         0228            ST
00ED 1A         0229     T1AB   DI
00EE 28164C 164C 0230           PI     RESET
00F1 28164C 164C 0231           PI     RESET
00F4 2A1900 1900 0232           DCI    H'1900'    RESTE ALL E REGISTERS &
                0233     *                        MPH
00F7 2044       0234            LI     H'44'
00F9 50         0235            LR     0,A
00FA 70         0236            CLR
00FB 17         0237     T1M    ST
00FC 30         0238            DS     0
00FD 94FD 00FB 0239             BNZ    T1M
00FF 2A1985 1985 0240           DCI    H'1985'
0102 2028       0241            LI     H'28'
0104 17         0242            ST
0105 2050       0243            LI     H'50'
0107 17         0244            ST
0108 1B         0245            EI
0109 2040       0246     T1K    LI     H'40'
010B FC         0247            NS     S
010C 940C 0119 0248             BNZ    T1H        JMP IF NO DIST FLAG SET
010E 20FE       0249            LI     H'FE'      RESTE LIFT SW OVERRIDE FLAG
0110 6F         0250            LISL   7
0111 FC         0251            NS     S
0112 5C         0252            LR     S,A
0113 9005 0119 0253             BR     T1H
0115 4C         0254     T1J    LR     A,S        SET PREV LIFT SW FLAG
0116 2202       0255            OI     H'02'
0118 5C         0256            LR     S,A
0119 2A1982 1982 0257    T1H    DCI    H'1982'
011C 70         0258            CLR               TEST TIMER T2 (1/4 SEC
                0259     *                        FLASH TIMER)
011D 88         0260            AM
011E 9412 0131 0261             BNZ    T2         JUMP IF TIMER T2 =' 0
0120 2A1982 1982 0262           DCI    H'1982'
0123 20FF       0263            LI     H'FF'
0125 17         0264            ST
0126 65         0265            LISU   5          COMPLEMENT FLASH BIT
                0266     *                        (R54 BIT 7)
0127 6C         0267            LISL   4
0128 2080       0268            LI     H'80'
012A EC         0269            XS     S
012B 5C         0270            LR     S,A        FLASH BIT COMPLEMENTED
012C 2A1982 1982 0271           DCI    H'1982'    RESET TIMER T2 (1/4 SEC
                0272     *                        FLASH TIMER)
012F 7E         0273            LIS    H'E'
0130 17         0274            ST               TIMER RESET FOR 1/4 SEC
0131 70         0275     T2     CLR              TEST TIMER T5 (1/2 SEC
                0276     *                       SCAN ROW FAIL TIMER)
0132 88         0277            AM
0133 9416 014A 0278             BNZ    T3         JUMP IF TIMER T5 =' 0
0135 2A1983 1983 0279           DCI    H'1983'
0138 20FF       0280            LI     H'FF'
013A 17         0281            ST
013B 65         0282            LISU   5          TEST FOR LIFT SW OVERRIDE
```

```
013C 6F              0283          LISL  7
013D 71              0284          LIS   1
013E FC              0285          NS    S
013F 9404    0144    0286          BNZ   T5         JMP OVER ROW FAILURE IF ACT
0141 281605  1605    0287          PI    FAILED     FIND ANY OR NEXT ROW FAILUR
0144 2A1983  1983    0288   T5     DCI   H'1983'    RESET TIMER T5 (1/2 SEC SCA
0147 201C            0289          LI    H'1C'
0149 17              0290          ST               T5 TIMER RESET FOR 1/2 SEC
014A 2A1985  1985    0291   T3     DCI   H'1985'    TEST TIMER T3 (1 SEC MPH
                     0292   *                       TIMER)
014D 70              0293          CLR
014E 88              0294          AM
014F 9459    01A9    0295          BNZ   T10        JUMP IF T3 = 0
0151 2A1985  1985    0296          DCI   H'1985'
0154 20FF            0297          LI    H'FF'
0156 17              0298          ST
0157 2A1942  1942    0299          DCI   H'1942'    SUBTRACT PREVIOUS DIST.
015A 66              0300          LISU  6          COUNT FROM PRESENT DIST.
                     0301   *                       COUNT.
                     0302   *
015B 68              0303          LISL  0
015C 70              0304          CLR              PREVIOUS DIST. COUNT TO
                     0305   *                       Y  (Z-Y=Z)
015D 5D              0306          LR    I,A
015E 5D              0307          LR    I,A
015F 16              0308          LM
0160 5D              0309          LR    I,A
0161 16              0310          LM
0162 5C              0311          LR    S,A
0163 2023            0312          LI    H'23'      RETRIEVE PRESENT DIS.
                     0313   *                       COUNT
0165 50              0314          LR    0,A
0166 2020            0315          LI    H'20'      ACK CHIP INDENTIFIER
0168 51              0316          LR    1,A
0169 2813D1  13D1    0317          PI    SUBACK
016C 67              0318          LISU  7          TRANSFER TO Z SUBTRACTION
                     0319   *                       REGISTER
016D 43              0320          LR    A,3
016E 5E              0321          LR    D,A
016F 42              0322          LR    A,2
0170 5E              0323          LR    D,A
0171 70              0324          CLR
0172 5E              0325          LR    D,A
0173 5E              0326          LR    D,A
0174 6A              0327          LISL  2          UPDATE DIST. COUNT TO
                     0328   *                       PRESENT COUNT
0175 2A1942  1942    0329          DCI   H'1942'
0178 4D              0330          LR    A,I
0179 17              0331          ST
017A 4C              0332          LR    A,S
017B 17              0333          ST
017C 281531  1531    0334          PI    SUBMIN     Z-Y=Z
017F 6B              0335          LISL  3          CALCULATE MPH = 1364 X
                     0336   *                       ↑DIST DIV. DIST. CAL.
0180 4C              0337          LR    A,S        XY=Z
0181 66              0338          LISU  6          ↑DIST --> Y
0182 5E              0339          LR    D,A
0183 67              0340          LISU  7
0184 4C              0341          LR    A,S
0185 66              0342          LISU  6
0186 5C              0343          LR    S,A        ↑DIST IN Y
0187 65              0344          LISU  5          682 (H'02AA') --> X
0188 72              0345          LIS   2
0189 5D              0346          LR    I,A
018A 20AA            0347          LI    H'AA'
018C 5C              0348          LR    S,A
018D 281548  1548    0349          PI    SUBMUL     1364 X ↑DIST --> Z
                     0350   *                       XY=Z
0190 66              0351          LISU  6          DIST. CAL. --> Y
0191 69              0352          LISL  1
0192 2A195A  195A    0353          DCI   H'195A'    ADDRESS OF DIST. CAL.
0195 16              0354          LM               DIST. CAL. C0
0196 5E              0355          LR    D,A
0197 16              0356          LM               DIST. CAL. C1
0198 5C              0357          LR    S,A
```

```
0199 28159C 159C  0358       PI    SUBDIV   Z DIV. Y = X
019C 65            0359       LISU  5        TRANSFER CALCULATED MPH
                   0360  *                   TO RAM
019D 6B            0361       LISL  3
019E 2A1980 1980   0362       DCI   H'1980'  MPH RAM STORAGE LOCATION
01A1 4C            0363       LR    A,S
01A2 17            0364       ST
01A3 2A1985 1985   0365       DCI   H'1985'  RESET T3 (1 SEC MPH TIMER)
01A6 2028          0366       LI    H'28'
01A8 17            0367       ST             T3 RESET FOR 1 SEC
01A9 70            0368  T10  CLR            TEST TIMER T4 (2 SEC
                   0369  *                   SEED/SEC & POP SCAN)
01AA 88            0370       AM
01AB 943D  01E9    0371       BNZ   T11      JUMP IF T4 =' 0
01AD 2A1986 1986   0372       DCI   H'1986'
01B0 20FF          0373       LI    H'FF'
01B2 17            0374       ST
01B3 2A19A2 19A2   0375       DCI   H'19A2'  PROCESS SEED/SEC ROW
                   0376  *                   FAILURES
01B6 17            0377       ST
01B7 17            0378       ST
01B8 17            0379       ST
01B9 17            0380       ST
01BA 2A19A2 19A2   0381       DCI   H'19A2'
01BD 2C            0382       XDC            ROW FAILURE FLAGS ADDRESS
01BE 2A1900 1900   0383       DCI   H'1900'  INTERIM ROW STO. E
                   0384  *                   REGISTERS. (Y)
01C1 2020          0385       LI    H'20'    ACK INDENTITY CODE FOR
                   0386  *                   1-6 CHIP
01C3 51            0387       LR    1,A
01C4 71            0388  T18  LIS   1        ACE C1 ROW CODE
01C5 50            0389       LR    0,A
01C6 71            0390  T16  LIS   1        ROW # SHIFTING IDENT. CODE
01C7 54            0391       LR    4,A
01C8 2813D1 13D1   0392  T15  PI    SUBACK   RETRIEVE C0 C1 OR ROW #
                   0393  *                   (Z)
01CB 2813F3 13F3   0394       PI    SUBSET   SETUP FOR PRESENT COUNT-
                   0395  *                   PREVIOUS COUNT (Z-Y)
01CE 67            0396       LISU  7        PRESENT COUNT -->
                   0397  *                   PREVIOUS COUNT
01CF 20FE          0398       LI    H'FE'
01D1 8E            0399       ADC
01D2 4D            0400       LR    A,I
01D3 17            0401       ST
01D4 4C            0402       LR    A,S
01D5 17            0403       ST
01D6 281531 1531   0404       PI    SUBMIN   Z-Y=Z  (SEEDS/2 SEC)
01D9 66            0405       LISU  6
01DA 6B            0406       LISL  3
01DB 74            0407       LIS   4
01DC 5E            0408       LR    D,A
01DD 70            0409       CLR
01DE 5E            0410       LR    D,A
01DF 281531 1531   0411       PI    SUBMIN   Z-Y -->Z
01E2 2C            0412       XDC            SET OR RESET ROW FAILURE
                   0413  *                   FLAG
01E3 44            0414       LR    A,4
01E4 8207  01EC    0415       BC    T12      JUMP IF ROW NOT FAILED
01E6 8B            0416       OM
01E7 9006  01EE    0417       BR    T13
01E9 29036B 036B   0418  T11  JMP   T45
01EC 18            0419  T12  COM
01ED 8A            0420       NM
01EE 55            0421  T13  LR    5,A      TEMPORARILY STORE ROW
                   0422  *                   FAILURE FLAG BYTE
01EF 20FF          0423       LI    H'FF'
01F1 8E            0424       ADC
01F2 45            0425       LR    A,5
01F3 17            0426       ST             RESTORE UPDATED ROW
                   0427  *                   FAILURE FLAG BYTE
01F4 72            0428       LIS   2        INCREMENT TO NEXT ROW
01F5 C0            0429       AS    0
01F6 50            0430       LR    0,A
01F7 44            0431       LR    A,4      SHIFT ROW # IDENT CODE
01F8 13            0432       SL    1
```

| | | | | | | |
|---|---|---|---|---|---|---|
| 01F9 | 54 | | 0433 | | LR | 4,A |
| 01FA | 8407 | 0202 | 0434 | | BZ | T14 | JUMP IF CHANGING ROW # BANK |
| | | | 0435 | * | | |
| 01FC | 20FF | | 0436 | | LI | H'FF' |
| 01FE | 8E | | 0437 | | ADC | |
| 01FF | 2C | | 0438 | | XDC | |
| 0200 | 90C7 | 01C8 | 0439 | | BR | T15 |
| 0202 | 2021 | | 0440 | T14 | LI | H'21' | TEST IF ON ROW 17 (33) |
| 0204 | E0 | | 0441 | | XS | 0 |
| 0205 | 2C | | 0442 | | XDC | |
| 0206 | 94BF | 01C6 | 0443 | | BNZ | T16 | JUMP IF NOT UP TO ROW 17 (33) |
| | | | 0444 | * | | |
| 0208 | 74 | | 0445 | | LIS | 4 | TEST IF ON ROW 33 |
| 0209 | E1 | | 0446 | | XS | 1 |
| 020A | 840B | 0216 | 0447 | | BZ | T17 | JUMP IF ON ROW 33 |
| 020C | 65 | | 0448 | | LISU | 5 | TEST IF 32 ROW MODULE |
| 020D | 6D | | 0449 | | LISL | 5 |
| 020E | 70 | | 0450 | | LIS | 0 |
| 020F | CC | | 0451 | | AS | S |
| 0210 | 8105 | 0216 | 0452 | | BP | T17 | JUMP IF NOT 32 ROW MODULE |
| 0212 | 74 | | 0453 | | LIS | 4 | ACK IDENTITY CODE FOR 17-32 CHIP |
| | | | 0454 | * | | |
| 0213 | 51 | | 0455 | | LR | 1,A |
| 0214 | 90AF | 01C4 | 0456 | | BR | T18 |
| 0216 | 72 | | 0457 | T17 | LIS | 2 | PROCESS NO DIST. PSS BITE ADDRESS OF DESIRED DIST. COUNTER |
| 0217 | C0 | | 0458 | | AS | 0 |
| | | | 0459 | * | | |
| 0218 | 2020 | | 0460 | | LI | H'20' | ACK INDENTITY CODE FOR 1-16 CHIP |
| | | | 0461 | * | | |
| 021A | 51 | | 0462 | | LR | 1,A |
| 021B | 2813D1 | 13D1 | 0463 | | PI | SUBACK | RETRIEVE C1 C0 DIST. COUNT |
| 021E | 2813F3 | 13F3 | 0464 | | PI | SUBSET | SET UP DIST. PRESENT - DIST. PREVIOUS |
| | | | 0465 | * | | |
| 0221 | 67 | | 0466 | | LISU | 7 |
| 0222 | 20FE | | 0467 | | LI | H'FE' |
| 0224 | 8E | | 0468 | | ADC | |
| 0225 | 4D | | 0469 | | LR | A,I |
| 0226 | 17 | | 0470 | | ST | |
| 0227 | 4C | | 0471 | | LR | A,S |
| 0228 | 17 | | 0472 | | ST | |
| 0229 | 281531 | 1531 | 0473 | | PI | SUBMIN | Z-Y=Z |
| 022C | 66 | | 0474 | | LISU | 6 | CHECK FOR ANY DIST. COUNT PRESENT |
| | | | 0475 | * | | |
| 022D | 6B | | 0476 | | LISL | 3 |
| 022E | 78 | | 0477 | | LIS | 8 | Y |
| 022F | 5E | | 0478 | | LR | D,A |
| 0230 | 70 | | 0479 | | CLR | |
| 0231 | 5C | | 0480 | | LR | S,A |
| 0232 | 65 | | 0481 | | LISU | 5 | PREPARE NO DIST. BIT BY RESETTING IT |
| | | | 0482 | * | | |
| 0233 | 6D | | 0483 | | LISL | 5 |
| 0234 | 20BF | | 0484 | | LI | H'BF' |
| 0236 | FC | | 0485 | | NS | S |
| 0237 | 54 | | 0486 | | LR | 4,A |
| 0238 | 281531 | 1531 | 0487 | | PI | SUBMIN | Z-Y=Z |
| 023B | 65 | | 0488 | | LISU | 5 |
| 023C | 6D | | 0489 | | LISL | 5 |
| 023D | 2040 | | 0490 | | LI | H'40' | JMP IF DIST NOT PRESENT |
| 023F | 9232 | 0272 | 0491 | | BNC | T19 |
| 0241 | FC | | 0492 | | NS | S |
| 0242 | 70 | | 0493 | | CLR | |
| 0243 | 842E | 0272 | 0494 | | BZ | T19 |
| 0245 | 2A197A | 197A | 0495 | | DCI | H'197A' |
| 0248 | 2C | | 0496 | | XDC | |
| 0249 | 2A19A2 | 19A2 | 0497 | | DCI | H'19A2' |
| 024C | 74 | | 0498 | | LIS | 4 |
| 024D | 50 | | 0499 | | LR | 0,A |
| 024E | 70 | | 0500 | | CLR | |
| 024F | 17 | | 0501 | T19D | ST | |
| 0250 | 2C | | 0502 | | XDC | |
| 0251 | 17 | | 0503 | | ST | |
| 0252 | 30 | | 0504 | | DS | 0 |
| 0253 | 94FB | 024F | 0505 | | BNZ | T19D |
| 0255 | 28164C | 164C | 0506 | | PI | RESET |
| 0258 | 28164C | 164C | 0507 | | PI | RESET |

```
025B 1A            0508              DI
025C 2A1900 1900   0509              DCI   H'1900'
025F 2044          0510              LI    H'44'
0261 50            0511              LR    0,A
0262 70            0512              CLR
0263 17            0513    T19E      ST
0264 30            0514              DS    0
0265 94FD 0263     0515              BNZ   T19E
0267 2A1985 1985   0516              DCI   H'1985'
026A 2028          0517              LI    H'28'
026C 17            0518              ST
026D 2050          0519              LI    H'50'
026F 17            0520              ST
0270 1B            0521              EI
0271 70            0522              CLR
0272 C4            0523    T19       AS    4
0273 5C            0524              LR    S,A
0274 2A19A2 19A2   0525              DCI   H'19A2'   PROCESS DIST. FAILED
                   0526     *                        FLAGS 1&2
0277 70            0527              CLR
0278 50            0528              LR    0,A
0279 74            0529              LIS   4         DO 4 BANKS
027A 51            0530              LR    1,A
027B 16            0531    T19A      LM
027C 18            0532              COM
027D C0            0533              AS    0
027E 19            0534              LNK
027F 50            0535              LR    0,A
0280 31            0536              DS    1
0281 94F9 027B     0537              BNZ   T19A      JUMP IF NOT THROUGH ALL
                   0538     *                        BANKS
0283 70            0539              CLR
0284 C0            0540              AS    0         SET STATUS REGISTER
0285 841F 02A5     0541              BZ    T19B      JUMP IF ALL ROWS FAILED
                   0542     *                        TEST NO DIST. BIT
0287 2040          0543              LI    H'40'
0289 FC            0544              NS    S
028A 841A 02A5     0545              BZ    T19B      JUMP IF NO DIST. BIT NOT SE
028C A1            0546              INS   1
028D 2102          0547              NI    H'02'
028F 9415 02A5     0548              BNZ   T19B
0291 6F            0549              LISL  7
0292 2060          0550              LI    H'60'     SET DIST. FAILED FLAG 1
                   0551     *                        OR 2
                                                     TEST IF DIST. FAILED FLAG
0294 FC            0552              NS    S         1 & 2 SET
                   0553     *
0295 2360          0554              XI    H'60'
0297 9407 029F     0555              BNZ   T19CC     JUMP IF DIST. FAILED FLAG
                   0556     *                        1 & 2 SET
0299 20FE          0557              LI    H'FE'
029B FC            0558              NS    S
029C 5C            0559              LR    S,A
029D 900C 02AA     0560              BR    T19C
029F 2020          0561    T19CC     LI    H'20'     INCREMENT DIST. FAILED
                   0562     *                        FLAG COUNT
02A1 CC            0563              AS    S
02A2 5C            0564              LR    S,A
02A3 9006 02AA     0565              BR    T19C
02A5 6F            0566    T19B      LISL  7
02A6 209F          0567              LI    H'9F'     RESET DIST. FAILED FLAG
                   0568     *                        1 & 2
02A8 FC            0569              NS    S
02A9 5C            0570              LR    S,A
02AA 2A19A2 19A2   0571    T19C      DCI   H'19A2'   RESET ROW FAILURE FLAGE
                   0572     *                        ACCORDING TO ROW ON/OFF
02AD 2C            0573              XDC
02AE 2A195C 195C   0574              DCI   H'195C'
02B1 74            0575              LIS   4         DO LOOP FOR 4 BANKS
02B2 50            0576              LR    0,A
02B3 16            0577    T20       LM
02B4 18            0578              COM
02B5 2C            0579              XDC
02B6 8A            0580              NM              RESET FAILURE FLAGS FOR
                   0581     *                        OFF ROWS
02B7 51            0582              LR    1,A
```

```
02B8 20FF        0583           LI    H'FF'
02BA 8E          0584           ADC
02BB 41          0585           LR    A,1
02BC 17          0586           ST
02BD 2C          0587           XDC
02BE 30          0588           DS    0
02BF 94F3  02B3  0589           BNZ   T20        JUMP IF NOT DONE WILL
                 0590    *                       ALL BANKS
02C1 20EF        0591           LI    H'EF'      RESET AUX POS BIT 4 --
                 0592    *                       OF R57
02C3 FC          0593           NS    S
02C4 5C          0594           LR    S,A
02C5 2A197A 197A 0595           DCI   H'197A'
02C8 6C          0596           LISL  4
02C9 20BF        0597           LI    H'BF'
02CB FC          0598           NS    S
02CC 5C          0599           LR    S,A
02CD 16          0600           LM
02CE 88          0601           AM
02CF 19          0602           LNK
02D0 88          0603           AM
02D1 19          0604           LNK
02D2 88          0605           AM
02D3 19          0606           LNK
02D4 8405  02DA  0607           BZ    T20A
02D6 4C          0608           LR    A,S
02D7 2240        0609           OI    H'40'
02D9 5C          0610           LR    S,A
02DA 6D          0611   T20A    LISL  5          TEST FOR DIST BIT 6 --R55
02DB 2040        0612           LI    H'40'
02DD FC          0613           NS    S
02DE 840E  02ED  0614           BZ    T25A       JMP IF DIST. REESENT
02E0 6F          0615           LISL  7
02E1 2060        0616           LI    H'60'
02E3 FC          0617           NS    S
02E4 2360        0618           XI    H'60'
02E6 8406  02ED  0619           BZ    T25A
02E8 A1          0620           INS   1          TEST FOR LIFT SW
02E9 2102        0621           NI    H'02'
02EB 8411  02FD  0622           BZ    T25B       JMP IF LIFT SW NOT SET
02ED 2A197A 197A 0623   T25A    DCI   H'197A'    TRANSFER ROW FAILURE FLAG
                 0624    *                       BANKS
02F0 2C          0625           XDC
02F1 2A19A2 19A2 0626           DCI   H'19A2'
02F4 74          0627           LIS   4          DO 4 BANKS
02F5 50          0628           LR    0,A
02F6 16          0629   T25C    LM
02F7 2C          0630           XDC
02F8 17          0631           ST
02F9 2C          0632           XDC
02FA 30          0633           DS    0
02FB 94FA  02F6  0634           BNZ   T25C
02FD 6F          0635   T25B    LISL  7
02FE 71          0636           LIS   1          TEST FOR LIFT SW OVERRIDE
                 0637    *                       BIT 0  --> R57
02FF FC          0638           NS    S
0300 940C  030D  0639           BNZ   T25        JMP IF LS OVERRIDE SET
                 0640    *                       OVERRIDE BIT 0 R57
0302 6C          0641           LISL  4          UPDATE RSC (ROW SCAN CNTER
                 0642    *                       IF REQUIRED
0303 4C          0643           LR    A,S
0304 2140        0644           NI    H'40'
0306 945E  0365  0645           BNZ   T21        JUMP IF ROW FAILED (DON'T
                 0646    *                       MODIFY RSC)
0308 2817A0 17A0 0647           PI    HILO
030B 9459  0365  0648           BNZ   T21
030D 2A1964 1964 0649   T25     DCI   H'1964'    TEST FOR MIN AVG MAX
                 0650    *                       SELECTION
0310 16          0651           LM
0311 51          0652           LR    1,A
0312 210E        0653           NI    H'0E'      MIN/AVG/MAX MASKED FOR
0314 8414  0329  0654           BZ    T22        JUMP IF MIN/AVG/MAX NOT
                 0655    *                       SELECTED
```

| | | | | | | |
|---|---|---|---|---|---|---|
| 0316 | 13 | | 0656 | | SL | 1 | SHIFT TO NEXT SELECTION |
| 0317 | 50 | | 0657 | | LR | 0,A |
| 0318 | 2010 | | 0658 | | LI | H'10' | TEST IF SHIFTED OFF TO MAX |
| | | | 0659 | * |
| 031A | E0 | | 0660 | | XS | 0 |
| 031B | 9403 | 031F | 0661 | | BNZ | T23 | JUMP IF NOT SHIFTED OFF OF MAX |
| | | | 0662 | * |
| 031D | 72 | | 0663 | | LIS | 2 | SET MIN BIT |
| 031E | 50 | | 0664 | | LR | 0,A |
| 031F | 20FF | | 0665 | T23 | LI | H'FF' |
| 0321 | 8E | | 0666 | | ADC | | ADDRESS OF U-DISPLAY SELECTION REGISTER |
| | | | 0667 | * |
| 0322 | 20F0 | | 0668 | | LI | H'F0' |
| 0324 | F1 | | 0669 | | NS | 1 | RESET MIN AVG MAX BITS |
| 0325 | C0 | | 0670 | | AS | 0 | SET MIN, AVG, OR MAX BIT |
| 0326 | 17 | | 0671 | | ST | | UPDATE U-DISPLAY SELECTION REGISTER |
| | | | 0672 | * |
| 0327 | 903D | 0365 | 0673 | | BR | T21 |
| 0329 | 71 | | 0674 | T22 | LIS | 1 | TEST FOR SCAN SELECTION |
| 032A | F1 | | 0675 | | NS | 1 |
| 032B | 8439 | 0365 | 0676 | | BZ | T21 | JUMP IF SCAN NOT SELECTED |
| 032D | 2A195C | 195C | 0677 | | DCI | H'195C' | CHECK TO SEE IF ALL ROWS TURNED OFF |
| | | | 0678 | * |
| 0330 | 70 | | 0679 | | CLR |
| 0331 | 50 | | 0680 | | LR | 0,A |
| 0332 | 74 | | 0681 | | LIS | 4 |
| 0333 | 51 | | 0682 | | LR | 1,A |
| 0334 | 16 | | 0683 | T32 | LM | | ADD COM OF ALL ROW ON/OFF FLAGS |
| | | | 0684 | * |
| 0335 | 18 | | 0685 | | COM |
| 0336 | C0 | | 0686 | | AS | 0 |
| 0337 | 19 | | 0687 | | LNK |
| 0338 | 50 | | 0688 | | LR | 0,A |
| 0339 | 31 | | 0689 | | DS | 1 |
| 033A | 94F9 | 0334 | 0690 | | BNZ | T32 |
| 033C | 65 | | 0691 | | LISU | 5 |
| 033D | 6D | | 0692 | | LISL | 5 |
| 033E | 20F7 | | 0693 | | LI | H'F7' |
| 0340 | FC | | 0694 | | NS | S |
| 0341 | 5C | | 0695 | | LR | S,A |
| 0342 | 70 | | 0696 | | CLR | | SET STATUS REGISTER |
| 0343 | C0 | | 0697 | | AS | 0 |
| 0344 | 9406 | 034B | 0698 | | BNZ | T33 | JUMP IF NOT ALL ROWS OFF |
| 0346 | 78 | | 0699 | | LIS | 8 | ALL ROWS OFF. SET ALL OFF BIT 3 R55 |
| | | | 0700 | * |
| 0347 | CC | | 0701 | | AS | S |
| 0348 | 5C | | 0702 | | LR | S,A | ALL OFF BIT SET |
| 0349 | 901B | 0365 | 0703 | | BR | T21 | JUMP OUT |
| 034B | 2A1981 | 1981 | 0704 | T33 | DCI | H'1981' | FIND NEXT ROW TO BE SCANNED |
| | | | 0705 | * |
| 034E | 16 | | 0706 | | LM |
| 034F | 50 | | 0707 | | LR | 0,A | PRESENT ROW # --> R0 |
| 0350 | 201F | | 0708 | T37 | LI | H'1F' | FIND NEXT ACTIVE ROW LOOP |
| 0352 | E0 | | 0709 | | XS | 0 | INCREMENT ROW TO NEXT ROW |
| 0353 | 8403 | 0357 | 0710 | | BZ | T34 |
| 0355 | 40 | | 0711 | | LR | A,0 |
| 0356 | 1F | | 0712 | | INC |
| 0357 | 50 | | 0713 | T34 | LR | 0,A |
| 0358 | 2A195C | 195C | 0714 | | DCI | H'195C' |
| 035B | 281724 | 1724 | 0715 | | PI | ONOFF |
| 035E | 94F1 | 0350 | 0716 | | BNZ | T37 |
| 0360 | 2A1981 | 1981 | 0717 | | DCI | H'1981' | NEW RSC FOUND |
| 0363 | 40 | | 0718 | | LR | A,0 |
| 0364 | 17 | | 0719 | | ST | | UPDATE RSC |
| 0365 | 2A1986 | 1986 | 0720 | T21 | DCI | H'1986' | SET TIMER T4 (2 SEC SEED/ SEC & POP SCAN) |
| | | | 0721 | * |
| 0368 | 2050 | | 0722 | | LI | H'50' | SET TO 2 SEC |
| 036A | 17 | | 0723 | | ST | | T4 --> 2 SEC |
| 036B | 2812EE | 12EE | 0724 | T45 | PI | SWITCH |
| 036E | 70 | | 0725 | | CLR | | CHECK 1ST 8 BITS X OR FOR SWITCH CHANGE |
| | | | 0726 | * |
| 036F | C2 | | 0727 | | AS | 2 |
| 0370 | 8418 | 0389 | 0728 | | BZ | D7 | JUMP IF NO SWITCH CHNAGES IN 1ST BYTE |
| | | | 0729 | * |
| 0372 | 9133 | 03A6 | 0730 | | BM | PBB8 |
| 0374 | 13 | | 0731 | | SL | 1 |
| 0375 | 9133 | 03A9 | 0732 | | BM | PBB7 |

```
0377 13              0733          SL     1
0378 9133   03AC     0734          BM     PBB6
037A 13              0735          SL     1
037B 9130   03AC     0736          BM     PBB6      ACTUALLY IT IS PB5
037D 13              0737          SL     1
037E 912D   03AC     0738          BM     PBB6      ACTUALLY IT IS PB4
0380 13              0739          SL     1
0381 912D   03AF     0740          BM     PBB3
0383 13              0741          SL     1
0384 912D   03B2     0742          BM     PBB2
0386 13              0743          SL     1
0387 912D   03B5     0744          BM     PBB1
0389 C3              0745    D7    AS     3
038A 8418   03A3     0746          BZ     DDD8      JUMP IF NO SWITCH CHANGES
                     0747    *                     IN 2ND BYTE
038C 9116   03A3     0748          BM     DDD8
038E 13              0749          SL     1
038F 9113   03A3     0750          BM     DDD8
0391 13              0751          SL     1
0392 9125   03B8     0752          BM     PBB14
0394 13              0753          SL     1
0395 9125   03BB     0754          BM     PBB13
0397 13              0755          SL     1
0398 9125   03BE     0756          BM     PBB12
039A 13              0757          SL     1
039B 9125   03C1     0758          BM     PBB11
039D 13              0759          SL     1
039E 9125   03C4     0760          BM     PBB10
03A0 13              0761          SL     1
03A1 9125   03C7     0762          BM     PBB9
03A3 290755 0755     0763   DDD8   JMP    D8        NO SW CHANGED
03A6 2904AA 04AA     0764   PBB8   JMP    PB8
03A9 290487 0487     0765   PBB7   JMP    PB7
03AC 290755 0755     0766   PBB6   JMP    D8
03AF 29045A 045A     0767   PBB3   JMP    PB3
03B2 290409 0409     0768   PBB2   JMP    PB2
03B5 2903CA 03CA     0769   PBB1   JMP    PB1
03B8 290671 0671     0770   PBB14  JMP    PB14
03BB 290642 0642     0771   PBB13  JMP    PB13
03BE 29062A 062A     0772   PBB12  JMP    PB12
03C1 2905E3 05E3     0773   PBB11  JMP    PB11
03C4 290537 0537     0774   PBB10  JMP    PB10
03C7 2904DC 04DC     0775   PBB9   JMP    PB9
                     0776    *
                     0777    *
                     0778    *
                     0779    *
                     0780    *
                     0781    *
03CA 65              0782   PB1    LISU   5         TEST IF LIFT SWITCH OVER
                     0783    *                      RIDE BIT 0 R57 SET
03CB 6F              0784          LISL   7
03CC 71              0785          LIS    1
03CD FC              0786          NS     S
03CE 941F   03EE     0787          BNZ    T46A      JUMP IF L.S. OVERRIDE
                     0788    *                     BIT ALREADY SET
03D0 6D              0789          LISL   5         TEST FOR NO DIST BIT
03D1 2040            0790          LI     H'40'
03D3 FC              0791          NS     S
03D4 940D   03E2     0792          BNZ    T46B      JUMP IF NO DIST BIT SET
03D6 6C              0793          LISL   4         TEST FOR FAILED & HI/LO
                     0794    *                     BITS
03D7 2040            0795          LI     H'40'
03D9 FD              0796          NS     I
03DA CC              0797          AS     S
03DB 2170            0798          NI     H'70'
03DD 8410   03EE     0799          BZ     T46A      JUMP TO CHANGE MODE IF
                     0800    *                     NOT FAILURES OF HI/LO
03DF 290755 0755     0801          JMP    D8        IGNOR
03E2 6F              0802   T46B   LISL   7         SET LIFT SWITCH OVERRIDE
                     0803    *                     BIT
03E3 71              0804          LIS    1
03E4 CC              0805          AS     S
03E5 5C              0806          LR     S,A
03E6 2A1964 1964     0807          DCI    H'1964'   TEST IF ROW SELECT
                     0808    *                     SELECTED
```

```
03E9 2040           0809        LI      H'40'
03EB 8A             0810        NM
03EC 8419    0406   0811        BZ      DD8T        JUMP IF ROW SELECT NOT
                    0812  *                         SELECTED
03EE 2A1964  1964   0813  T46A  DCI     H'1964'     ALTERNATE SCAN - MIN/AVG/
                    0814  *                         MAX SELECTION
03F1 16             0815        LM
03F2 50             0816        LR      0,A         STORE SELECTION REGISTER
03F3 20FF           0817        LI      H'FF'
03F5 8E             0818        ADC
03F6 71             0819        LIS     1           TEST IF SCAN SELECTED
03F7 F0             0820        NS      0
03F8 20B0           0821        LI      H'B0'       RESET ROW SELECT
03FA 8407    0402   0822        BZ      T46         JUMP IF SCAN NOT SELECTED
03FC F0             0823        NS      0
03FD 2404           0824        AI      H'04'       SET AVG
03FF 17             0825        ST
0400 9005    0406   0826        BR      DD8T
0402 F0             0827  T46   NS      0
0403 2401           0828        AI      H'01'       SET SCAN
0405 17             0829        ST
0406 29074F  074F   0830  DD8T  JMP     D8T         JMP TO SET T7
0409 65             0831  PB2   LISU    5           TEST IF LIFT SWITCH OVER
                    0832  *                         RIDE BIT 0 R57 SET
040A 6F             0833        LISL    7
040B 71             0834        LIS     1
040C FC             0835        NS      S
040D 941E    042C   0836        BNZ     T47A        JUMP IF L.S. OVERRIDE
                    0837  *                         BIT ALREADY SET
040F 6D             0838        LISL    5           TEST FOR NO DIST BIT
0410 2040           0839        LI      H'40'
0412 FC             0840        NS      S
0413 940D    0421   0841        BNZ     T47B        JUMP IF NO DIST. BIT SET
0415 6C             0842        LISL    4           TEST FOR FAILED HI/LO BITS
0416 2040           0843        LI      H'40'
0418 FD             0844        NS      I
0419 CC             0845        AS      S
041A 2170           0846        NI      H'70'
041C 840F    042C   0847        BZ      T47A        JUMP TO CHANGE MODE IF
                    0848  *                         NOT FAILURES OR HI/LO
041E 290755  0755   0849        JMP     D8          IGNOR
0421 6F             0850  T47B  LISL    7           SET LIFT SWITCH OVERRIDE
                    0851  *                         BIT
0422 71             0852        LIS     1
0423 CC             0853        AS      S
0424 5C             0854        LR      S,A
0425 2A1964  1964   0855        DCI     H'1964'     TEST IF SCAN MIN AVG MAX
                    0856  *                         SELECTED
0428 7F             0857        LIS     H'F'
0429 8A             0858        NM
042A 840B    0406   0859        BZ      DD8T        JUMP IF SCAN MIN AVG MAX
                    0860  *                         NOT SELECTED
042C 2A1964  1964   0861  T47A  DCI     H'1964'     SELECT DISPLAY REGISTER
042F 16             0862        LM                  TEST IF ROW SELECT ALREADY
                    0863  *                         SELECTED
0430 50             0864        LR      0,A
0431 2040           0865        LI      H'40'       MASK FOR ROW SELECT BIT
0433 F0             0866        NS      0
0434 940D    0442   0867        BNZ     T47         JUMP IF ROW SELECT ALREADY
                    0868  *                         SELECTED
0436 2A1964  1964   0869        DCI     H'1964'
0439 20B0           0870        LI      H'B0'       RESET SCAN-MIN/AVG/MAX
043B F0             0871        NS      0
043C 2440           0872        AI      H'40'       SET ROW SELECT
043E 17             0873        ST
043F 29074F  074F   0874        JMP     D8T
0442 2A1981  1981   0875  T47   DCI     H'1981'
0445 16             0876        LM                  PRESENT ROW #
0446 50             0877        LR      0,A
0447 2A1962  1962   0878        DCI     H'1962'
044A 16             0879        LM                  MAX ROW #
044B E0             0880        XS      0
044C 8405    0452   0881        BZ      T48
044E 40             0882        LR      A,0
044F 1F             0883        INC                 INCREMENT TO NEXT ROW
```

```
0450 9002   0453 0884        BR    T49
0452 70          0885  T48   LIS   0
0453 2A1981 1981 0886  T49   DCI   H'1981'
0456 17          0887        ST                  RSC UPDATED TO NEW ROW #
0457 29074F 074F 0888        JMP   D8T           JUMP TO SET T7
045A 65          0889  PB3   LISU  5             TEST IF LIFT SWITCH OVER
                 0890  *                         RIDE BIT 0 R57 SET
045B 6F          0891        LISL  7
045C 71          0892        LIS   1
045D FC          0893        NS    S
045E 940D   046C 0894        BNZ   T50A          JUMP IF L.S. OVERRIDE
                 0895  *                         BIT SET
0460 6C          0896        LISL  4             TEST FOR FAILED & HI/LO
                 0897  *                         BITS
0461 2040        0898        LI    H'40'
0463 FD          0899        NS    I
0464 CC          0900        AS    S
0465 2170        0901        NI    H'70'
0467 8404   046C 0902        BZ    T50A          JUMP IF NO FAILURES OR
                 0903  *                         HI/LO TO CHANGE MODE
0469 290755 0755 0904        JMP   D8            IGNOR
046C 2A1964 1964 0905  T50A  DCI   H'1964'       ALTERNATE POP/SPACING
046F 16          0906        LM
0470 50          0907        LR    0,A
0471 2010        0908        LI    H'10'         TEST FOR POP SELECTION
0473 F0          0909        NS    0
0474 20CF        0910        LI    H'CF'         RESET POP-SPACING
0476 9406   047D 0911        BNZ   T50           JUMP IF POP SELECTED
0478 F0          0912        NS    0
0479 2410        0913        AI    H'10'         SET POP
047B 9004   0480 0914        BR    T51
047D F0          0915  T50   NS    0
047E 2420        0916        AI    H'20'         SET SPACING
0480 2A1964 1964 0917  T51   DCI   H'1964'
0483 17          0918        ST                  UPDATE DISPLAY REGISTER
0484 29074F 074F 0919        JMP   D8T           JUMP TO SET T7
0487 2A1965 1965 0920  PB7   DCI   H'1965'       ALTERNATE FIELD AREA -
                 0921  *                         TOTAL AREA
048A 16          0922        LM
048B 50          0923        LR    0,A
048C 71          0924        LIS   1             TEST FOR FIELD AREA
                 0925  *                         SELECTION
048D F0          0926        NS    0
048E 20F8        0927        LI    H'F8'         RESET FIELD AREA, TOTAL
                 0928  *                         AREA AND SPEED
0490 9406   0497 0929        BNZ   T52           JUMP IF FIELD AREA
                 0930  *                         SELECTED
0492 F0          0931        NS    0
0493 2401        0932        AI    H'01'         SET FIELD AREA
0495 9004   049A 0933        BR    T53
0497 F0          0934  T52   NS    0
0498 2402        0935        AI    H'02'         SET TOTAL AREA
049A 2A1965 1965 0936  T53   DCI   H'1965'
049D 17          0937        ST
049E 2A1964 1964 0938        DCI   H'1964'
04A1 16          0939        LM
04A2 217F        0940        NI    H'7F'
04A4 2A1964 1964 0941        DCI   H'1964'
04A7 17          0942        ST
04A8 901D   04C6 0943        BR    D88T          JUMP TO SET T7
04AA 2A1965 1965 0944  PB8   DCI   H'1965'       ALTERNATE SPEED-DISPLAY
                 0945  *                         OFF
04AD 16          0946        LM
04AE 50          0947        LR    0,A
04AF 74          0948        LIS   4             TEST FOR SPEED SELECTION
04B0 F0          0949        NS    0
04B1 20F8        0950        LI    H'F8'         RESET FIELD AREA, TOTAL
                 0951  *                         AREA, AND SPEED
04B3 9415   04C9 0952        BNZ   T54           JUMP IF SPEED SELECTED
04B5 F0          0953        NS    0
04B6 2404        0954        AI    H'04'         SET SPEED
04B8 2A1965 1965 0955        DCI   H'1965'
04BB 17          0956        ST
04BC 2A1964 1964 0957        DCI   H'1964'
04BF 16          0958        LM
04C0 217F        0959        NI    H'7F'
```

```
04C2 2A1964 1964 0960        DCI   H'1964'
04C5 17          0961        ST
04C6 29074F 074F 0962  D88T  JMP   D8T       JMP TO SET T7
04C9 F0          0963  T54   NS    0
04CA 2A1965 1965 0964        DCI   H'1965'
04CD 17          0965        ST              RESET SPEED
04CE 2A1964 1964 0966        DCI   H'1964'
04D1 16          0967        LM
04D2 217F        0968        NI    H'7F'
04D4 2480        0969        AI    H'80'
04D6 2A1964 1964 0970        DCI   H'1964'
04D9 17          0971        ST
04DA 90EB   04C6 0972        BR    D88T      JUMP TO SET T7
04DC 1A          0973  PB9   DI
04DD 70          0974        CLR
04DE B6          0975        OUTS  6
04DF 2A1966 1966 0976        DCI   H'1966'
04E2 2014        0977        LI    H'14'
04E4 50          0978        LR    0,A
04E5 70          0979        CLR
04E6 17          0980  T55A  ST
04E7 30          0981        DS    0
04E8 94FD   04E6 0982        BNZ   T55A
04EA 2A1979 1979 0983        DCI   H'1979'   CLEAR DISPLAY & BEEP ALARM
04ED 2020        0984        LI    H'20'
04EF 17          0985        ST
04F0 281256 1256 0986        PI    DISPLA
04F3 2A1956 1956 0987        DCI   H'1956'   POWER DOWN
04F6 16          0988        LM              STORE FIELD AREA IN
                 0989  *                     EAROM
04F7 51          0990        LR    1,A       FIELD AREA TO R0  R1
04F8 16          0991        LM
04F9 50          0992        LR    0,A
04FA 2048        0993        LI    H'48'     EAROM FIELD AREA ADDRESS
04FC 52          0994        LR    2,A
04FD 28128C 128C 0995        PI    ADDIN     LOAD ADDRESS
0500 281373 1373 0996        PI    WRITE     LOAD DATA & WRITE
0503 16          0997        LM              STORE TOTAL AREA IN EAROM
0504 51          0998        LR    1,A
0505 16          0999        LM
0506 50          1000        LR    0,A
0507 2050        1001        LI    H'50'     EAROM TOTAL AREA ADDRESS
0509 52          1002        LR    2,A
050A 28128C 128C 1003        PI    ADDIN     LOAD ADDRESS
050D 281373 1373 1004        PI    WRITE     LOAD DATA & WRITE
0510 2A1964 1964 1005        DCI   H'1964'   STORE DISPLAY REGISTERS
0513 16          1006        LM
0514 51          1007        LR    1,A
0515 16          1008        LM
0516 50          1009        LR    0,A
0517 2080        1010        LI    H'80'     EAROM DISPLAY REGISTERS
                 1011  *                     ADDRESS
0519 52          1012        LR    2,A
051A 28128C 128C 1013        PI    ADDIN     LOAD ADDRESS
051D 281373 1373 1014        PI    WRITE     LOAD DATA & WRITE
0520 2A1979 1979 1015  T55B  DCI   H'1979'
0523 70          1016        CLR
0524 17          1017        ST
0525 281256 1256 1018        PI    DISPLA
0528 70          1019        CLR
0529 B5          1020        OUTS  5
052A 2812EE 12EE 1021  T55   PI    SWITCH
052D 2A197F 197F 1022        DCI   H'197F'
0530 71          1023        LIS   1
0531 8A          1024        NM
0532 94F7   052A 1025        BNZ   T55
0534 290000 0000 1026        JMP   START
0537 2A197F 197F 1027  PB10  DCI   H'197F'   <SELECT>
053A 16          1028        LM              TEST IF OPERATE OR SETUP.
053B 2140        1029        NI    H'40'     MASK FOR OPERATE/SETUP
                 1030  *                     BIT
053D 9428   0566 1031        BNZ   D88       JUMP IF IN OPERATE (IGNOR)
053F 65          1032        LISU  5         TEST IF EAROM PRESENTLY
                 1033  *                     IN ACTION
0540 6D          1034        LISL  5
```

```
0541 71              1035          LIS    1
0542 FC              1036          NS     S
0543 9422    0566    1037          BNZ    D88       JUMP IF EAROM STILL IN
                     1038    *                      ACTION
0545 2A199C  199C    1039          DCI    H'199C'   SETUP MODE ADDRESS
0548 16              1040          LM
0549 50              1041          LR     0,A
054A 2020            1042          LI     H'20'     TEST FOR ROW ON OFF
                     1043    *                      SELECTION
054C F0              1044          NS     0
054D 841B    0569    1045          BZ     T56       JUMP IF ROW ON OFF NOT
                     1046    *                      SELECTED
054F 16              1047          LM               INCREMENT DATA COUNTER
0550 16              1048          LM
0551 50              1049          LR     0,A       SURC SETUP ROW COUNTER
0552 2A195C  195C    1050          DCI    H'195C'   ADDRESS OF 1ST BANK ROW
                     1051    *                      ON/OFF FLAGS
0555 281724  1724    1052          PI     ONOFF
0558 70              1053          CLR
0559 9402    055C    1054          BNZ    T58
055B 1F              1055          INC
055C 51              1056   T58    LR     1,A
055D 2A195C  195C    1057          DCI    H'195C'
0560 281741  1741    1058          PI     BITSET
0563 29074F  074F    1059          JMP    D8T
0566 290755  0755    1060   D88    JMP    D8
0569 2010            1061   T56    LI     H'10'     TEST FOR DIST. CAL.
                     1062    *                      SELECTION
056B F0              1063          NS     0
056C 84F9    0566    1064          BZ     D88       JUMP IF DIST CAL. NOT
                     1065    *                      SELECTED (IGNOR)
056E 16              1066          LM
056F 50              1067          LR     0,A
0570 20FF            1068          LI     H'FF'
0572 8E              1069          ADC
0573 74              1070          LIS    4         TEST IF "CAL" SET
0574 F0              1071          NS     0
0575 74              1072          LIS    4
0576 942B    05A2    1073          BNZ    T61       JUMP IF "CAL" SET
0578 C0              1074          AS     0
0579 17              1075          ST               SET "CAL"
057A 65              1076          LISU   5
057B 6C              1077          LISL   4
057C 4C              1078          LR     A,S
057D 2201            1079          OI     H'01'
057F 5C              1080          LR     S,A
0580 2063            1081   T56A   LI     H'63'     RESET ACK 1/200 ACRE
                     1082    *                      DIST COUNTER
0582 50              1083          LR     0,A       ADDRESS & RESET INFO
0583 2020            1084          LI     H'20'     ACK IDENTITY
0585 51              1085          LR     1,A
0586 2813D1  13D1    1086          PI     SUBACK    RESET 1/200 ACRE DIST.
0589 2813D1  13D1    1087          PI     SUBACK
                     1088    *                      COUNTER
058C 2A1900  1900    1089          DCI    H'1900'   RESET ALL "E" REGISTERS
                     1090    *                      & MPH DIST. STO.
058F 2044            1091          LI     H'44'
0591 50              1092          LR     0,A
0592 70              1093          CLR
0593 17              1094   T62    ST
0594 30              1095          DS     0
0595 94FD    0593    1096          BNZ    T62       ALL "E" REGISTERS & MPH
                     1097    *                      DIST. STO. RESET
0597 2A1985  1985    1098          DCI    H'1985'   RESET T3 (1 SEC MPH) &
                     1099    *                      T4 (2 SEC SEED/SEC &
                     1100    *                      POP SCAN)
059A 2028            1101          LI     H'28'
059C 17              1102          ST               T3 --> 1 SEC
059D 2050            1103          LI     H'50'
059F 17              1104          ST               T4 --> 2 SEC
05A0 90C5    0566    1105          BR     D88
05A2 18              1106   T61    COM
05A3 F0              1107          NS     0
05A4 17              1108          ST               RESET "CAL"
05A5 2A195A  195A    1109          DCI    H'195A'   ADDRESS DIST CAL C0 RAM
                     1110    *                      REGISTER
```

```
05A8 2023           1111         LI    H'23'      READ ACK 1/200 ACRE DIST.
                    1112   *                      COUNTER
05AA 50             1113         LR    0,A
05AB 2020           1114         LI    H'20'      ACK IDENTITY
05AD 51             1115         LR    1,A
05AE 2813D1 13D1    1116         PI    SUBACK
05B1 43             1117         LR    A,3        DIVIDE BY 4
05B2 12             1118         SR    1
05B3 12             1119         SR    1
05B4 51             1120         LR    1,A
05B5 73             1121         LIS   3
05B6 F2             1122         NS    2
05B7 15             1123         SL    4
05B8 13             1124         SL    1
05B9 13             1125         SL    1
05BA C1             1126         AS    1
05BB 51             1127         LR    1,A
05BC 42             1128         LR    A,2
05BD 12             1129         SR    1
05BE 12             1130         SR    1
05BF 50             1131         LR    0,A
05C0 41             1132         LR    A,1
05C1 17             1133         ST               DIST. CAL. C0
05C2 40             1134         LR    A,0
05C3 17             1135         ST               DIST. CAL. C1
05C4 65             1136         LISU  5
05C5 6C             1137         LISL  4
05C6 4C             1138         LR    A,S
05C7 2201           1139         OI    H'01'
05C9 5D             1140         LR    I,A        SET 1/8 SEC ALARM BEEP
05CA 2058           1141         LI    H'58'      EAROM DIST. CAL. ADDRESS
05CC 52             1142         LR    2,A
05CD 71             1143         LIS   1          SET EAROM BIT 0 R55
05CE CC             1144         AS    S
05CF 5C             1145         LR    S,A        EAROM BIT 0 R55 SET
05D0 28128C 128C    1146         PI    ADDIN      EAROM ADDRESS SET UP FOR
                    1147   *                      DIST. CAL.
05D3 281334 1334    1148         PI    ERASE      ERASE OLD DIST. CAL DATA
05D6 281373 1373    1149         PI    WRITE      WRITE NEW DIST. CAL.
                    1150   *                      DATA IN EAROM
05D9 20FE           1151         LI    H'FE'      RESET EAROM BIT 0 R55
05DB FC             1152         NS    S
05DC 5C             1153         LR    S,A
05DD 290580 0580    1154         JMP   T56A
05E0 290755 0755    1155  D888   JMP   D8
05E3 2A197F 197F    1156  PB11   DCI   H'197F'    STEP UP
05E6 16             1157         LM
05E7 2140           1158         NI    H'40'      MASK FOR OPERATE/SET UP
                    1159   *                      BIT
05E9 94F6    05E0   1160         BNZ   D888       JUMP IF IN OPERATE (IGNOR)
05EB 2A199C 199C    1161         DCI   H'199C'    SETUP SELECTION REGISTER
05EE 2C             1162         XDC
05EF 2A199C 199C    1163         DCI   H'199C'
05F2 16             1164         LM
05F3 12             1165         SR    1          STEP TO PRECEEDING FUNCTION
05F4 9403    05F8   1166         BNZ   T63        JUMP IF NOT ROLLING OVER
05F6 2080           1167         LI    H'80'      ROLLOVER TO NO. ROWS
05F8 2C             1168  T63    XDC
05F9 17             1169         ST               SETUP SELECTION REGISTER
                    1170   *                      MODIFIED
05FA 65             1171  T64D   LISU  5          RESET CURSOR COUNTER
05FB 6E             1172         LISL  6
05FC 2A199C 199C    1173         DCI   H'199C'
05FF 16             1174         LM
0600 50             1175         LR    0,A
0601 2020           1176         LI    H'20'
0603 F0             1177         NS    0
0604 840C    0611   1178         BZ    T63A
0606 2A1962 1962    1179         DCI   H'1962'
0609 79             1180         LIS   9
060A 8D             1181         CM
060B 70             1182         CLR
060C 9209    0616   1183         BNC   T63B
060E 1F             1184         INC
060F 9006    0616   1185         BR    T63B
```

```
0611 C0              1186  T63A    AS      0
0612 71              1187          LIS     1
0613 9102   0616     1188          BM      T63B
0615 73              1189          LIS     3
0616 5E              1190  T63B    LR      D,A
0617 2A199E 199E     1191          DCI     H'199E'
061A 70              1192          CLR
061B 17              1193          ST
061C 2A1987 1987     1194          DCI     H'1987'    SET TIMER T1 (3 SEC. SHOW
                     1195  *                                     LIST)
061F 203C            1196          LI      H'3C'
0621 17              1197          ST                 TI --> 3 SEC
0622 66              1198          LISU    6
0623 207F            1199          LI      H'7F'
0625 FC              1200          NS      S
0626 5C              1201          LR      S,A
0627 29074F 074F     1202          JMP     D8T        JUMP TO SET T7
062A 2A197F 197F     1203  PB12    DCI     H'197F'    STEP DOWN
062D 16              1204          LM
062E 2140            1205          NI      H'40'
0630 94AF   05E0     1206          BNZ     D888       JUMP IF IN OPERATE (IGNOR)
0632 2A199C 199C     1207          DCI     H'199C'    SET UP SELECTION REGISTER
0635 2C              1208          XDC
0636 2A199C 199C     1209          DCI     H'199C'
0639 16              1210          LM
063A 13              1211          SL      1          STEP TO NEXT FUNCTION
063B 9402   063E     1212          BNZ     T64        JUMP IF NOT ROLLING OVER
063D 71              1213          LIS     1          ROLL OVER TO HI WARN
063E 2C              1214  T64     XDC
063F 17              1215          ST                 SETUP SELECTION REGISTER
                     1216  *                          MODIFIED
0640 90B9   05FA     1217          BR      T64D       ↑ -->
0642 2A197F 197F     1218  PB13    DCI     H'197F'
0645 16              1219          LM
0646 2140            1220          NI      H'40'
0648 9497   05E0     1221          BNZ     D888       JUMP IF IN OPERATE
                     1222  *                          (IGNOR)
064A 65              1223          LISU    5          INCREMENT CURSOR COUNTER
064B 6E              1224          LISL    6
064C 20FF            1225          LI      H'FF'
064E CC              1226          AS      S
064F 8114   0664     1227          BP      T64A       JUMP IF NO ROLL BACK RE-
                     1228  *                          QUIRED
0651 2A199C 199C     1229          DCI     H'199C'
0654 2020            1230          LI      H'20'
0656 8A              1231          NM
0657 8410   0668     1232          BZ      T64C       JUMP IF ROW ON-OFF NOT
                     1233  *                          SELECTED
0659 2A1962 1962     1234          DCI     H'1962'
065C 79              1235          LIS     9          TEST IF > 9 ROW
065D 8D              1236          CM
065E 8204   0663     1237          BC      T64B       JUMP IF > 9 ROW]
0660 70              1238          LIS     0
0661 9002   0664     1239          BR      T64A
0663 71              1240  T64B    LIS     1
0664 5C              1241  T64A    LR      S,A
0665 29074F 074F     1242          JMP     D8T        JUMP TO SET T7
0668 2A199C 199C     1243  T64C    DCI     H'199C'
066B 88              1244          AM
066C 91F6   0663     1245          BM      T64B
066E 73              1246          LIS     3
066F 90F4   0664     1247          BR      T64A
0671 2A197F 197F     1248  PB14    DCI     H'197F'    0<>9
0674 16              1249          LM
0675 2140            1250          NI      H'40'
0677 9430   06A8     1251          BNZ     DD88       JUMP IF IN OPERATE
                     1252  *                          (IGNOR)
0679 65              1253          LISU    5          TEST IF EAROM IN ACTION
067A 6D              1254          LISL    5
067B 71              1255          LIS     1
067C FC              1256          NS      S
067D 942A   06A8     1257          BNZ     DD88       JUMP IF EAROM STILL IN
                     1258  *                          ACTION
067F 2A199C 199C     1259          DCI     H'199C'    SETUP SELECTION REGISTER
0682 16              1260          LM
0683 50              1261          LR      0,A
```

```
0684 71            1262           LIS   1         TEST FOR HI WARN SELECTION
0685 F0            1263           NS    0
0686 8424    06AB  1264           BZ    T65       JUMP IF HI WARN NOT
                   1265    *                      SELECTED
0688 2A1946  1946  1266           DCI   H'1946'   HI WARN CO ADDRESS
068B 78            1267           LIS   8         EAROM ADDRESS
068C 56            1268    T67    LR    6,A
068D 281451  1451  1269           PI    SUBINC    INCREMENT SELECTED DIGIT
0690 46            1270           LR    A,6       EAROM ADDRESS FOR HI WARN
0691 52            1271           LR    2,A
0692 65            1272    T75    LISU  5         SET TIMER FOR BEEP
0693 6C            1273           LISL  4
0694 4C            1274           LR    A,S
0695 2201          1275           OI    H'01'
0697 5D            1276           LR    I,A
0698 71            1277           LIS   1         SET EAROM BIT 0 R55
0699 CC            1278           AS    S
069A 5C            1279           LR    S,A       EAROM BIT 0 R55 SET
069B 28128C  128C  1280           PI    ADDIN
069E 281334  1334  1281           PI    ERASE
06A1 281373  1373  1282           PI    WRITE
06A4 20FE          1283           LI    H'FE'     RESET EAROM BIT 0 R55
06A6 FC            1284           NS    S
06A7 5C            1285           LR    S,A
06A8 290755  0755  1286    DD88   JMP   D8
06AB 72            1287    T65    LIS   2         TEST FOR LO WARN SELECTION
06AC F0            1288           NS    0
06AD 8408    06B6  1289           BZ    T66       JUMP IF LO WARN NOT
                   1290    *                      SELECTED
06AF 2A1948  1948  1291           DCI   H'1948'   LO WARN CO ADDRESS
06B2 2010          1292           LI    H'10'     EAROM ADDRESS
06B4 90D7    068C  1293           BR    T67
06B6 74            1294    T66    LIS   4         REST FOR FIELD AREA
                   1295    *                      SELECTION
06B7 F0            1296           NS    0
06B8 8406    06BF  1297           BZ    T68       JUMP IF FIELD AREA NOT
                   1298    *                      SELECTED
06BA 2A1956  1956  1299           DCI   H'1956'   FIELD AREA CO ADDRESS
06BD 9008    06C6  1300           BR    T68A
06BF 78            1301    T68    LIS   8         TEST FOR TOTAL AREA
                   1302    *                      SELECTION
06C0 F0            1303           NS    0
06C1 840A    06CC  1304           BZ    T69       JUMP IF TOTAL AREA NOT
                   1305    *                      SELECTED
06C3 2A1958  1958  1306           DCI   H'1958'   TOTAL AREA CO ADDRESS
06C6 281451  1451  1307    T68A   PI    SUBINC
06C9 29074F  074F  1308           JMP   DST
06CC 2010          1309    T69    LI    H'10'     TEST FOR DIST. CAL.
                   1310    *                      SELECTION
06CE F0            1311           NS    0
06CF 8408    06D8  1312           BZ    T70       JUMP IF DIST. CAL. NOT
                   1313    *                      SELECTED
06D1 2A195A  195A  1314           DCI   H'195A'   DIST. CAL CO ADDRESS
06D4 2058          1315           LI    H'58'     EAROM ADDRESS
06D6 90B5    068C  1316           BR    T67
06D8 2040          1317    T70    LI    H'40'     TEST FOR ROW SPACE
                   1318    *                      SELECTION
06DA F0            1319           NS    0
06DB 8408    06E4  1320           BZ    T71       JUMP IF ROW SPACE NOT
                   1321    *                      SELECTED
06DD 2A1960  1960  1322           DCI   H'1960'   ROW SPACE CO ADDRESS
06E0 2070          1323           LI    H'70'     EAROM ADDRESS
06E2 90A9    068C  1324           BR    T67
06E4 2080          1325    T71    LI    H'80'     TEST FOR NO. ROWS
                   1326    *                      SELECTION
06E6 F0            1327           NS    0
06E7 8437    071F  1328           BZ    T72       JUMP IF NO. ROWS NOT
                   1329    *                      SELECTED
06E9 2A19A0  19A0  1330           DCI   H'19A0'
06EC 2C            1331           XDC
06ED 2A1962  1962  1332           DCI   H'1962'   NO. ROWS CO ADDRESS
06F0 16            1333           LM
06F1 1F            1334           INC             BINARY ROW CODE -->
                   1335    *                      BINARY # CORRECTION
06F2 2C            1336           XDC
06F3 17            1337           ST
```

```
06F4  2A19A0  19A0  1338           DCI    H'19A0'
06F7  65            1339           LISU   5            LIMIT CURSOR TO 2 DIGIT
                    1340  *                            ONLY
06F8  6E            1341           LISL   6
06F9  71            1342           LIS    1
06FA  FC            1343           NS     S
06FB  5C            1344           LR     S,A
06FC  281451  1451  1345           PI     SUBINC
06FF  65            1346           LISU   5            TEST IF 16 OR 32 ROW
                    1347  *                            MODULE
0700  6D            1348           LISL   5
0701  70            1349           LIS    0
0702  CC            1350           AS     S
0703  9104    0708  1351           BM     T73          JUMP IF 32 ROW MODULE
0705  7F            1352           LIS    H'F'         SET MAX ROW TO 16
0706  9003    070A  1353           BR     T74
0708  201F          1354  T73      LI     H'1F'        SET MAX ROW TO 32
070A  56            1355  T74      LR     6,A
070B  2A1962  1962  1356           DCI    H'1962'      NO. ROWS RAM ADDRESS
070E  2814DA  14DA  1357           PI     SUBROW       PROCESS ROLL OVERS
0711  2814AD  14AD  1358           PI     SUBOFF       UPDATE ROW ON/OFF FLAGS
0714  2078          1359           LI     H'78'        EAROM ADDRESS FOR NO. ROWS
0716  52            1360           LR     2,A
0717  2A1981  1981  1361           DCI    H'1981'
071A  70            1362           CLR
071B  17            1363           ST
071C  290692  0692  1364           JMP    T75
071F  2020          1365  T72      LI     H'20'        TEST FOR ROW ON/OFF
                    1366  *                            SELECTION
0721  F0            1367           NS     0
0722  8432    0755  1368           BZ     D8           JMP IF ROW ON/OFF NOT SELEC
                    1369  *                            (IGNOR)
0724  2A19A0  19A0  1370           DCI    H'19A0'
0727  2C            1371           XDC
0728  2A199E  199E  1372           DCI    H'199E'      SURC (SET ROW COUNTER)
                    1373  *                            ADDRESS
072B  16            1374           LM
072C  1F            1375           INC                 BINARY ROW --> BINARY #
                    1376  *                            CORRECTION
072D  2C            1377           XDC
072E  17            1378           ST
072F  65            1379           LISU   5            LIMIT CURSOR TO 2 DIGIT
                    1380  *                            ONLY
0730  6E            1381           LISL   6
0731  71            1382           LIS    1
0732  FC            1383           NS     S
0733  5C            1384           LR     S,A
0734  2A1962  1962  1385           DCI    H'1962'      TEST IF UNIT < 10 ROW
0737  16            1386           LM
0738  2508          1387           CI     H'08'
073A  9203    073E  1388           BNC    T76          JMP IF UNIT > 10 ROW
073C  70            1389           CLR                 LIMIT CURSOR TO 1 DIGIT
                    1390  *                            ONLY
073D  5C            1391           LR     S,A
073E  2A19A0  19A0  1392  T76      DCI    H'19A0'
0741  281451  1451  1393           PI     SUBINC
0744  2A1962  1962  1394           DCI    H'1962'      SET R6 TO MAX ROW
0747  16            1395           LM
0748  56            1396           LR     6,A
0749  2A199E  199E  1397           DCI    H'199E'      SURC RAM ADDRESS
074C  2814DA  14DA  1398           PI     SUBROW       PROCESS ROLL OVERS
074F  65            1399  D8T      LISU   5            SET TIMER FOR BEEP
0750  6C            1400           LISL   4
0751  4C            1401           LR     A,S
0752  2201          1402           OI     H'01'
0754  5C            1403           LR     S,A
0755  65            1404  D8       LISU   5            SET OR RESET "SHOW LIST"
                    1405  *                            BIT 7 R57
0756  6F            1406           LISL   7
0757  207F          1407           LI     H'7F'
0759  FC            1408           NS     S
075A  5C            1409           LR     S,A          START BY RESETTING BIT 7
075B  2A197F  197F  1410           DCI    H'197F'      K2 KEY BOARD STORAGE
075E  7C            1411           LIS    H'0C'        TEST FOR STEP UP & STEP
                    1412  *                            DOWN BITS (PB 11 & 12)
075F  8A            1413           NM
```

```
0760 840C    076D 1414             BZ      T77         JMP IF SHOW LIST BIT TO
                  1415     *                           BE LEFT RESET
0762 2A1987  1987 1416             DCI     H'1987'     TEST FOR T1 = 0 (SHOW LIST
                  1417     *                           TIMER
                  1418     *
                  1419     *
                  1420     *
                  1421     *   2ND TAPE TIMER
                  1422     *
                  1423     *
0765 70           1424             CLR
0766 88           1425             AM
0767 9405    076D 1426             BNZ     T77         JUMP IF T1 =' 0 AND
                  1427     *                           SHOW LIST BIT TO BE
                  1428     *                           LEFT RESET
0769 2080         1429             LI      H'80'       SET SHOW LIST BIT 7
                  1430     *                           R57
076B CC           1431             AS      S
076C 5C           1432             LR      S,A
076D 65           1433     T77     LISU    5           PROCESS ALARM BIT 7
                  1434     *                           R57
076E 6F           1435             LISL    7
076F 20FD         1436             LI      H'FD'
0771 FC           1437             NS      S           START BY RESETTING ALARM
                  1438     *                           BIT
0772 5C           1439             LR      S,A
0773 2A1984  1984 1440             DCI     H'1984'     TEST FOR T6 =' 0 (1/2 SEC
                  1441     *                           HI-LO ALARM COUNTER)
0776 70           1442             CLR
0777 88           1443             AM
0778 941F    0798 1444             BNZ     T78         JUMP TO SET ALARM BIT IF
                  1445     *                           T6 =' 0
077A 2A1988  1988 1446             DCI     H'1988'     TEST FOR T7 =' 0 (1/8 SEC
                  1447     *                           PUSH SWITCH ALARM COUNTER)
077D 88           1448             AM
077E 9419    0798 1449             BNZ     T78         JUMP TO SET ALARM BIT IF
                  1450     *                           T7 =' 0
0780 A1           1451             INS     1           TEST FOR LIFT SWITCH BIT
                  1452     *                           1  PORT 1
0781 2102         1453             NI      H'02'
0783 9418    079C 1454             BNZ     T79         JUMP IF ALARM BIT TO
                  1455     *                           REMAIN RESET (PLANTER
                  1456     *                           LIFTED)
0785 2060         1457             LI      H'60'       TEST FOR DIST. FAILED
                  1458     *                           FLAG 1 & 2
0787 FC           1459             NS      S
0788 2360         1460             XI      H'60'
078A 6C           1461             LISL    4
078B 8407    0793 1462             BZ      T77A        JUMP TO SET ALARM BIT IF
                  1463     *                           BOTH DIST. FAILED FLAGS
                  1464     *                           SET
078D 6D           1465             LISL    5           TEST IF NO. DIS. BIT SET
078E 2040         1466             LI      H'40'
0790 FE           1467             NS      D
0791 940A    079C 1468             BNZ     T79         JUMP IF ALARM BIT TO
                  1469     *                           REMAIN RESET (NO DIST.
                  1470     *                           BIT SET)
0793 2078         1471     T77A    LI      H'78'       TEST IF ALARM BIT NEED TO
                  1472     *                           INDICATE
0795 FC           1473             NS      S
0796 8405    079C 1474             BZ      T79         JUMP IF ALARM BIT TO
                  1475     *                           REMAIN RESET
0798 6F           1476     T78     LISL    7
0799 72           1477             LIS     2           SET ALARM BIT
079A CC           1478             AS      S
079B 5C           1479             LR      S,A
079C 1A           1480     T79     DI
079D 2A1A00  1A00 1481             DCI     H'1A00'     ADDRESS OF INT. SAVE
                  1482     *                           ADDRESS C1
07A0 16           1483             LM
07A1 06           1484             LR      QU,A
07A2 16           1485             LM
07A3 07           1486             LR      QL,A
07A4 0F           1487             LR      DC,Q
07A5 20E4         1488             LI      H'E4'       SUBTRACT 28 FROM DC TO
                  1489     *                           GET TO DC+4
```

```
07A7 8E            1490         ADC
07A8 60            1491         LISU    0
07A9 6F            1492         LISL    7
07AA 16            1493  T80    LM              DC+4 : R7   DC+7 : R4
                   1494  *                      DC+10 : R1
07AB 5E            1495         LR      D,A     DC+5 : R6   DC+8 : R3
                   1496  *                      DC+11 : R0
07AC 8FFD  07AA    1497         BR7     T80     DC+6 : R5   DC+9 : R2
07AE 61            1498         LISU    1
07AF 16            1499  T81    LM              DC+12 : DCIL  DC+15 :
                   1500  *                      PCIU  DC+18 : STATUS
07B0 5E            1501         LR      D,A     DC+13 : DCIU  DC+16 :
                   1502  *                      DCOL  DC+19 : ACC
07B1 8FFD  07AF    1503         BR7     T81     DC+14 : PCIL  DC+17 :
                   1504  *                      DCOU
07B3 67            1505         LISU    7
07B4 6B            1506         LISL    3
07B5 16            1507  T82    LM              DC+20 : R73  DC+22 :
                   1508  *                      R71
07B6 5E            1509         LR      D,A     DC+21 : R72  DC+23 :
                   1510  *                      R70
07B7 8FFD  07B5    1511         BR7     T82
07B9 66            1512         LISU    6
07BA 6B            1513         LISL    3
07BB 16            1514  T83    LM              DC+24 : R63  DC+26 : R61
07BC 5E            1515         LR      D,A     DC+25 : R62  DC+27 : R60
07BD 8FFD  07BB    1516         BR7     T83
07BF 65            1517         LISU    5
07C0 6B            1518         LISL    3
07C1 16            1519  T84    LM              DC+28 : R53  DC+30 : R51
07C2 5E            1520         LR      D,A     DC+29 : R52  DC+31 : R50
07C3 8FFD  07C1    1521         BR7     T84
07C5 1D            1522         LR      W,J
07C6 09            1523         LR      P,K
07C7 2C            1524         XDC
07C8 0F            1525         LR      DC,Q
07C9 2C            1526         XDC
07CA 20E0          1527         LI      H'E0'   SUBTRACT 32 FROM DC TO
                   1528  *                      GET TO DC+0
07CC 8E            1529         ADC
07CD 0E            1530         LR      Q,DC
07CE 2A1A00  1A00  1531         DCI     H'1A00' ADDRESS OF INT. SAVE
                   1532  *                      ADDRESS C1
07D1 02            1533         LR      A,QU
07D2 17            1534         ST
07D3 03            1535         LR      A,QL
07D4 17            1536         ST
07D5 0F            1537         LR      DC,Q
07D6 16            1538         LM
07D7 04            1539         LR      KU,A
07D8 16            1540         LM
07D9 05            1541         LR      KL,A
07DA 16            1542         LM
07DB 59            1543         LR      9,A
07DC 16            1544         LM
07DD 0B            1545         LR      IS,A
07DE 49            1546         LR      A,9
07DF 10            1547         LR      DC,H
07E0 1B            1548         EI
07E1 1C            1549         POP
                   1550  *
                   1551  *
                   1552         END
                   0001         TITLE           SUBROUTINES
                   0002  *
                   0003  *
                   0004  *
                   0005  *
                   0006  *
                   0007  *
                   0008  *
                   0009  *
                   0010  *
                   0011  ***************************************************
                   0012  *      DISPLAY ROUTINE
```

```
                    0013   *
                    0014   *       INST C: 6819.5 (13.64 MSEC)
                    0015   *
                    0016           ORG     H'1256'
1256  1A            0017   DISPLA  DI
1257  08            0018           LR      K,P
1258  1B            0019           EI
                    0020   *                               USES P0,R1,P2,P3
1259  2A1966  1966  0021           DCI     H'1966'         LOCATION OF OUTPUT DATA IN
125C  2014          0022           LI      H'14'           SET-UP FOR 20 BYTE TRANSFE
125E  50            0023           LR      0,A
125F  78            0024   A4      LIS     H'08'           SET-UP FOR 8 BITS-BYTE TRA
1260  51            0025           LR      1,A
1261  16            0026           LM
1262  52            0027           LR      2,A             STORE DATA BYTE IN P2 FOR
                    0028   *                               LSB SELECTION
1263  1A            0029   A3      DI                      & SHIFTING
1264  A4            0030           INS     4               PROCESS DATA BIT
1265  53            0031           LR      3,A
1266  71            0032           LIS     1
1267  F2            0033           NS      2               MASK FOR BIT 0 OF DATA BYT
1268  15            0034           SL      4
1269  13            0035           SL      1
126A  C3            0036           AS      3               SET OR RESET DATA BIT
126B  B4            0037           OUTS    4
126C  2210          0038           OI      H'10'
126E  B4            0039           OUTS    4               TWITTLE CLK
126F  210F          0040           NI      H'0F'           CLR DATA & CLK
1271  B4            0041           OUTS    4
1272  1B            0042           EI
1273  31            0043           DS      1
1274  8406   127B   0044           BZ      A2              JMP IF ALL 8 BITS DONE
1276  42            0045           LR      A,2             PREP NEXT BYTE TRANSFER
1277  12            0046           SR      1
1278  52            0047           LR      2,A
1279  90E9   1263   0048           BR      A3
127B  30            0049   A2      DS      0
127C  94E2   125F   0050           BNZ     A4              JMP IF NOT THRU ALL BYTES
127E  1A            0051           DI
127F  A4            0052           INS     4
1280  2220          0053           OI      H'20'
1282  B4            0054           OUTS    4
1283  2240          0055           OI      H'40'
1285  B4            0056           OUTS    4
1286  2360          0057           XI      H'60'
1288  B4            0058           OUTS    4
1289  09            0059           LR      P,K
128A  1B            0060           EI
128B  1C            0061           POP
                    0062   *                       45
                    0063   *
                    0064   *
                    0065   ***********************************************
                    0066   *       EAROM ADDRESS IN PROGRAM
                    0067   *
                    0068   *
                    0069   *       INST C: 220 (.44 MSEC)
                    0070   *
                    0071   *
128C  1A            0072   ADDIN   DI                      R0 & R1 = MSB & LSB DATA
128D  A5            0073           INS     5               R2 = ADDRESS (LEFT JUSTIFIE
128E  55            0074           LR      5,A             R3 = LOOP COUNTER
128F  75            0075           LIS     5               R4 = TEMP STORAGE REG
1290  53            0076           LR      3,A             R5 = TEMP STORAGE REG
1291  A4            0077           INS     4
1292  2170          0078           NI      H'70'           5 ADDRESS BITS TO BE SERIAL
                    0079   *                               ENTERED IN LOOP
1294  240C          0080           AI      H'0C'
1296  B4            0081           OUTS    4
1297  A4            0082   B0      INS     4               "SERIAL ADDRESS IN" LOOP
1298  217E          0083           NI      H'7E'           RESET I/O FOR NEW DATA BIT
129A  54            0084           LR      4,A             TEST FOR MSB
129B  42            0085           LR      A,2
129C  19            0086           LNK                     SET STATUS REGS
129D  44            0087           LR      A,4
```

```
129E  9102  12A1  0088           BM    B1       JMP IF ADDRESS BIT NOT =
                  0089  *                       0 SET BIT 0 PORT 4
                  0090  *                       (INVERTED LOGIC)
12A0  1F          0091           INC
12A1  B4          0092   B1      OUTS  4
12A2  45          0093           LR    A,5      SEND 4-10 USEC CLK PULSE
12A3  1F          0094           INC
12A4  B5          0095           OUTS  5
12A5  45          0096           LR    A,5      RESET CLK
12A6  B5          0097           OUTS  5
12A7  42          0098           LR    A,2      SHIFT ADDRESS FOR NEXT
                  0099  *                       BIT ENTRY
12A8  13          0100           SL    1
12A9  52          0101           LR    2,A
12AA  33          0102           DS    3
12AB  94EB  1297  0103           BNZ   B0
12AD  1B          0104           EI
12AE  1C          0105           POP
                  0106  *
                  0107  *
                  0108  *
                  0109  *
                  0110  ***********************************************
                  0111  *
                  0112  *        EAROM READ PROGRAM    *
                  0113  *
                  0114  *
                  0115  *
                  0116  *        INST C: 633 (1.27 MSEC)
                  0117  *
                  0118  *
                  0119  *                       R0:   MSB DATA
                  0120  *                       R1:   LSB DATA
                  0121  *                       R2:   ADDRESS
                  0122  *                       R3:   LOOP COUNTER
12AF  1A          0123   READ    DI
12B0  70          0124           CLR
12B1  50          0125           LR    0,A
12B2  51          0126           LR    1,A
12B3  A5          0127           INS   5        R4:   TEMP STO. REG.
12B4  54          0128           LR    4,A
12B5  A4          0129           INS   4        PRESENT "READ" FOR 1
                  0130  *                       CLK PULSE
12B6  2170        0131           NI    H'70'    SET C1,C2,C3 FOR "READ"
                  0132  *                       (110)
12B8  2408        0133           AI    H'08'
12BA  B4          0134           OUTS  4
12BB  44          0135           LR    A,4      SEND 4-10 USEC CLK PULSE
12BC  1F          0136           INC
12BD  B5          0137           OUTS  5
12BE  44          0138           LR    A,4      RESET CLK
12BF  B5          0139           OUTS  5
12C0  A4          0140           INS   4        PRESENT "SERIAL
12C1  2170        0141           NI    H'70'    SET C1C2C3 FOR
                  0142  *                       "SERIAL DATA OUT"
                  0143  *                       (011)
12C3  2402        0144           AI    H'02'
12C5  B4          0145           OUTS  4
12C6  2010        0146           LI    H'10'    PREPARE TO SHIFT
                  0147  *                       16 DATA BITS
12C8  53          0148           LR    3,A
12C9  44          0149   C2      LR    A,4      SEND 4-10 USEC CLK
                  0150  *                       PULSE
12CA  1F          0151           INC
12CB  B5          0152           OUTS  5
12CC  44          0153           LR    A,4      RESET CLK
12CD  B5          0154           OUTS  5
12CE  41          0155           LR    A,1      SHIFT DATA
12CF  13          0156           SL    1
12D0  51          0157           LR    1,A
12D1  A6          0158           INS   6
12D2  8104  12D7  0159           BP    C0       JUMP IF DATA BIT=0
12D4  71          0160           LIS   1
12D5  C1          0161           AS    1
12D6  51          0162           LR    1,A
```

```
12D7 79            0163 C0         LIS    9         TEST IF DONE WITH
                   0164 *                           1ST 8 BITS
12D8 E3            0165            XS     3
                   0166 *                           COMPLETING 1ST BYTE
12D9 9406    12E0  0167            BNZ    C1
12DB 41            0168            LR     A,1
12DC 50            0169            LR     0,A
12DD 33            0170            DS     3
12DE 90EA    12C9  0171            BR     C2        JUMP TO PROCESS
                   0172 *                           NEXT BIT
12E0 33            0173 C1         DS     3
12E1 94E7    12C9  0174            BNZ    C2
12E3 A4            0175            INS    4         LEAVE IN STANBY
                   0176 *                           MODE
12E4 2170          0177            NI     H'70'     SET C1,C2,C3 TO (111)
12E6 B4            0178            OUTS   4
12E7 44            0179            LR     A,4       SEND 4-10 USEC CLK
                   0180 *                           PULSE
12E8 1F            0181            INC
12E9 B5            0182            OUTS   5
12EA 44            0183            LR     A,4       RESET CLK
12EB B5            0184            OUTS   5
12EC 1B            0185            EI
12ED 1C            0186            POP
                   0187 *
                   0188 *
                   0189 *
                   0190 **********************************************************
                   0191 *
                   0192 *
                   0193 *        *SWITCH READ PROGRAM*
                   0194 *
                   0195 *
                   0196 *        INST C MAX: 842.5 (1.69 MSEC)
                   0197 *
                   0198 *
                   0199 *
12EE 1A            0200 SWITCH    DI
12EF 08            0201            LR     K,P       LSB --> MSB
12F0 A4            0202            INS    4         R0:  SCAN IN AVG MAX/
                   0203 *                           ROW SELECT/POP SPACING/
                   0204 *                           A/B/C/
12F1 211F          0205            NI     H'1F'     FIELD AREA/TOTAL AREA/
12F3 2420          0206            AI     H'20'     R1: <SELECT>/STEP UP/
                   0207 *                           STEP DOWN/--->SELECT/0</
                   0208 *                           9/
12F5 B4            0209            OUTS   4         ENG-METRIC/SETUP-OPERATE/
                   0210 *                           ON-OFF
                   0211 *                           R2:  DELAY COUNTER  R3:
                   0212 *                           LOOP COUNTER
                   0213 *                           STRB TO LATCH PUSH-SWITCH
                   0214 *                           IN SHIFT REGISTERS
                   0215 *                           (X OR RESULTS IN R2 R3)
12F6 215F          0216            NI     H'5F'
12F8 B4            0217            OUTS   4         STRB RESET
12F9 1B            0218            EI
12FA 70            0219            CLR              SETUP FOR DATA LOOP
                   0220 *                           TRANSFER
12FB 50            0221            LR     0,A
12FC 51            0222            LR     1,A
12FD 2010          0223            LI     H'10'
12FF 53            0224            LR     3,A
1300 A4            0225 D6         INS    4         DATA TRANSFER LOOP
1301 2180          0226            NI     H'80'
1303 C1            0227            AS     1         DATA BIT SET OR RESET
1304 51            0228            LR     1,A
1305 79            0229            LIS    9         TEST IF DONE WITH 1ST
                   0230 *                           BYTE
1306 E3            0231            XS     3
1307 9403    130B  0232            BNZ    D2        JUMP IF NOT JUST DONE
                   0233 *                           WITH 1ST BYTE
1309 41            0234            LR     A,1       TRANSFER 1ST BYTE TO R0
130A 50            0235            LR     0,A
130B 33            0236 D2         DS     3
130C 8411    131E  0237            BZ     D3        JUMP IF THROUGH ALL 16
                   0238 *                           SWITCHES
```

```
130E 41           0239           LR     A,1
130F 12           0240           SR     1
1310 51           0241           LR     1,A
1311 1A           0242           DI
1312 A4           0243           INS    4          SEND "LOAD" SHIFT PULSE
1313 211F         0244           NI     H'1F'
1315 2440         0245           AI     H'40'      SET "LOAD"
1317 B4           0246           OUTS   4
1318 211F         0247           NI     H'1F'      RESET "LOAD"
131A B4           0248           OUTS   4
131B 1B           0249           EI
131C 90E3   1300  0250           BR     D6
131E 2A197E 197E  0251    D3     DCI    H'197E'    X-OR PRESENT WITH PAST-
                  0252    *                        RESULT IN R2 R3
1321 40           0253           LR     A,0
1322 8C           0254           XM
1323 F0           0255           NS     0          ELIMINATE RESET TRANS-
                  0256    *                        ITIONS
1324 52           0257           LR     2,A
1325 41           0258           LR     A,1
1326 8C           0259           XM
1327 F1           0260           NS     1
1328 53           0261           LR     3,A
1329 2A197E 197E  0262           DCI    H'197E'    PAST SWITCH STATUS EX-
                  0263    *                        CHANGED WITH PRESENT
132C 40           0264           LR     A,0        SWITCH STATUS
132D 17           0265           ST
132E 41           0266           LR     A,1
132F 17           0267           ST
1330 1A           0268           DI
1331 09           0269           LR     P,K
1332 1B           0270           EI
1333 1C           0271           POP
                  0272    *
                  0273    *
                  0274    *
                  0275    ****************************************************
                  0276    *
                  0277    *
                  0278    *      *  EAROM ERASE PROGRAM  *
                  0279    *
                  0280    *         INST C: 80032.5 (160 MSEC)
                  0281    *
                  0282    *
                  0283    *
1334 1A           0284   ERASE   DI
1335 08           0285           LR     K,P
                  0286    *                        R0,R1: MSB & LSB DATA
                  0287    *                        R2:    ADDRESS
                  0288    *                        R3:    LOOP COUNTER
                  0289    *                        R4:    LOOP COUNTER
                  0290    *                        R5:    TEMP STO. REGISTER
1336 A4           0291           INS    4          PRESENT "SETUP" FOR 1
                  0292    *                        CLK PULSE
1337 2170         0293           NI     H'70'
1339 240E         0294           AI     H'0E'
133B B4           0295           OUTS   4
133C A5           0296           INS    5          SEND 4-10 SEC CLK PULSE
133D 55           0297           LR     5,A
133E 1F           0298           INC
133F B5           0299           OUTS   5
1340 45           0300           LR     A,5        RESET CLK
1341 B5           0301           OUTS   5
1342 A4           0302           INS    4          PRESENT "ERASE" FOR 450
                  0303    *                        MSEC
1343 2170         0304           NI     H'70'      SET C1 C2 C3 FOR "ERASE"
                  0305    *                        (001)
1345 2406         0306           AI     H'06'
1347 B4           0307           OUTS   4
1348 70           0308           CLR               150 MSEC DELAY
1349 53           0309           LR     3,A
134A 7D           0310           LIS    H'D'
134B 54           0311           LR     4,A
134C 1A           0312    E0     DI               SEND 4-10 SEC CLK PULSE
134D A5           0313           INS    5
```

```
134E  55           0314        LR    5,A
134F  1F           0315        INC
1350  B5           0316        OUTS  5
1351  45           0317        LR    A,5
1352  B5           0318        OUTS  5
1353  1B           0319        EI
1354  33           0320        DS    3
1355  94F6   134C  0321        BNZ   E0
1357  34           0322        DS    4
1358  94F3  ·134C  0323        BNZ   E0
135A  1A           0324        DI
135B  A4           0325        INS   4
135C  2170         0326        NI    H'70'
135E  240E         0327        AI    H'0E'
1360  B4           0328        OUTS  4
1361  A5           0329        INS   5          PRESENT "SETUP" FOR 1
             0330  *                            CLK PULSE
1362  55           0331        LR    5,A
1363  1F           0332        INC
1364  B5           0333        OUTS  5
1365  45           0334        LR    A,5        RESET CLK
1366  B5           0335        OUTS  5
1367  A4           0336        INS   4          LEAVE IN "STANDBY" MODE
1368  2170         0337        NI    H'70'      SET C1 C2 C3 TO "STANDBY"
             0338  *                            (111)
136A  B4           0339        OUTS  4
136B  45           0340        LR    A,5        SEND 4-10 SEC CLK PULSE
136C  1F           0341        INC
136D  B5           0342        OUTS  5
136E  45           0343        LR    A,5        RESET CLK
136F  B5           0344        OUTS  5
1370  09           0345        LR    P,K
1371  1B           0346        EI
1372  1C           0347        POP
             0348  *
             0349  *
             0350  *
             0351  ***************************************************
             0352  *    *    EAROM WRITE PROGRAM    *
             0353  *
             0354  *
             0355  *         INST C: 1808 (3.62 MSEC)
             0356  *
             0357  *
             0358  *
             0359  *
             0360  *
             0361  *                             R0:  MSB DATA
1373  1A           0362  WRITE DI                R1:  LSB DATA
1374  08           0363        LR    K,P        R2:  ADDRESS
1375  00           0364        LR    A,KU       R3:  LOOP COUNTER
1376  55           0365        LR    5,A        R4:  TEMP STO REGISTER
1377  01           0366        LR    A,KL       R5:  KU
1378  56           0367        LR    6,A        R6:  KL
1379  A5           0368        INS   5          R7:  PORT 5 STORAGE
137A  57           0369        LR    7,A
137B  2010         0370        LI    H'10'      PREPARE TO SHIFT IN DATA
             0371  *                            (16 BITS)
137D  53           0372        LR    3,A
137E  A4           0373        INS   4          SET C1 C2 C3 FOR SERIAL
             0374  *                            DATA IN (101)
137F  2170         0375        NI    H'70'
1381  2404         0376        AI    H'04'
1383  B4           0377        OUTS  4
1384  A4           0378  F2    INS   4          "SERIAL DATA IN" LOOP
1385  217E         0379        NI    H'7E'      RESET I/O FOR NEW DATA
             0380  *                            BIT
1387  54           0381        LR    4,A
1388  40           0382        LR    A,0        TEST FOR MSB
1389  19           0383        LNK
138A  44           0384        LR    A,4
138B  8102   138E  0385        BP    F0         JUMP IF DATA BIT = 0
138D  1F           0386        INC              SET I/O IF DATA BIT = 1
138E  B4           0387  F0    OUTS  4
138F  40           0388        LR    A,0        SETUP FOR NEXT DATA BIT
1390  13           0389        SL    1
```

```
1391 50          0390          LR    0,A       SETUP FOR NEXT DATA BIT
1392 47          0391          LR    A,7       SEND 4-10 SEC CLK PULSE
1393 1F          0392          INC
1394 B5          0393          OUTS  5
1395 47          0394          LR    A,7
1396 B5          0395          OUTS  5
1397 79          0396          LIS   9         TEST IF JUST DONE WITH
                 0397 *                        1ST BYTE
1398 E3          0398          XS    3
1399 9403  139D  0399          BNZ   F1        JUMP IF NOT JUST
                 0400 *                        COMPLETING 1ST BYTE
139B 41          0401          LR    A,1       PUT R1 IN R0 FOR 2ND
                 0402 *                        BYTE TRANSFER
139C 50          0403          LR    0,A
139D 33          0404  F1      DS    3
139E 94E5  1384  0405          BNZ   F2        JUMP IF 16 BIT DATA NOT
                 0406 *                        ALL SHIFTED IN
13A0 A4          0407          INS   4         PRESENT "SETUP" FOR 1
                 0408 *                        CLK PULSE
13A1 2170        0409          NI    H'70'     SET C1 C2 C3 FOR "SETUP"
                 0410 *                        (000)
13A3 240E        0411          AI    H'0E'
13A5 B4          0412          OUTS  4
13A6 47          0413          LR    A,7       SEND 4-10 SEC CLK PULSE
13A7 1F          0414          INC
13A8 B5          0415          OUTS  5
13A9 47          0416          LR    A,7       RESET CLK
13AA B5          0417          OUTS  5
13AB A4          0418          INS   4         PRESENT "WRITE" FOR 6
                 0419 *                        MSEC
13AC 2170        0420          NI    H'70'     SET C1 C2 C3 FOR "WRITE"
                 0421 *                        (010)
13AE 240A        0422          AI    H'0A'
13B0 B4          0423          OUTS  4
13B1 202A        0424          LI    H'2A'     2 MSEC DELAY
13B3 53          0425          LR    3,A
13B4 1A          0426  F3      DI              SEND 4-10 SEC CLK PULSE
13B5 A5          0427          INS   5
13B6 57          0428          LR    7,A
13B7 1F          0429          INC
13B8 B5          0430          OUTS  5
13B9 47          0431          LR    A,7       RESET CLK
13BA B5          0432          OUTS  5
13BB 1B          0433          EI
13BC 33          0434          DS    3
13BD 94F6  13B4  0435          BNZ   F3
13BF 1A          0436          DI
13C0 A4          0437          INS   4         LEAVE IN "STANDBY" MODE
13C1 2170        0438          NI    H'70'     SET C1 C2 C3 TO "STANDBY"
                 0439 *                        (111)
13C3 B4          0440          OUTS  4
13C4 A5          0441          INS   5         SEND 4-10 SEC CLK PULSE
13C5 57          0442          LR    7,A
13C6 1F          0443          INC
13C7 B5          0444          OUTS  5
13C8 47          0445          LR    A,7       RESET CLK
13C9 B5          0446          OUTS  5
13CA 46          0447          LR    A,6
13CB 05          0448          LR    KL,A
13CC 45          0449          LR    A,5
13CD 04          0450          LR    KU,A
13CE 09          0451          LR    P,K
13CF 1B          0452          EI
13D0 1C          0453          POP
                 0454 *
                 0455 *
                 0456 *
                 0457 *
                 0458 *****************************************************
                 0459 *
                 0460 *
                 0461 *        INST C: 89 (.178 MSEC)
                 0462 *
                 0463 *
```

```
                    0464    *    * ACK CHIP READ C1-C0 PROGRAM   *
                    0465    *                    R0:  ADDRESS LOCATION &
                    0466    *                         RESET INFO
                    0467    *                    R1:  ACK IDENTITY 1-16/
                    0468    *                         H'20'  17-32/H'04'
                    0469    *                    R2:  C1
                    0470    *                    R3:  C0
13D1  1A            0471    SUBACK  DI
13D2  40            0472            LR      A,0         SEND OUT REGISTER CODE
13D3  B0            0473            OUTS    0
13D4  41            0474            LR      A,1         ACK INTERRUPT IDENTITY
13D5  B1            0475            OUTS    1
13D6  A1            0476    G0      INS     1           WAIT FOR STROBE
13D7  81FE   13D6   0477            BP      G0
13D9  A1            0478    G0A     INS     1
13DA  91FE   13D9   0479            BM      G0A         WAIT FOR STB TO RETURN HI
13DC  70            0480            CLR
13DD  B0            0481            OUTS    0
13DE  A0            0482            INS     0           READ DATA C1
13DF  52            0483            LR      2,A
13E0  70            0484            CLR                 CLR INT./ FOR C0 ENTRY
13E1  B1            0485            OUTS    1
13E2  A1            0486    G1      INS     1           WAIT FOR STROBE
13E3  81FE   13E2   0487            BP      G1
13E5  A1            0488    G1A     INS     1
13E6  91FE   13E5   0489            BM      G1A
13E8  A0            0490            INS     0           READ DATA
13E9  53            0491            LR      3,A
13EA  41            0492            LR      A,1         SEND CLR INT.
13EB  B1            0493            OUTS    1
13EC  A1            0494    G2      INS     1           WAIT FOR STROBE
13ED  81FE   13EC   0495            BP      G2
13EF  70            0496            CLR                 CLEAR INT.
13F0  B1            0497            OUTS    1
13F1  1B            0498            EI
13F2  1C            0499            POP
                    0500    *
                    0501    *
                    0502    *
                    0503    ********************************************************
                    0504    *
                    0505    *
                    0506    *       * SUBTRACTION SETUP ROUTINE  *
                    0507    *
                    0508    *
                    0509    *
13F3  1A            0510    SUBSET  DI
13F4  67            0511            LISU    7           R2 --> R72   0 --> R70
13F5  6B            0512            LISL    3           R3 --> R73   0 --> R71
13F6  43            0513            LR      A,3         DC --> R62   0 --> R60
13F7  5E            0514            LR      D,A         DC+1-->R63   0 -->R61
13F8  42            0515            LR      A,2
13F9  5E            0516            LR      D,A
13FA  70            0517            CLR
13FB  5E            0518            LR      D,A
13FC  5C            0519            LR      S,A
13FD  66            0520            LISU    6
13FE  5D            0521            LR      I,A
13FF  5D            0522            LR      I,A
1400  16            0523            LM
1401  5D            0524            LR      I,A
1402  16            0525            LM
1403  5E            0526            LR      D,A
1404  1B            0527            EI
1405  1C            0528            POP
                    0529    *
                    0530    *
                    0531    *
                    0532    ********************************************************
                    0533    *
                    0534    *
                    0535    *       * BINARY TO DECIMAL CONVERSION *
                    0536    *
                    0537    *
                    0538    *
```

```
1406 1A            0539  SUBDEC  DI
1407 20F0          0540          LI    H'F0'     TEST IF OVER 10,000
1409 C1            0541          AS    1
140A 20D8          0542          LI    H'D8'
140C 19            0543          LNK
140D C0            0544          AS    0
140E 9204  1413    0545          BNC   I0
1410 70            0546          CLR
1411 50            0547          LR    0,A
1412 51            0548          LR    1,A
1413 0E            0549  I0      LR    Q,DC
1414 2A144B 144B   0550          DCI   CONVER
1417 11            0551          LR    H,DC
1418 64            0552          LISU  4         R2 R3 MSB LSB DECIMAL #
1419 6B            0553          LISL  3
141A 70            0554          CLR
141B 5E            0555          LR    D,A
141C 5E            0556          LR    D,A
141D 5E            0557          LR    D,A
141E 5C            0558          LR    S,A
141F 73            0559          LIS   3         R4 TEMP STORAGE
1420 54            0560          LR    4,A       R70-73 TEMP STORAGE
1421 11            0561  CONV3   LR    H,DC
1422 70            0562          CLR
1423 5C            0563          LR    S,A       H REGS & DC0 USED
1424 40            0564  CONV2   LR    A,0
1425 52            0565          LR    2,A
1426 41            0566          LR    A,1       CONVERTS TO DECIMAL BY
1427 53            0567          LR    3,A       SUBTRACTING 1000 THEN 100
1428 88            0568          AM              THEN 10 &  THE REMAINDER
1429 51            0569          LR    1,A       IS IN R3
142A 40            0570          LR    A,0
142B 19            0571          LNK
142C 88            0572          AM
142D 50            0573          LR    0,A
142E 9207  1436    0574          BNC   CONV1     JMP IF DONE WITH DIGIT
1430 71            0575          LIS   1
1431 CC            0576          AS    S
1432 5C            0577          LR    S,A
1433 10            0578          LR    DC,H
1434 90EF  1424    0579          BR    CONV2
1436 4D            0580  CONV1   LR    A,I       INC ISAR
1437 42            0581          LR    A,2
1438 50            0582          LR    0,A
1439 43            0583          LR    A,3
143A 51            0584          LR    1,A
143B 34            0585          DS    4
143C 94E4  1421    0586          BNZ   CONV3
143E 5C            0587          LR    S,A       PUT LSB IN R43
143F 68            0588          LISL  0
1440 4D            0589          LR    A,I
1441 15            0590          SL    4         CONVERT 4 -- 4 BITS
1442 CD            0591          AS    I         INTO 2 -- 8 BIT
1443 52            0592          LR    2,A
1444 4D            0593          LR    A,I
1445 15            0594          SL    4
1446 C3            0595          AS    3
1447 53            0596          LR    3,A
1448 0F            0597          LR    DC,Q
1449 1B            0598          EI
144A 1C            0599          POP
144B 18FC9C        0600  CONVER  DC    H'18FC9CFFF6FF'
              0601  *
              0602  *
              0603  *
              0604  ****************************************
              0605  *
              0606  *
              0607  *      * DIGIT ADVANCE PROGRAM *
              0608  *
              0609  *
1451 1A            0610  SUBINC  DI              R0 R1 : BINARY #
1452 08            0611          LR    K,P       R2 R3 : BCD # (MSD - LSD)
1453 1B            0612          EI              R40-R43: BINARY #
              0613  *                            (XXXXMSD-XXXXLSD)
```

```
1454 16           0614        LM              R4 USED
1455 51           0615        LR    1,A       R6 EAROM ADDRESS
1456 16           0616        LM              R56 CURSOR
1457 50           0617        LR    0,A       DC0 POINTING TO BINARY #
1458 281406 1406  0618        PI    SUBDEC    BINARY --> BCD IN R2 R3
                  0619   *                    & R40 - R43
145B 65           0620        LISU  5         CURSOR TO R0
145C 6E           0621        LISL  6
145D 4C           0622        LR    A,S
145E 1F           0623        INC
145F 50           0624        LR    0,A
1460 64           0625        LISU  4
1461 6C           0626        LISL  4
1462 4E           0627   J0   LR    A,D
1463 30           0628        DS    0
1464 94FD    1462 0629        BNZ   J0
1466 4C           0630        LR    A,S
1467 1F           0631        INC
1468 2509         0632        CI    H'09'
146A 8202    146D 0633        BC    J1
146C 70           0634        LIS   0
146D 5C           0635   J1   LR    S,A       R40-R43 APPOPIATELY INC'D
146E 67           0636        LISU  7         CLR SUM REGISTER Z
146F 6B           0637        LISL  3
1470 70           0638        CLR
1471 5E           0639   J2   LR    D,A
1472 8FFE    1471 0640        BR7   J2
1474 66           0641        LISU  6
1475 6B           0642        LISL  3
1476 5E           0643   J3   LR    D,A
1477 8FFE    1476 0644        BR7   J3
1479 2C           0645        XDC             SAVE EXISTING DC0
147A 2A1776 1776  0646        DCI   TBL2
147D 64           0647        LISU  4
147E 6B           0648        LISL  3
147F 70           0649   J6   CLR
1480 CC           0650        AS    S
1481 8414    1496 0651        BZ    J4        JUMP IF SELECTED BCD PLACE
                  0652   *                    = 0
1483 0A           0653   J5   LR    A,IS
1484 54           0654        LR    4,A
1485 66           0655        LISU  6
1486 6A           0656        LISL  2
1487 16           0657        LM
1488 5D           0658        LR    I,A
1489 16           0659        LM
148A 5D           0660        LR    I,A
148B 28151E 151E  0661        PI    SUBPLS    ADD BINARY EQUIV IF
                  0662   *                    SELECTED BCD PLACE =/ 0
148E 20FE         0663        LI    H'FE'
1490 8E           0664        ADC
1491 44           0665        LR    A,4
1492 0B           0666        LR    IS,A
1493 3C           0667        DS    S
1494 94EE    1483 0668        BNZ   J5        JUMP IF BCD PLACE =/ 0
1496 16           0669   J4   LM              DUMMY TO INC DC0
1497 16           0670        LM
1498 4E           0671        LR    A,D       DUMMY TO DEC ISAR
1499 8FE5    147F 0672        BR7   J6        JUMP IF NOT THROUGH ALL
                  0673   *                    4 DIGITS
149B 67           0674        LISU  7         R72 R73 --> R0 R1
149C 6A           0675        LISL  2
149D 4D           0676        LR    A,I
149E 50           0677        LR    0,A
149F 4D           0678        LR    A,I
14A0 51           0679        LR    1,A
14A1 2C           0680        XDC             RESORE NEW # IN RAM
14A2 20FE         0681        LI    H'FE'
14A4 8E           0682        ADC
14A5 41           0683        LR    A,1
14A6 17           0684        ST
14A7 40           0685        LR    A,0
14A8 17           0686        ST
14A9 1A           0687        DI
14AA 09           0688        LR    P,K
```

```
14AB 1B         0689              EI
14AC 1C         0690              POP
                0691    *
                0692    *
                0693    *
                0694    ***********************************************
                0695    *
                0696    *
                0697    *
                0698    *  INITIAL SETTING OF ROW ON/OFF FLAGS NO. ROWS *
                0699    *
                0700    *
                0701    *
14AD 1A         0702    SUBOFF    DI
14AE 2A1962 1962 0703             DCI   H'1962'    NO. ROWS
14B1 16         0704              LM
14B2 1F         0705              INC
14B3 53         0706              LR    3,A
14B4 2A195C 195C 0707             DCI   H'195C'    ROW ON/OFF FLAG ADDRESS
14B7 78         0708              LIS   8          DO FOR 8 ROWS
14B8 54         0709              LR    4,A
14B9 74         0710              LIS   4          DO FOR 4 BANKS
14BA 55         0711              LR    5,A
14BB 70         0712              CLR
14BC 56         0713              LR    6,A
14BD C6         0714    K3        AS    6          SET OR RESET FLAG
14BE 34         0715              DS    4
14BF 840C 14CC  0716              BZ    K1         JUMP IF THROUGH 8 ROWS
14C1 33         0717              DS    3          TEST IF THROUGH ALL "ON"
                0718    *                          ROWS
14C2 9406 14C9  0719              BNZ   K2         JUMP IF NOT THROUGH ALL
                0720    *                          "ON" ROWS
14C4 2080       0721    K2A       LI    H'80'      SET "OFF" BITS
14C6 56         0722              LR    6,A
14C7 53         0723              LR    3,A        SET HIGH ENOUGH TO
                0724    *                          FINISH REST OF THE ROWS
14C8 70         0725              CLR
14C9 12         0726    K2        SR    1
14CA 90F2 14BD  0727              BR    K3
14CC 17         0728    K1        ST
14CD 78         0729              LIS   8
14CE 54         0730              LR    4,A
14CF 70         0731              CLR
14D0 35         0732              DS    5          TEST IF DONE WITHH ALL
                0733    *                          4 BANKS
14D1 8406 14D8  0734              BZ    OUT        GET OUT IF THRU ALL BANKS
14D3 33         0735              DS    3
14D4 84EF 14C4  0736              BZ    K2A
14D6 90E6 14BD  0737              BR    K3
14D8 1B         0738    OUT       EI
14D9 1C         0739              POP
                0740    *
                0741    *
                0742    *
                0743    ***********************************************
                0744    *
                0745    *
                0746    *   *ROLL OVER CORRECTION FOR ROW COUNTERS*
                0747    *
                0748    *
                0749    *
14DA 1A         0750    SUBROW    DI               R0 R1: BINARY ROW #
                0751    *                          (MSB LSB)
14DB 08         0752              LR    K,P        R2 R3: BCD ROW # (MSB
                0753    *                          LSB)
14DC 00         0754              LR    A,KU       R8 R5: P STORAGE
14DD 58         0755              LR    8,A        R6: MAX ROW
14DE 01         0756              LR    A,KL       DC POINTING TO FINAL
                0757    *                          ROW STO LOCATION
14DF 55         0758              LR    5,A        R7: TEMP BINARY ROW #
                0759    *                          STORAGE
14E0 1B         0760              EI
14E1 41         0761              LR    A,1
14E2 57         0762              LR    7,A
14E3 46         0763              LR    A,6
```

```
14E4 1F           0764           INC
14E5 51           0765           LR    1,A
14E6 281406 1406  0766           PI    SUBDEC
14E9 47           0767           LR    A,7
14EA 51           0768           LR    1,A
14EB 7F           0769           LIS   H'F'        DETERMINE NEXT HIGHER
                  0770  *                          ROW SIZE THAT IS A
14EC F3           0771           NS    3           MULTIPLE OF 10
14ED 18           0772           COM
14EE 240C         0773           AI    H'C'
14F0 C6           0774           AS    6
14F1 52           0775           LR    2,A         R2 SET FOR TOO HIGH 10'S
                  0776  *                          DIGIT CHECK
14F2 72           0777           LIS   2
14F3 C6           0778           AS    6
14F4 53           0779           LR    3,A         R3 SET FOR TOO HIGH 1'S
                  0780  *                          DIGIT CHECK
14F5 42           0781           LR    A,2         TEST FOR TOO HIGH 10'S
                  0782  *                          DIGIT
14F6 18           0783           COM
14F7 1F           0784           INC
14F8 C1           0785           AS    1
14F9 9202   14FC  0786           BNC   L1          JUMP IF ROW # < TOO HIGH
                  0787  *                          10'S DIGIT
14FB 51           0788           LR    1,A
14FC 70           0789  L1       CLR               TEST IF ROW # = 00
14FD E1           0790           XS    1
14FE 9403   1502  0791           BNZ   L2          JUMP IF ROW # =' 00
1500 71           0792           LIS   1
1501 51           0793           LR    1,A         SET ROW # = 1 IF IT WAS
                  0794  *                          00
1502 43           0795  L2       LR    A,3         TEST FOR TOO HIGH 1'S
                  0796  *                          DIGIT
1503 18           0797           COM
1504 1F           0798           INC
1505 C1           0799           AS    1
1506 920C   1513  0800           BNC   L3          JUMP IF ROW # < TOO
                  0801  *                          HIGH 1'S DIGIT
1508 281406 1406  0802           PI    SUBDEC
150B 7F           0803           LIS   H'F'
150C F3           0804           NS    3
150D 18           0805           COM
150E 1F           0806           INC
150F C7           0807           AS    7
1510 51           0808           LR    1,A
1511 90EA   14FC  0809           BR    L1
1513 31           0810  L3       DS    1           CONVERT BACK TO BINARY
                  0811  *                          ROW CODE
1514 41           0812           LR    A,1
1515 17           0813           ST
1516 45           0814           LR    A,5
1517 05           0815           LR    KL,A
1518 48           0816           LR    A,8
1519 04           0817           LR    KU,A
151A 1A           0818           DI
151B 09           0819           LR    P,K
151C 1B           0820           EI
151D 1C           0821           POP
                  0822  *
                  0823  *
                  0824  *
                  0825  *
                  0826  *************************************************
                  0827  *
                  0828  *
                  0829  *       ADDITION ROUTINE
                  0830  *
                  0831  *       INST C: 82 (.164 MSEC)
                  0832  *
                  0833  *
                  0834  *
                  0835  *
151E 1A           0836  SUBPLS   DI               ADD Z+Y --> Z
151F 18           0837           COM              Y=R60-63  Z=R70-73
1520 6B           0838           LISL  3
```

```
1521 66              0839  N1      LISU    6
1522 4C              0840          LR      A,S
1523 19              0841          LNK
1524 1E              0842          LR      J,W
1525 67              0843          LISU    7
1526 CC              0844          AS      S
1527 5E              0845          LR      D,A
1528 49              0846          LR      A,9
1529 1E              0847          LR      J,W
152A E9              0848          XS      9
152B 59              0849          LR      9,A
152C 1D              0850          LR      W,J
152D 8FF3   1521     0851          BR7     N1        JUMP IF ADDITION NOT
                     0852  *                         DONE
152F 1B              0853          EI
1530 1C              0854          POP
                     0855  *
                     0856  *
                     0857  *
                     0858  *****************************************************
                     0859  *
                     0860  *       SUBTRACTION ROUTINE
                     0861  *
                     0862  *
                     0863  *       INST C: 90.5 (.181 MSEC)
                     0864  *
                     0865  *
1531 1A              0866  SUBMIN  DI                SUBTRACK Z-Y-->Z
1532 72              0867          LIS     2         Z=R70-73  Y=R60-63
1533 59              0868          LR      9,A
1534 1D              0869          LR      W,J
1535 6B              0870          LISL    3
1536 67              0871  P2      LISU    7
1537 4C              0872          LR      A,S
1538 19              0873          LNK
1539 58              0874          LR      8,A
153A 1E              0875          LR      J,W
153B 66              0876          LISU    6
153C 4C              0877          LR      A,S
153D 18              0878          COM
153E C8              0879          AS      8
153F 67              0880          LISU    7
1540 5E              0881          LR      D,A
1541 8202   1544     0882          BC      P1
1543 1D              0883          LR      W,J
1544 8FF1   1536     0884  P1      BR7     P2        JUMP IF SUBTRACTION NOT
                     0885  *                         DONE
1546 1B              0886          EI
1547 1C              0887          POP
                     0888  *
                     0889  *
                     0890  *
                     0891  *****************************************************
                     0892  *
                     0893  *
                     0894  *       MULTIPLICATION ROUTINE
                     0895  *
                     0896  *       INST C MIN: 929 (1.858 MSEC)
                     0897  *       INST C MAX: 2395 (4.79 MSEC)
                     0898  *
                     0899  *
1548 1A              0900  SUBMUL  DI
1549 08              0901          LR      K,P       MULTIPLY XY=Z (R0 & R1
154A 1B              0902          EI                USED)
154B 2010            0903          LI      H'10'     X=R52-53  Y=R62-63  Z=
                     0904  *                         R70-73
154D 50              0905          LR      0,A       CYCLE COUNTER --> 16 BITS
154E 65              0906          LISU    5
154F 69              0907          LISL    1
1550 70              0908          CLR
1551 5E              0909          LR      D,A
1552 5C              0910          LR      S,A       R50-51 RESET
1553 67              0911          LISU    7
1554 6B              0912          LISL    3
1555 5E              0913  Q1      LR      D,A
```

```
1556 8FFE   1555 0914        BR7    Q1          Z (RESULT COUNTER) RESET
1558 66          0915   Q8   LISU   6
1559 6A          0916        LISL   2
155A 70          0917        LIS    0
155B CD          0918        AS     I
155C 8112   156F 0919        BP     Q2
155E 18          0920        COM                INITIALLY CLEAR CARRY
                 0921   *                       STATUS
155F 65          0922   Q3   LISU   5           X+Z --> Z
1560 4C          0923        LR     A,S
1561 67          0924        LISU   7
1562 19          0925        LNK
1563 1A          0926        DI
1564 1E          0927        LR     J,W
1565 CC          0928        AS     S
1566 5E          0929        LR     D,A
1567 49          0930        LR     A,9
1568 1E          0931        LR     J,W
1569 E9          0932        XS     9
156A 59          0933        LR     9,A
156B 1D          0934        LR     W,J
156C 1B          0935        EI
156D 8FF1   155F 0936        BR7    Q3          X+Z --> Z
156F 30          0937   Q2   DS     0
1570 8427   1598 0938        BZ     Q4          JUMP IF DONE
1572 73          0939        LIS    3           SHIFT Z LEFT ONE
1573 51          0940        LR     1,A
1574 67          0941        LISU   7
1575 68          0942        LISL   0
1576 4C          0943   Q6   LR     A,S
1577 13          0944        SL     1
1578 5D          0945        LR     I,A
1579 70          0946        LIS    0
157A CC          0947        AS     S
157B 8105   1581 0948        BP     Q5
157D 5E          0949        LR     D,A          DUMMY TO DECREMENT ISAR
157E 71          0950        LIS    1
157F CC          0951        AS     S
1580 5D          0952        LR     I,A
1581 31          0953   Q5   DS     1
1582 94F3   1576 0954        BNZ    Q6
1584 4C          0955        LR     A,S
1585 13          0956        SL     1
1586 5E          0957        LR     D,A
1587 66          0958        LISU   6           SHIFT Y LEFT ONE
1588 4C          0959        LR     A,S
1589 13          0960        SL     1
158A 5D          0961        LR     I,A
158B 70          0962        LIS    0
158C CC          0963        AS     S
158D 8105   1593 0964        BP     Q7
158F 5E          0965        LR     D,A          DUMMY TO DECREMENT ISAR
1590 71          0966        LIS    1
1591 CC          0967        AS     S
1592 5D          0968        LR     I,A
1593 4C          0969   Q7   LR     A,S
1594 13          0970        SL     1
1595 5C          0971        LR     S,A
1596 90C1   1558 0972        BR     Q8
1598 1A          0973   Q4   DI
1599 09          0974        LR     P,K
159A 1B          0975        EI
159B 1C          0976        POP
                 0977   *
                 0978   *
                 0979   *
                 0980   ******************************************************
                 0981   *
                 0982   *
                 0983   *    DIVISION ROUTINE
                 0984   *
159C 1A          0985  SUBDIV DI
159D 08          0986        LR     K,P          DIVIDE Z/Y=X (R8 & R1
159E 1B          0987        EI                  USED)
159F 2010        0988        LI     H'10'        X=R52-R53
```

| | | | | | |
|---|---|---|---|---|---|
| 15A1 | 58 | | 0989 | | LR 8,A | Z=R70-R73 |
| 15A2 | 65 | | 0990 | | LISU 5 | R0 CYCLE COUNTER --> 16 BITS |
| | | | 0991 | * | | |
| 15A3 | 6A | | 0992 | | LISL 2 | |
| 15A4 | 70 | | 0993 | | CLR | |
| 15A5 | 5D | | 0994 | | LR I,A | |
| 15A6 | 5C | | 0995 | | LR S,A | |
| 15A7 | 66 | | 0996 | | LISU 6 | |
| 15A8 | 5E | | 0997 | | LR D,A | |
| 15A9 | 5C | | 0998 | | LR S,A | R52-53 & R62-63 RESET |
| 15AA | 65 | | 0999 | R8 | LISU 5 | SHIFT X LEFT 1 |
| 15AB | 6A | | 1000 | | LISL 2 | |
| 15AC | 4C | | 1001 | | LR A,S | |
| 15AD | 13 | | 1002 | | SL 1 | |
| 15AE | 5D | | 1003 | | LR I,A | |
| 15AF | 70 | | 1004 | | CLR | |
| 15B0 | CC | | 1005 | | AS S | |
| 15B1 | 8105 | 15B7 | 1006 | | BP R1 | |
| 15B3 | 5E | | 1007 | | LR D,A | DUMMY TO DECREMENT ISAR |
| 15B4 | 71 | | 1008 | | LIS 1 | |
| 15B5 | CC | | 1009 | | AS S | |
| 15B6 | 5D | | 1010 | | LR I,A | |
| 15B7 | 4C | | 1011 | R1 | LR A,S | |
| 15B8 | 13 | | 1012 | | SL 1 | |
| 15B9 | 5C | | 1013 | | LR S,A | |
| 15BA | 66 | | 1014 | | LISU 6 | SHIFT Y RIGHT 1 |
| 15BB | 4C | | 1015 | R3 | LR A,S | |
| 15BC | 12 | | 1016 | | SR 1 | |
| 15BD | 5E | | 1017 | | LR D,A | |
| 15BE | 8F3B | 15FA | 1018 | | BR7 R2 | JUMP IF SHIFT DONE Z-Y --> Z |
| 15C0 | 72 | | 1019 | | LIS 2 | |
| 15C1 | 1A | | 1020 | | DI | |
| 15C2 | 59 | | 1021 | | LR 9,A | |
| 15C3 | 1D | | 1022 | | LR W,J | CARRY INITIALLY SET |
| 15C4 | 1B | | 1023 | | EI | |
| 15C5 | 6B | | 1024 | | LISL 3 | |
| 15C6 | 67 | | 1025 | R5 | LISU 7 | |
| 15C7 | 4C | | 1026 | | LR A,S | |
| 15C8 | 19 | | 1027 | | LNK | |
| 15C9 | 51 | | 1028 | | LR 1,A | |
| 15CA | 1A | | 1029 | | DI | |
| 15CB | 1E | | 1030 | | LR J,W | |
| 15CC | 66 | | 1031 | | LISU 6 | |
| 15CD | 4C | | 1032 | | LR A,S | |
| 15CE | 18 | | 1033 | | COM | |
| 15CF | C1 | | 1034 | | AS 1 | |
| 15D0 | 67 | | 1035 | | LISU 7 | |
| 15D1 | 5E | | 1036 | | LR D,A | |
| 15D2 | 8202 | 15D5 | 1037 | | BC R4 | |
| 15D4 | 1D | | 1038 | | LR W,J | |
| 15D5 | 1B | | 1039 | R4 | EI | |
| 15D6 | 8FEF | 15C6 | 1040 | | BR7 R5 | JUMP IF SUBTRACTION NOT DONE |
| | | | 1041 | * | | |
| 15D8 | 821A | 15F3 | 1042 | | BC R6 | JUMP IF Z>0 Z+Y --> Z |
| 15DA | 18 | | 1043 | | COM | |
| 15DB | 6E | | 1044 | | LISL 6 | |
| 15DC | 66 | | 1045 | R7 | LISU 6 | |
| 15DD | 4C | | 1046 | | LR A,S | |
| 15DE | 19 | | 1047 | | LNK | |
| 15DF | 1A | | 1048 | | DI | |
| 15E0 | 1E | | 1049 | | LR J,W | |
| 15E1 | 67 | | 1050 | | LISU 7 | |
| 15E2 | CC | | 1051 | | AS S | |
| 15E3 | 5E | | 1052 | | LR D,A | |
| 15E4 | 49 | | 1053 | | LR A,9 | |
| 15E5 | 1E | | 1054 | | LR J,W | |
| 15E6 | E9 | | 1055 | | XS 9 | |
| 15E7 | 59 | | 1056 | | LR 9,A | |
| 15E8 | 1D | | 1057 | | LR W,J | |
| 15E9 | 1B | | 1058 | | EI | |
| 15EA | 8FF1 | 15DC | 1059 | | BR7 R7 | JUMP IF ADDITION NOT DONE |
| 15EC | 38 | | 1060 | R9 | DS 8 | |
| 15ED | 94BC | 15AA | 1061 | | BNZ R8 | JUMP IF ALL 16 DIGITS NOT DONE |
| | | | 1062 | * | | |
| 15EF | 1A | | 1063 | | DI | |

```
15F0 09              1064        LR    P,K
15F1 1B              1065        EI
15F2 1C              1066        POP
15F3 65              1067   R6   LISU  5
15F4 6B              1068        LISL  3
15F5 71              1069        LIS   1
15F6 CC              1070        AS    S
15F7 5E              1071        LR    D,A
15F8 90F3   15EC     1072        BR    R9
15FA 71              1073   R2   LIS   1           TEST FOR TRANSFER BIT
15FB FC              1074        NS    S
15FC 84BE   15BB     1075        BZ    R3          JUMP IF TRANS BIT NOT SET
15FE FD              1076        NS    I           DUMMY TO INC ISAR
15FF 2080            1077        LI    H'80'
1601 CC              1078        AS    S
1602 5E              1079        LR    D,A
1603 90B7   15BB     1080        BR    R3
                     1081   *
                     1082   *
                     1083   *
                     1084   ****************************************************
                     1085   *
                     1086   *          FAILED ROUTINE
                     1087   *
1605 1A              1088   FAILED DI
1606 08              1089        LR    K,P
1607 00              1090        LR    A,KU
1608 51              1091        LR    1,A
1609 01              1092        LR    A,KL
160A 52              1093        LR    2,A
160B 1B              1094        EI
160C 6C              1095        LISL  4
160D 2A197A 197A     1096        DCI   H'197A'     CHECK IF ANY ROW FAILURES
1610 16              1097        LM
1611 88              1098        AM                R2:  KL
1612 19              1099        LNK               R4:  BANK #
1613 88              1100        AM                R5:  INTERBANK ROW #
1614 19              1101        LNK
1615 88              1102        AM
1616 19              1103        LNK
1617 20BF            1104        LI    H'BF'
1619 940A   1624     1105        BNZ   S0          JUMP IF ROW FAILURE EXIST
161B FC              1106        NS    S           RESET "FAILED" FLASH BIT
161C 5C              1107        LR    S,A
161D 6F              1108        LISL  7
161E 20EF            1109        LI    H'EF'
1620 FC              1110        NS    S
1621 5C              1111        LR    S,A
1622 9021   1644     1112        BR    S1          JUMP TO EXIT SUBROUTINE
1624 FC              1113   S0   NS    S
1625 2240            1114        OI    H'40'       SET "FAILED" FLASH BIT
1627 5C              1115        LR    S,A
1628 2A1981 1981     1116        DCI   H'1981'     RETRIEVE PRESENT ROW #
162B 16              1117        LM
162C 50              1118        LR    0,A         R0:  ROW #
162D 71              1119   S3   LIS   1           INCREMENT TO NEXT ROW
162E C0              1120        AS    0
162F 50              1121        LR    0,A
1630 20E0            1122        LI    H'E0'       TEST IF ROW # > 32
1632 C0              1123        AS    0
1633 9203   1637     1124        BNC   S2          JUMP IF ROW # < 32
1635 70              1125        LIS   0           START OVER WITH ROW 1
1636 50              1126        LR    0,A
1637 2A197A 197A     1127   S2   DCI   H'197A'     ROW FAILURE FLAG BANK
163A 281724 1724     1128        PI    ONOFF
163D 84EF   162D     1129        BZ    S3          JUMP TO PROCESS NEXT ROW
163F 2A1981 1981     1130        DCI   H'1981'     ROW # FAILURE FOUND
1642 40              1131        LR    A,0
1643 17              1132        ST                NEW ROW # STORED FOR
                     1133   *                      DISPLAY
1644 1A              1134   S1   DI
1645 41              1135        LR    A,1
1646 04              1136        LR    KU,A
1647 42              1137        LR    A,2
1648 05              1138        LR    KL,A
1649 09              1139        LR    P,K
```

```
164A 1B           1140           EI
164B 1C           1141           POP
                  1142    *
                  1143    *
                  1144    *
                  1145    ********************************************************
                  1146    *
                  1147    *       RESET ROUTINE
                  1148    *
                  1149    *       INST C MIN: 1718  (3.44 MSEC)
                  1150    *       INST C MAX: 3316.5 (6.63 MSEC)
                  1151    *
                  1152    *
                  1153    *
164C 1A           1154    RESET   DI
164D 08           1155            LR      K,P             R0-R3 USED BY SUBACK
164E 1B           1156            EI
164F 2020         1157            LI      H'20'           RESET ALL SEED & DIST
                  1158    *                               REGISTERS
1651 51           1159            LR      1,A             ACK IDENTITY CODE (1-16)
1652 2041         1160    U2      LI      H'41'           C1 ROW CODE WITH RESET
1654 50           1161            LR      0,A
1655 2813D1 13D1  1162    U0      PI      SUBACK          RESET REGISTERS
1658 72           1163            LIS     2               INCREMENT FOR NEXT ROW
1659 C0           1164            AS      0
165A 50           1165            LR      0,A
165B 2061         1166            LI      H'61'           TEST IF THROUGH BANK
165D E0           1167            XS      0
165E 94F6  1655   1168            BNZ     U0              JUMP TO DO NEXT ROW IF
                  1169    *                               NOT THROUGH BANK
1660 74           1170            LIS     4               TEST IF THROUGH 2ND BANK
1661 E1           1171            XS      1
1662 840B  166E   1172            BZ      U1              JUMP IF THROUGH 2ND BANK
1664 65           1173            LISU    5               TEST IF 32 ROW MODULE
1665 6D           1174            LISL    5
1666 70           1175            LIS     0
1667 CC           1176            AS      S
1668 8105  166E   1177            BP      U1              JUMP IF NOT 32 ROW MODULE
166A 74           1178            LIS     4               ACK IDENTITY CODE FOR
                  1179    *                               2ND BANK
166B 51           1180            LR      1,A
166C 90E5  1652   1181            BR      U2
166E 72           1182    U1      LIS     2               RESET DIST COUNTER
166F C0           1183            AS      0
1670 50           1184            LR      0,A
1671 2020         1185            LI      H'20'           SET UP FOR ACK # 2
1673 51           1186            LR      1,A
1674 2813D1 13D1  1187            PI      SUBACK
1677 1A           1188            DI
1678 09           1189            LR      P,K
1679 1B           1190            EI
167A 1C           1191            POP
                  1192    *
                  1193    *
                  1194    *
                  1195    ********************************************************
                  1196    *
                  1197    *       SUBDIS ROUTINE
                  1198    *
                  1199    *
                  1200    *
167B 1A           1201    SUBDIS  DI
167C 08           1202            LR      K,P
167D 1B           1203            EI
167E 2C           1204            XDC
167F 2A1780 1780  1205            DCI     TBL3            SET DISPLAY BANK W/7 SEG
                  1206    *                               CODE
1682 7F           1207            LIS     H'F'
1683 F3           1208            NS      3               MASK FOR BCD #
1684 8E           1209            ADC
1685 16           1210            LM
1686 2C           1211            XDC
1687 88           1212            AM
1688 50           1213            LR      0,A
1689 20FF         1214            LI      H'FF'
```

```
168B  8E              1215           ADC
168C  40              1216           LR      A,0
168D  17              1217           ST
168E  2C              1218           XDC
168F  20F0            1219           LI      H'F0'
1691  F3              1220           NS      3
1692  14              1221           SR      4
1693  2A1780  1780    1222           DCI     TBL3
1696  8E              1223           ADC
1697  16              1224           LM
1698  2C              1225           XDC
1699  88              1226           AM
169A  50              1227           LR      0,A
169B  20FF            1228           LI      H'FF'
169D  8E              1229           ADC
169E  40              1230           LR      A,0
169F  17              1231           ST
16A0  2C              1232           XDC
16A1  7F              1233           LIS     H'F'
16A2  F2              1234           NS      2
16A3  2A1780  1780    1235           DCI     TBL3
16A6  8E              1236           ADC
16A7  16              1237           LM
16A8  2C              1238           XDC
16A9  88              1239           AM
16AA  50              1240           LR      0,A
16AB  20FF            1241           LI      H'FF'
16AD  8E              1242           ADC
16AE  40              1243           LR      A,0
16AF  17              1244           ST
16B0  2C              1245           XDC
16B1  20F0            1246           LI      H'F0'
16B3  F2              1247           NS      2
16B4  14              1248           SR      4
16B5  2A1780  1780    1249           DCI     TBL3
16B8  8E              1250           ADC
16B9  16              1251           LM
16BA  2C              1252           XDC
16BB  88              1253           AM
16BC  50              1254           LR      0,A
16BD  20FF            1255           LI      H'FF'
16BF  8E              1256           ADC
16C0  40              1257           LR      A,0
16C1  17              1258           ST
16C2  1A              1259           DI
16C3  09              1260           LR      P,K
16C4  1B              1261           EI
16C5  1C              1262           POP
                      1263    *
                      1264    *
                      1265    *
                      1266    ****************************************************
                      1267    *
                      1268    *          LEADING 0 SUPRESSION ROUTINE
                      1269    *
16C6  1A              1270   SUBSUP  DI
16C7  08              1271           LR      K,P         R2 R3:   MSD LSD
16C8  1B              1272           EI
16C9  20F0            1273           LI      H'F0'       SUPPRESS LEADING
                      1274    *                          0'S BY REPLACING WITH A'S
16CB  F2              1275           NS      2
16CC  9415    16E2    1276           BNZ     W0          JUMP IF NO LEADING 0
                      1277    *                          SUPPRESSION REQUIRED
16CE  20A0            1278           LI      H'A0'
16D0  C2              1279           AS      2
16D1  52              1280           LR      2,A
16D2  7F              1281           LIS     H'F'
16D3  F2              1282           NS      2
16D4  940D    16E2    1283           BNZ     W0          JUMP IF NO MORE
                      1284    *                          SUPPRESSION REQUIRED
16D6  7A              1285           LIS     H'A'
16D7  C2              1286           AS      2
16D8  52              1287           LR      2,A
16D9  20F0            1288           LI      H'F0'
16DB  F3              1289           NS      3
```

```
16DC 9405   16E2 1290          BNZ    W0           JUMP IF NO MORE
                 1291  *                           SUPPRESSION IS REQUIRED
16DE 20A0        1292          LI     H'A0'
16E0 C3          1293          AS     3
16E1 53          1294          LR     3,A
16E2 1A          1295   W0     DI
16E3 09          1296          LR     P,K
16E4 1B          1297          EI
16E5 1C          1298          POP
                 1299  *
                 1300  *
                 1301  *****************************************************
                 1302  *
                 1303  *
                 1304  *       LIMIT ROUTINE
                 1305  *
16E6 1A          1306   SUBLIM DI
16E7 08          1307          LR     K,P          DC: POINTING TO ROW POP
16E8 1B          1308          EI
16E9 66          1309          LISU   6            ROW POP -> R62  R63
16EA 68          1310          LISL   0            R60 R61  -> 0
16EB 70          1311          CLR                 STATUS Z = 0 ->WITHIN
                 1312  *                           LIMITS
16EC 5D          1313          LR     I,A          STATUS Z= 0: C=1->LO
16ED 5D          1314          LR     I,A                       C=0->HI
16EE 16          1315          LM
16EF 5D          1316          LR     I,A
16F0 16          1317          LM
16F1 5C          1318          LR     S,A
16F2 67          1319          LISU   7
16F3 2C          1320          XDC
16F4 2A1948 1948 1321          DCI    H'1948'      LO WARN SET C0
16F7 16          1322          LM
16F8 5E          1323          LR     D,A          LO WARN C0 -> R73
16F9 16          1324          LM
16FA 5E          1325          LR     D,A          LO WARN C1 -> R72
16FB 70          1326          CLR
16FC 5E          1327          LR     D,A          R71 -> 0
16FD 5C          1328          LR     S,A          R70 -> 0
16FE 281531 1531 1329          PI     SUBMIN
1701 8216   1718 1330          BC     X0           JUMP IF POP < LO WARN
1703 2A1946 1946 1331          DCI    H'1946'      HI WARN SET C0
1706 67          1332          LISU   7
1707 6B          1333          LISL   3
1708 16          1334          LM
1709 5E          1335          LR     D,A          HI WARN C0 -> R73
170A 16          1336          LM
170B 5E          1337          LR     D,A          HI WARN C1 -> R72
170C 70          1338          CLR
170D 5E          1339          LR     D,A
170E 5C          1340          LR     S,A
170F 281531 1531 1341          PI     SUBMIN
1712 9205   1718 1342          BNC    X0           JUMP IF POP > HI WARN
1714 70          1343          CLR
1715 F0          1344          NS     0            SET STATUS FOR A 0
1716 9008   171F 1345          BR     X1
1718 1A          1346   X0     DI
1719 1E          1347          LR     J,W
171A 20FB        1348          LI     H'FB'
171C F9          1349          NS     9
171D 59          1350          LR     9,A
171E 1D          1351          LR     W,J
171F 2C          1352   X1     XDC
1720 1A          1353          DI
1721 09          1354          LR     P,K
1722 1B          1355          EI
1723 1C          1356          POP
                 1357  *
                 1358  *
                 1359  *****************************************************
                 1360  *
                 1361  *
                 1362  *       ROW ON/OFF ROUTINE
                 1363  *
1724 1A          1364   ONOFF  DI                  R0: ROW #
```

```
1725 70              1365         CLR           R4: BANK 3
1726 54              1366         LR    4,A     R5: INTER BANK ROW #
1727 40              1367         LR    A,0     DC: POINTING TO 1ST
                     1368  *                        BANK OF INFO
1728 55              1369         LR    5,A     STATUS Z: -0 => BIT =0/
                     1370  *                              =1 => BIT =1
1729 20F8            1371  Y1     LI    H'F8'   FIND ROW BANK THRU
                     1372  *                    SUCCESSIVE 8 SUBTRACTIONS
172B C5              1373         AS    5
172C 9207   1734     1374         BNC   Y0      JUMP IF ROW BANK FOUND
172E 55              1375         LR    5,A     RETURN REMAINDER
172F 44              1376         LR    A,4     INCREMENT BANK COUNTER
1730 1F              1377         INC
1731 54              1378         LR    4,A
1732 90F6   1729     1379         BR    Y1
1734 44              1380  Y0     LR    A,4     INCREMENT TO CORRECT
                     1381  *                    ROW BANK
1735 8E              1382         ADC
1736 2C              1383         XDC
1737 2A176E 176E     1384         DCI   TBL1    GET CORRECT ROW CODE
173A 45              1385         LR    A,5
173B 8E              1386         ADC
173C 16              1387         LM
173D 2C              1388         XDC
173E 8A              1389         NM
173F 1B              1390         EI
1740 1C              1391         POP
                     1392  *
                     1393  *
                     1394  *
                     1395  ***********************************************
                     1396  *
                     1397  *      BIT SET ROUTINE
                     1398  *
                     1399  *
1741 1A              1400  BITSET DI            R0: ROW #
1742 70              1401         CLR           R1: =0 => RESET. BIT = 1
                     1402  *                        => SET BIT
1743 52              1403         LR    2,A     R2: BANK #
1744 40              1404         LR    A,0     R3: INTER BANK ROW #
1745 53              1405         LR    3,A     DC: POINTING TO 1ST BANK
1746 20F8            1406  Z1     LI    H'F8'   FIND ROW BANK THRU
                     1407  *                    SUCCESSIVE 8 SUBTRACTIONS
1748 C3              1408         AS    3
1749 9207   1751     1409         BNC   Z0      JUMP IF ROW BANK FOUND
174B 53              1410         LR    3,A     RETURN REMAINDER
174C 42              1411         LR    A,2     INCREMENT BANK COUNTER
174D 1F              1412         INC
174E 52              1413         LR    2,A
174F 90F6   1746     1414         BR    Z1
1751 42              1415  Z0     LR    A,2     INCREMENT TO CORRECT ROW
                     1416  *                    BANK
1752 8E              1417         ADC
1753 2C              1418         XDC
1754 2A176E 176E     1419         DCI   TBL1    GET CORRECT ROW CODE
1757 43              1420         LR    A,3
1758 8E              1421         ADC
1759 16              1422         LM
175A 53              1423         LR    3,A     TEMP STORE ROW CODE
175B 2C              1424         XDC
175C 70              1425         CLR
175D C1              1426         AS    1
175E 43              1427         LR    A,3
175F 9405   1765     1428         BNZ   Z2      JUMP IF BIT TO BE SET
1761 18              1429         COM             BIT TO BE RESET
1762 8A              1430         NM
1763 9002   1766     1431         BR    Z3
1765 8B              1432  Z2     OM
1766 53              1433  Z3     LR    3,A     TEMP STORE TO BACK UP DC
1767 20FF            1434         LI    H'FF'
1769 8E              1435         ADC
176A 43              1436         LR    A,3
176B 17              1437         ST              STORE NEW CODE
176C 1B              1438         EI
176D 1C              1439         POP
```

```
                1440  *
                1441  *
                1442  ************************************************************
                1443  *
                1444  *           TABLE 1
                1445  *
176E  01        1446  TBL1    DC      H'01'
176F  02        1447          DC      H'02'
1770  04        1448          DC      H'04'
1771  08        1449          DC      H'08'
1772  10        1450          DC      H'10'
1773  20        1451          DC      H'20'
1774  40        1452          DC      H'40'
1775  80        1453          DC      H'80'
                1454  *
                1455  *
                1456  ************************************************************
                1457  *
                1458  *           TABLE 2
                1459  *
1776  00        1460  TBL2    DC      H'00'
1777  01        1461          DC      H'01'
1778  00        1462          DC      H'00'
1779  0A        1463          DC      H'0A'
177A  00        1464          DC      H'00'
177B  64        1465          DC      H'64'
177C  03        1466          DC      H'03'
177D  E8        1467          DC      H'E8'
177E  27        1468          DC      H'27'
177F  10        1469          DC      H'10'
                1470  *
                1471  *
                1472  *
                1473  ************************************************************
                1474  *
                1475  *           TABLE 3
                1476  *
1780  3F        1477  TBL3    DC      H'3F'     7 - SEG FOR 0
1781  06        1478          DC      H'06'     7 - SEG FOR 1
1782  5B        1479          DC      H'5B'     7 - SEG FOR 2
1783  4F        1480          DC      H'4F'     7 - SEG FOR 3
1784  66        1481          DC      H'66'     7 - SEG FOR 4
1785  6D        1482          DC      H'6D'     7 - SEG FOR 5
1786  7D        1483          DC      H'7D'     7 - SEG FOR 6
1787  07        1484          DC      H'07'     7 - SEG FOR 7
1788  7F        1485          DC      H'7F'     7 - SEG FOR 8
1789  6F        1486          DC      H'6F'     7 - SEG FOR 9
178A  00        1487          DC      H'00'     7 - SEG FOR BLANK
                1488  *
                1489  *
                1490  *
                1491  ************************************************************
                1492  *
                1493  *
                1494  *
                1495  *
                1496  *         SET UP FOR SUBTRACTION
                1497  *         C0 & C1 OPPOSITE THAT
                1498  *         ON SUBSET ROUTINE
                1499  *
178B  1A        1500  SETBCK  DI
178C  67        1501          LISU    7
178D  6B        1502          LISL    3
178E  43        1503          LR      A,3
178F  5E        1504          LR      D,A
1790  42        1505          LR      A,2
1791  5E        1506          LR      D,A
1792  70        1507          CLR
1793  5E        1508          LR      D,A
1794  5C        1509          LR      S,A
1795  66        1510          LISU    6
1796  6B        1511          LISL    3
1797  16        1512          LM
1798  5E        1513          LR      D,A
1799  16        1514          LM
```

```
179A 5E         1515           LR    D,A
179B 70         1516           CLR
179C 5E         1517           LR    D,A
179D 5C         1518           LR    S,A
179E 1B         1519           EI
179F 1C         1520           POP
                1521  *
                1522  *
                1523  *
                1524  ****************************************************
                1525  *
                1526  *
                1527  *          ROW HI-LO SUBROUTINE
                1528  *
                1529  *
17A0 1A         1530  HILO     DI
17A1 08         1531           LR    K,P
17A2 1B         1532           EI
17A3 65         1533           LISU  5           RESET HI & LO FLAG IN R55
17A4 6D         1534           LISL  5
17A5 20CF       1535           LI    H'CF'
17A7 FC         1536           NS    S
17A8 5C         1537           LR    S,A
17A9 2A1990 1990 1538          DCI   H'1990'     TEST FOR ROW HI-LO
17AC 78         1539           LIS   8
17AD 50         1540           LR    0,A
17AE 70         1541           CLR
17AF 88         1542  T24      AM                ADD ROW LO/HI FLAG REGISTE
17B0 19         1543           LNK
17B1 30         1544           DS    0
17B2 94FC 17AF  1545           BNZ   T24         JMP IF NOT DONE WITH ALL 8
17B4 2400       1546           AI    H'00'       ACTIVATE STATUS REGISTERS
17B6 8445 17FC  1547           BZ    TT25        JMP IF NO HI/LO ROWS
17B8 2A1981 1981 1548          DCI   H'1981'     RSC COUNTER
17BB 16         1549           LM
17BC 50         1550           LR    0,A
17BD 201F       1551  T28      LI    H'1F'
17BF E0         1552           XS    0
17C0 8403 17C4  1553           BZ    T27
17C2 40         1554           LR    A,0         INC TO NEXT ROW #
17C3 1F         1555           INC
17C4 50         1556  T27      LR    0,A
17C5 2A1990 1990 1557          DCI   H'1990'     ROW LO FLAG BANK
17C8 281724 1724 1558          PI    ONOFF       TEST FLAG BIT
17CB 8407 17D3  1559           BZ    T29         JMP TO TEST FOR ROW HI
                1560  *                          FLAG IF ROW LO FLAG OFF
17CD 4C         1561           LR    A,S         SET LO FLAG
17CE 2410       1562           AI    H'10'
17D0 5C         1563           LR    S,A
17D1 900D 17DF  1564           BR    T30         JMP TO UPDATE RSC
17D3 2A1994 1994 1565  T29     DCI   H'1994'     ROW HI FLAG BANK
17D6 281724 1724 1566          PI    ONOFF       TEST FLAG BIT
17D9 84E3 17BD  1567           BZ    T28         JMP TO TEST NEXT ROW IF
                1568  *                          ROW HI FLAG OFF
17DB 4C         1569           LR    A,S
17DC 2420       1570           AI    H'20'
17DE 5C         1571           LR    S,A
17DF 2A1981 1981 1572  T30     DCI   H'1981'     UPDATE RSC
17E2 40         1573           LR    A,0
17E3 17         1574           ST
17E4 2A1998 1998 1575          DCI   H'1998'     TEST HI/LO ALARM FLAGS
17E7 281724 1724 1576          PI    ONOFF
17EA 840F 17FA  1577           BZ    TT21A       JMP IF HI/LO ALARM FLAG 0
17EC 2A1998 1998 1578          DCI   H'1998'     RESET HI/LO ALARM FLAG
17EF 70         1579           CLR
17F0 51         1580           LR    1,A         RESET CODE
17F1 281741 1741 1581          PI    BITSET
17F4 2A1984 1984 1582          DCI   H'1984'     SET T6 (1/2 SEC HI/LO
                1583  *                          ALARM COUNTER
17F7 2014       1584           LI    H'14'       SET T6 FOR 1/2 SEC
17F9 17         1585           ST                T6 --> 1/2 SEC
17FA 2401       1586  TT21A    AI    H'01'
17FC 1A         1587  TT25     DI
17FD 09         1588           LR    P,K
17FE 1B         1589           EI
```

```
17FF 1C          1590           POP
                 1591   *
                 1592   *
                 1593   *
                 1594   ***************************************************
                 1595   *
                 1596   *
                 1597   *
                 1598
```

While a specific embodiment of the present invention has been illustrated and described herein, the invention is not limited thereto. On the contrary, the invention includes such changes, alternatives and modifications as may become apparent to those skilled in the art, insofar as such changes, alternatives and modifications fall within the spirit and scope of the appended claims.

The invention is claimed as follows:

1. A monitoring apparatus for monitoring a plurality of functions of a multi-row field seed planting machine including ground speed sensor means and including seed sensor means associated with each row of said multi-row seed planting machine, comprising: electronic circuit means, including a microprocessor operating in accordance with a predetermined program, for continually receiving and storing population data simultaneously from all of said plurality of seed sensor means and from said ground speed sensor means, user accessible control means coupled with said microprocessor and observable indicator means, the electronic circuit means further including means for energizing said observable indicator means for producing observable indications derived from the population data substantially immediately as such indications are called for by said user accessible control means and wherein said user accessible control means includes means for providing input data to said electronic circuit means representative of machine characteristics of a given multi-row field seed planting machine whose functions are to be monitored, said electronic circuit means further including an EAROM and means responsive to said input data for customizing the EAROM to customize said monitoring apparatus for operation with given multi-row field seed planting machine whose functions are to be monitored.

2. A monitoring apparatus according to claim 1 wherein said microprocessor includes receiving and storing control means which operates in accordance with a predetermined program and in a predetermined time cycle for taking sequential population data readings, for storing a predetermined plural number of said sequential readings, and for eliminating the earliest taken of said population data readings as the latest taken reading is stored.

3. A monitoring apparatus according to claim 2 wherein said microprocessor includes averaging means which operates in accordance with said predetermined program and in response to commands from said user accessible control means for calculating the average values of said stored population data readings.

4. A monitoring apparatus according to claim 2 or claim 3 wherein said user accessible control means further includes means for delivering input data to said microprocessor corresponding to predetermined high and low limits for the seed population, said microprocessor including means for operating in accordance with said predetermined program for customizing the EAROM in accordance with said high and low limits.

5. A monitoring apparatus according to claim 4 wherein said observable indicator means include means responsive to said microprocessor, in accordance with said predetermined program, for producing an observable indication in the event any stored seed population data readings fails to fall within said predetermined high and low limits.

6. A monitoring apparatus for use with a multi-row seed planting machine comprising: electronic circuit means for receiving and storing data corresponding to the planting of seeds in all rows of said multi-row planting machine and data corresponding to the distance travelled by said seed planting machine, said electronic circuit further including means for calculating from said data the seed population planted in each row over successive predetermined intervals of distance travelled by the planting machine, means for storing a predetermined plural number of said successively calculated seed populations for each row, means for averaging said stored seed populations for all rows an operator actuatable means for producing observable indications of the row planting the lowest population, of the average value of the population planted in all rows and of the row planting the highest population, respectively.

7. A monitoring apparatus according to claim 6 wherein said last-mentioned means further includes means for producing observable indications of the values of the seed populations, respectively.

8. A monitoring apparatus for use with a seed planting machine including seed sensor means for providing a seed signal responsive to the delivery of each seed to be planted, said monitoring apparatus comprising: electronic circuit means for receiving the seed signals from said sensor means, said electronic circuit means including means responsive to absence of said seed signals for a predetermined increment of time for producing a failure signal, display means, and means responsive to said failure signal for energizing said display means for producing an observable indication of a failure, said electronic circuit further including memory means for storing failure data corresponding to each failure indication produced during the planting operation for displaying on said display means an observable indication of the stored failure data, said last-mentioned means including means for displaying said stored failure data upon selection thereof even when the planting operation of said seed planting machine is halted.

9. A monitoring apparatus for a seed planting machine having lifting means for lifting the planting apparatus at the end of a pass over a field and for lowering the planting apparatus at the beginning of the next pass over the field and lift sensor means for providing corresponding lift and lower signals, seed sensing means for producing a seed signal for each seed delivered to the ground to be planted and distance sensor means for providing distance signals corresponding to the distance travelled by the planting machine over the ground, said monitoring apparatus comprising: electronic circuit means including means for receiving and storing said seed signals and said distance signals, means for counting the number of said seed signals which are received over a predetermined increment of travel as determined by said distance signals and for calculating seed population planted in each row, means for storing a predetermined plural number of said population calculations made over sequential ones of said increments of distance, and means responsive to said lift and lower signals for resetting said storing means to zero a predetermined increment of time after reception of said lower signal.

10. A monitoring apparatus for use with a multi-row seed planting machine having lifting means for lifting the planting apparatus at the end of a pass over the field and for lowering the planting apparatus at the beginning of the next pass over the field and lift sensor means for providing corresponding lift and lower signals, seed sensing means for producing a seed signal for each seed delivered to be planted in each row of the multi-row seed planting machine and distance sensor means for providing distance signals corresponding to the distance travelled by said planting machine, said monitoring apparatus comprising: electronic circuit means for receiving and storing data corresponding to the planting of seeds in all rows of said multi-row planting machine and data corresponding to the distance travelled by said planting machine, said electronic circuit further including means for calculating from said data the seed population planted in each row over successive predetermined intervals of distance travelled by the planting machine, means for storing a predetermined plural number of said data samples, means for averaging said stored seed population data samples for all rows and operator actuatable means for producing observable indications of the row planting the lowest population, of the average value of the population planted in all rows and of the row planting the highest population, respectively, means for providing input data to said electronic circuit means representative of machine parameters of a given machine whose functions are to be monitored, said electronic circuit means further including an EAROM and means responsive to said input data for customizing the EAROM to accommodate said given machine whose functions are to be monitored, said electronic circuit means further including means responsive to absence of seed signals in any row for a predetermined increment of time for producing a failure signal for that row, means responsive to said failure signal for energizing said observable indicator means for producing an observable indication of a failed row and observable indication of the identity of the row for which said failed row indication is being given, memory means for storing failure data corresponding to each of said failed row indication and each row identity indication, and means for displaying an observable indication for each row for which failure data has been stored, said last-mentioned means including means for displaying said stored failure data upon command even when the planting operation of said planting machine is halted, and means responsive to said lift and lower signals from said lift sensor means for resetting said data samples storing means to zero a predetermined increment of time after reception of said lower signal.

11. A monitoring apparatus for use with a multi-row seed planting machine including a plurality of seed sensor means, each associated with one row of said multi-row planting machine and each for providing a seed signal responsive to the planting of each seed in the associated row, said monitoring apparatus comprising: electronic circuit means including a microprocessor for processing the seed signals from all of said sensor means, said electronic circuit means further including means responsive to absence of said seed signals in any row for a predetermined increment of time for producing a failure signal for that row, display means, and means responsive to said failure signal for energizing said display means for producing an observable indication of a failed row and an observable indication of the identity of the row for which said failed row indication is being given, said electronic circuit further including memory means for storing failure data corresponding to each failed row indication and row identity indication produced during the planting operation, and means selectable for displaying on said display means an observable indication of each row for which failure data has been stored, said last-mentioned means including means for displaying said row indication upon selection thereof even when the planting operation of said seed planting machine is halted.

12. A monitoring apparatus according to claim 11 wherein said microprocessor includes receiving and storing means which operates in a predetermined time cycle for receiving sequential data readings from said sensors, and for storing a predetermined plural number of said sequential readings, eliminating the earliest taken of said data readings as the latest taken reading is stored.

13. A monitoring apparatus according to claim 12 further including user accessible control means and wherein said microprocessor includes display controlling means which operates in response to commands from said user accessible control means for energizing said display means to produce an observable indication of the average of said stored data readings for a given function.

* * * * *